US008732037B2

(12) United States Patent
Boone et al.

(10) Patent No.: US 8,732,037 B2
(45) Date of Patent: *May 20, 2014

(54) METHOD AND SYSTEM FOR PROVIDING A RECORD

(75) Inventors: Barry Boone, Seattle, WA (US); Nathan Sacco, San Jose, CA (US); Rhys Chard, Menlo Park, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/550,233

(22) Filed: Jul. 16, 2012

(65) Prior Publication Data
US 2012/0284304 A1    Nov. 8, 2012

Related U.S. Application Data

(63) Continuation of application No. 12/693,275, filed on Jan. 25, 2010, now Pat. No. 8,266,016, which is a continuation of application No. 09/905,525, filed on Jul. 13, 2001, now Pat. No. 7,660,740.

(60) Provisional application No. 60/241,081, filed on Oct. 16, 2000.

(51) Int. Cl.
G06Q 30/00    (2012.01)

(52) U.S. Cl.
USPC ....................... 705/27.1; 705/26.1

(58) Field of Classification Search
USPC .................................. 705/26, 27
See application file for complete search history.

(56) References Cited

U.S. PATENT DOCUMENTS

| 3,573,747 | A | 4/1971 | Adams et al. |
| 3,581,072 | A | 5/1971 | Nymeyer |
| 3,652,795 | A | 3/1972 | Wolf et al. |
| 4,251,867 | A | 2/1981 | Uchida et al. |
| 4,412,287 | A | 10/1983 | Braddock, III |
| 4,674,044 | A | 6/1987 | Kalmus et al. |
| 4,677,552 | A | 6/1987 | Sibley, Jr. |
| 4,766,293 | A | 8/1988 | Boston |
| 4,789,928 | A | 12/1988 | Fujisaki |

(Continued)

FOREIGN PATENT DOCUMENTS

| CA | 2253543 A1 | 3/1997 |
| CN | 1139782 A | 1/1997 |

(Continued)

OTHER PUBLICATIONS

"Andale Lister", Copyright © 2002 Andale Inc., [Online]. [archived Oct. 25, 2002]. Retrieved from the Internet: <URL: http://web.archive.org/web/20021025121452/http://www.andale.com/corp/products/sell.jsp>, (2002), 3 pgs.

(Continued)

Primary Examiner — Rob Pond
(74) Attorney, Agent, or Firm — Schwegman, Lundberg & Woessner, P.A.

(57) ABSTRACT

A method to facilitate network-based commerce includes determining a site that a user accesses, the site being one of multiple sites operated by a network-based commerce facility. A category list available for the site is retrieved, the category list identifying categories of offerings available via the site. The category list is communicated to the user. The site is a regional site, and the category list is a region-specific category list.

20 Claims, 36 Drawing Sheets

(56) References Cited

U.S. PATENT DOCUMENTS

| | | |
|---|---|---|
| 4,799,156 A | 1/1989 | Shavit et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff |
| 4,837,422 A | 6/1989 | Dethloff et al. |
| 4,864,516 A | 9/1989 | Gaither et al. |
| 4,877,947 A | 10/1989 | Mori |
| 4,903,201 A | 2/1990 | Wagner |
| 4,949,256 A | 8/1990 | Humble |
| 4,968,873 A | 11/1990 | Dethloff et al. |
| 4,982,346 A | 1/1991 | Girouard |
| 5,056,019 A | 10/1991 | Schultz et al. |
| 5,063,507 A | 11/1991 | Lindsey et al. |
| 5,063,523 A | 11/1991 | Vrenjak |
| 5,076,433 A | 12/1991 | Howes |
| 5,077,665 A | 12/1991 | Silverman et al. |
| 5,101,353 A | 3/1992 | Lupien et al. |
| 5,128,752 A | 7/1992 | Von Kohorn |
| 5,136,501 A | 8/1992 | Silverman et al. |
| 5,168,446 A | 12/1992 | Wiseman |
| 5,202,826 A | 4/1993 | McCarthy |
| 5,205,200 A | 4/1993 | Wright |
| 5,243,515 A | 9/1993 | Lee |
| 5,258,908 A | 11/1993 | Hartheimer et al. |
| 5,262,942 A | 11/1993 | Earle |
| 5,280,422 A | 1/1994 | Moe et al. |
| 5,287,268 A | 2/1994 | McCarthy |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,349,368 A | 9/1994 | Takeda et al. |
| 5,369,705 A | 11/1994 | Bird et al. |
| 5,375,055 A | 12/1994 | Togher et al. |
| 5,380,991 A | 1/1995 | Valencia |
| 5,384,701 A | 1/1995 | Stentiford et al. |
| 5,394,324 A | 2/1995 | Clearwater |
| 5,401,946 A | 3/1995 | Weinblatt |
| 5,418,949 A | 5/1995 | Suzuki |
| 5,426,281 A | 6/1995 | Abecassis |
| 5,434,978 A | 7/1995 | Dockter et al. |
| 5,440,634 A | 8/1995 | Jones et al. |
| 5,442,546 A | 8/1995 | Kaji et al. |
| 5,442,782 A | 8/1995 | Malatesta et al. |
| 5,453,601 A | 9/1995 | Rosen |
| 5,455,407 A | 10/1995 | Rosen |
| 5,485,510 A | 1/1996 | Colbert |
| 5,497,319 A | 3/1996 | Chong et al. |
| 5,535,276 A | 7/1996 | Ganesan |
| 5,535,403 A | 7/1996 | Li et al. |
| 5,537,314 A | 7/1996 | Kanter |
| 5,544,051 A | 8/1996 | Senn et al. |
| 5,553,145 A | 9/1996 | Micali |
| 5,557,518 A | 9/1996 | Rosen |
| 5,557,728 A | 9/1996 | Garrett et al. |
| 2,301,919 A | 12/1996 | Sudia et al. |
| 5,592,668 A | 1/1997 | Harding et al. |
| 5,596,994 A | 1/1997 | Bro |
| 5,598,557 A | 1/1997 | Doner et al. |
| 5,600,833 A | 2/1997 | Senn et al. |
| 5,638,457 A | 6/1997 | Deaton |
| 5,640,569 A | 6/1997 | Miller et al. |
| 5,644,721 A | 7/1997 | Chung et al. |
| 5,652,896 A | 7/1997 | Yamauchi et al. |
| 5,657,389 A | 8/1997 | Houvener |
| 5,659,165 A | 8/1997 | Jennings et al. |
| 5,664,115 A | 9/1997 | Fraser |
| 5,671,364 A | 9/1997 | Turk |
| 5,687,323 A | 11/1997 | Hodroff |
| 5,689,652 A | 11/1997 | Lupien et al. |
| 5,694,546 A | 12/1997 | Reisman |
| 5,696,909 A | 12/1997 | Wallner |
| 5,706,457 A | 1/1998 | Dwyer et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,724,593 A | 3/1998 | Hargrave, III et al. |
| 5,727,165 A | 3/1998 | Ordish et al. |
| 5,729,594 A | 3/1998 | Klingman |
| 5,734,838 A | 3/1998 | Robinson et al. |
| 5,740,252 A | 4/1998 | Minor et al. |
| 5,757,917 A | 5/1998 | Rose et al. |
| 5,758,126 A | 5/1998 | Daniels et al. |
| 5,761,648 A | 6/1998 | Golden et al. |
| 5,771,291 A | 6/1998 | Newton et al. |
| 5,771,380 A | 6/1998 | Tanaka et al. |
| 5,774,553 A | 6/1998 | Rosen |
| 5,774,870 A | 6/1998 | Storey |
| 5,778,178 A | 7/1998 | Arunachalam |
| 5,778,213 A | 7/1998 | Shakib et al. |
| 5,778,356 A | 7/1998 | Heiny |
| 5,787,386 A | 7/1998 | Kaplan et al. |
| 5,787,402 A | 7/1998 | Potter et al. |
| 5,790,790 A | 8/1998 | Smith et al. |
| 5,794,210 A | 8/1998 | Goldhaber et al. |
| 5,794,219 A | 8/1998 | Brown |
| 5,799,285 A | 8/1998 | Klingman |
| 5,803,500 A | 9/1998 | Mossberg |
| 5,806,044 A | 9/1998 | Powell |
| 5,818,914 A | 10/1998 | Fujisaki |
| 5,822,737 A | 10/1998 | Ogram |
| 5,826,241 A | 10/1998 | Stein et al. |
| 5,826,244 A | 10/1998 | Huberman |
| 5,835,896 A | 11/1998 | Fisher et al. |
| 5,835,911 A | 11/1998 | Nakagawa et al. |
| 5,845,143 A | 12/1998 | Yamauchi et al. |
| 5,845,265 A | 12/1998 | Woolston |
| 5,845,266 A | 12/1998 | Lupien et al. |
| 5,846,265 A | 12/1998 | McGregor et al. |
| 5,850,442 A | 12/1998 | Muftic |
| 5,854,997 A | 12/1998 | Sukeda et al. |
| 5,855,008 A | 12/1998 | Goldhaber et al. |
| 5,857,188 A | 1/1999 | Douglas |
| 5,857,201 A | 1/1999 | Wright et al. |
| 5,857,203 A | 1/1999 | Kauffman et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,883,620 A | 3/1999 | Hobbs |
| 5,884,056 A | 3/1999 | Steele |
| 5,884,246 A | 3/1999 | Boucher et al. |
| 5,884,247 A | 3/1999 | Christy |
| 5,884,277 A | 3/1999 | Khosla |
| 5,890,138 A | 3/1999 | Godin et al. |
| 5,897,621 A | 4/1999 | Boesch et al. |
| 5,897,622 A | 4/1999 | Blinn et al. |
| 5,903,874 A | 5/1999 | Leonard |
| 5,905,974 A | 5/1999 | Fraser et al. |
| 5,905,975 A | 5/1999 | Ausubel |
| 5,909,544 A | 6/1999 | Anderson et al. |
| 5,913,203 A | 6/1999 | Wong et al. |
| 5,917,484 A | 6/1999 | Mullaney |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,945,652 A | 8/1999 | Ohki |
| 5,953,423 A | 9/1999 | Rosen |
| 5,956,694 A | 9/1999 | Powell |
| 5,960,382 A | 9/1999 | Steiner |
| 5,960,409 A | 9/1999 | Wexler |
| 5,963,647 A | 10/1999 | Downing et al. |
| 5,963,917 A | 10/1999 | Ogram |
| 5,963,923 A | 10/1999 | Garber |
| 5,966,685 A | 10/1999 | Flanagan et al. |
| 5,969,974 A | 10/1999 | Vandenbelt et al. |

(56) References Cited

U.S. PATENT DOCUMENTS

| | | |
|---|---|---|
| 5,970,469 A | 10/1999 | Scroggie et al. |
| 5,971,274 A | 10/1999 | Milchman |
| 5,974,412 A | 10/1999 | Hazlehurst et al. |
| 5,983,196 A | 11/1999 | Wendkos |
| 5,987,500 A | 11/1999 | Arunachalam |
| 5,991,739 A | 11/1999 | Cupps et al. |
| 5,999,913 A | 12/1999 | Goodwin, III |
| 6,006,221 A | 12/1999 | Liddy et al. |
| 6,009,412 A | 12/1999 | Storey |
| 6,014,634 A | 1/2000 | Scroggie et al. |
| 6,016,955 A | 1/2000 | DeRooij et al. |
| 6,018,721 A | 1/2000 | Aziz et al. |
| 6,018,742 A * | 1/2000 | Herbert, III ........................... 1/1 |
| 6,029,015 A | 2/2000 | Ishiguro |
| 6,029,141 A | 2/2000 | Bezos et al. |
| 6,029,150 A | 2/2000 | Kravitz |
| 6,035,280 A | 3/2000 | Christensen |
| 6,035,288 A | 3/2000 | Solomon |
| 6,035,402 A | 3/2000 | Vaeth et al. |
| 6,039,244 A | 3/2000 | Finsterwald |
| 6,044,363 A | 3/2000 | Mori et al. |
| 6,047,264 A | 4/2000 | Fisher et al. |
| 6,047,274 A | 4/2000 | Johnson |
| 6,052,670 A | 4/2000 | Johnson |
| 6,055,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,069,939 A | 5/2000 | Fung et al. |
| 6,073,117 A | 6/2000 | Oyanagi et al. |
| 6,077,085 A | 6/2000 | Parry et al. |
| 6,085,169 A | 7/2000 | Walker et al. |
| 6,085,176 A | 7/2000 | Woolston |
| 6,092,035 A | 7/2000 | Kurachi et al. |
| 6,092,037 A | 7/2000 | Stone et al. |
| 6,095,410 A | 8/2000 | Andersen et al. |
| 6,101,485 A | 8/2000 | Fortenberry et al. |
| 6,104,815 A | 8/2000 | Alcorn et al. |
| 6,105,001 A | 8/2000 | Masi |
| 6,105,008 A | 8/2000 | Davis et al. |
| 6,119,137 A | 9/2000 | Smith et al. |
| 6,119,229 A | 9/2000 | Martinez et al. |
| 6,122,355 A | 9/2000 | Strohl |
| 6,122,606 A | 9/2000 | Johnson |
| 6,134,533 A | 10/2000 | Shell |
| 6,138,107 A | 10/2000 | Elgamal |
| 6,141,653 A | 10/2000 | Conklin et al. |
| 6,144,984 A | 11/2000 | DeBenedictis et al. |
| 6,151,589 A | 11/2000 | Aggarwal et al. |
| 6,161,082 A | 12/2000 | Goldberg et al. |
| 6,173,267 B1 | 1/2001 | Cairns |
| 6,178,408 B1 | 1/2001 | Copple et al. |
| 6,192,407 B1 | 2/2001 | Smith et al. |
| 6,199,079 B1 | 3/2001 | Gupta |
| 6,202,051 B1 | 3/2001 | Woolston |
| 6,205,418 B1 | 3/2001 | Li et al. |
| 6,205,433 B1 | 3/2001 | Boesch et al. |
| 6,212,556 B1 | 4/2001 | Arunachalam |
| 6,226,412 B1 | 5/2001 | Schwab |
| 6,237,145 B1 | 5/2001 | Narasimhan et al. |
| 6,243,691 B1 | 6/2001 | Fisher et al. |
| 6,246,996 B1 | 6/2001 | Stein et al. |
| 6,266,651 B1 | 7/2001 | Woolston |
| 6,266,652 B1 | 7/2001 | Godin et al. |
| 6,269,345 B1 | 7/2001 | Riboud |
| 6,272,675 B1 | 8/2001 | Schrab et al. |
| 6,275,789 B1 | 8/2001 | Moser et al. |
| 6,278,969 B1 | 8/2001 | King et al. |
| 6,278,980 B1 | 8/2001 | Wendkos |
| 6,282,507 B1 | 8/2001 | Horiguchi et al. |
| 6,292,769 B1 | 9/2001 | Flanagan et al. |
| 6,301,554 B1 | 10/2001 | Christy |
| 6,308,172 B1 | 10/2001 | Agrawal et al. |
| 6,317,727 B1 | 11/2001 | May |
| 6,321,208 B1 | 11/2001 | Barnett et al. |
| 6,321,210 B1 | 11/2001 | O'Brien et al. |
| 6,326,985 B1 | 12/2001 | Tazoe et al. |
| 6,330,543 B1 | 12/2001 | Kepecs |
| 6,336,009 B1 | 1/2002 | Suzumi et al. |
| 6,336,099 B1 | 1/2002 | Barnett et al. |
| 6,336,105 B1 | 1/2002 | Conklin et al. |
| 6,339,755 B1 | 1/2002 | Hetherington et al. |
| 6,341,958 B1 | 1/2002 | Zilberman |
| 6,349,275 B1 | 2/2002 | Schumacher et al. |
| 6,356,865 B1 | 3/2002 | Franz et al. |
| 6,363,337 B1 | 3/2002 | Amith |
| 6,386,446 B1 | 5/2002 | Himmel et al. |
| 6,389,427 B1 | 5/2002 | Faulkner |
| 6,396,515 B1 | 5/2002 | Hetherington et al. |
| 6,401,077 B1 | 6/2002 | Godden et al. |
| 6,415,270 B1 | 7/2002 | Rackson et al. |
| 6,421,653 B1 | 7/2002 | May |
| 6,438,524 B1 | 8/2002 | Shi |
| 6,446,048 B1 | 9/2002 | Wells et al. |
| 6,460,015 B1 | 10/2002 | Hetherington et al. |
| 6,460,020 B1 | 10/2002 | Pool et al. |
| 6,463,404 B1 | 10/2002 | Appleby |
| 6,473,729 B1 | 10/2002 | Gastaldo et al. |
| 6,490,602 B1 | 12/2002 | Kraemer et al. |
| 6,493,661 B1 | 12/2002 | White, III et al. |
| 6,496,793 B1 | 12/2002 | Veditz et al. |
| 6,507,813 B2 | 1/2003 | Veditz et al. |
| 6,523,000 B1 | 2/2003 | Ando et al. |
| 6,523,012 B1 | 2/2003 | Glassman et al. |
| 6,526,426 B1 | 2/2003 | Lakritz |
| 6,532,444 B1 | 3/2003 | Weber |
| 6,556,975 B1 | 4/2003 | Wittsche |
| 6,567,821 B1 | 5/2003 | Polk |
| 6,570,591 B1 | 5/2003 | Crovetto et al. |
| 6,571,216 B1 | 5/2003 | Garg et al. |
| 6,571,241 B1 | 5/2003 | Nosohara |
| 6,574,239 B1 | 6/2003 | Dowling et al. |
| 6,578,012 B1 | 6/2003 | Storey |
| 6,594,640 B1 | 7/2003 | Postrel |
| 6,598,026 B1 | 7/2003 | Ojha et al. |
| 6,598,028 B1 | 7/2003 | Sullivan et al. |
| 6,604,107 B1 | 8/2003 | Wang |
| 6,616,703 B1 | 9/2003 | Nakagawa |
| 6,623,529 B1 | 9/2003 | Lakritz |
| 6,628,307 B1 | 9/2003 | Fair |
| 6,643,624 B2 | 11/2003 | Philippe et al. |
| 6,647,364 B1 | 11/2003 | Yumura et al. |
| 6,647,373 B1 | 11/2003 | Carlton-Foss |
| 6,651,220 B1 | 11/2003 | Penteroudakis et al. |
| 6,665,676 B2 | 12/2003 | Twig et al. |
| 6,721,715 B2 | 4/2004 | Nemzow |
| 6,732,161 B1 | 5/2004 | Hess et al. |
| 6,748,367 B1 | 6/2004 | Lee |
| 6,771,291 B1 | 8/2004 | DiStenfano |
| 6,799,165 B1 | 9/2004 | Boesjes |
| 6,857,022 B1 | 2/2005 | Scanlan |
| 6,901,408 B2 | 5/2005 | Fachat et al. |
| 6,912,539 B1 | 6/2005 | Kapitanski et al. |
| 6,965,882 B1 | 11/2005 | Lapstun et al. |
| 6,999,932 B1 | 2/2006 | Zhou |
| 7,007,026 B2 | 2/2006 | Wilkinson et al. |
| 7,013,289 B2 | 3/2006 | Horn et al. |
| 7,031,985 B1 | 4/2006 | Pecheny |
| 7,072,826 B1 | 7/2006 | Wakita |
| 7,076,453 B2 | 7/2006 | Jammes et al. |
| 7,133,835 B1 | 11/2006 | Fusz et al. |
| 7,136,863 B2 | 11/2006 | Wang |
| 7,165,041 B1 | 1/2007 | Guheen et al. |
| 7,191,393 B1 | 3/2007 | Chin et al. |
| 7,194,403 B2 | 3/2007 | Okura et al. |
| 7,206,768 B1 | 4/2007 | deGroeve et al. |
| 7,234,110 B2 | 6/2007 | Sumitomo |
| 7,251,612 B1 | 7/2007 | Parker et al. |
| 7,315,613 B2 | 1/2008 | Kleindienst et al. |
| 7,315,826 B1 | 1/2008 | Guheen et al. |
| 7,337,133 B1 | 2/2008 | Bezos et al. |
| 7,340,389 B2 | 3/2008 | Vargas |
| 7,398,229 B2 | 7/2008 | Budish |
| 7,418,390 B1 | 8/2008 | Jokipii |

(56) References Cited

U.S. PATENT DOCUMENTS

| | | |
|---|---|---|
| 7,599,857 B2 | 10/2009 | Bishop et al. |
| 7,644,037 B1 | 1/2010 | Ostrovsky |
| 7,660,740 B2 | 2/2010 | Boone et al. |
| 7,742,985 B1 | 6/2010 | Digrigoli et al. |
| 7,752,034 B2 | 7/2010 | Brockett et al. |
| 7,752,266 B2 | 7/2010 | Grove |
| 7,856,384 B1 | 12/2010 | Kulasooriya et al. |
| 7,895,082 B2 | 2/2011 | Veres et al. |
| 7,908,132 B2 | 3/2011 | Brockett et al. |
| 7,941,348 B2 | 5/2011 | Veres et al. |
| 8,050,957 B2 | 11/2011 | Woehler |
| 8,055,582 B2 | 11/2011 | Digrigoli et al. |
| 8,078,505 B2 | 12/2011 | Veres et al. |
| 8,249,990 B2 | 8/2012 | Digrigoli et al. |
| 8,255,286 B2 | 8/2012 | Veres et al. |
| 8,266,016 B2 | 9/2012 | Boone et al. |
| 8,442,871 B2 | 5/2013 | Veres et al. |
| 2001/0007099 A1 | 7/2001 | Rau |
| 2001/0009005 A1 | 7/2001 | Godin et al. |
| 2001/0011241 A1 | 8/2001 | Nemzow |
| 2001/0023407 A1 | 9/2001 | Liyanearachchi et al. |
| 2001/0025265 A1 | 9/2001 | Takayasu |
| 2001/0027436 A1 | 10/2001 | Tenembaum |
| 2001/0029442 A1 | 10/2001 | Shiotsu et al. |
| 2001/0029455 A1 | 10/2001 | Chin et al. |
| 2001/0032164 A1 | 10/2001 | Kim |
| 2001/0032878 A1 | 10/2001 | Tsiounis et al. |
| 2001/0034694 A1 | 10/2001 | Elias |
| 2001/0039531 A1 | 11/2001 | Aoki |
| 2001/0047308 A1 | 11/2001 | Kaminsky et al. |
| 2001/0049628 A1 | 12/2001 | Icho |
| 2001/0049647 A1 | 12/2001 | Sheehan |
| 2001/0049707 A1 | 12/2001 | Tran |
| 2002/0002538 A1 | 1/2002 | Ling |
| 2002/0013767 A1 | 1/2002 | Katz |
| 2002/0013774 A1 | 1/2002 | Morimoto |
| 2002/0026423 A1 | 2/2002 | Maritzen et al. |
| 2002/0029182 A1 | 3/2002 | Nakagawa |
| 2002/0029339 A1 | 3/2002 | Rowe |
| 2002/0035466 A1 | 3/2002 | Kodama |
| 2002/0038282 A1 | 3/2002 | Montgomery |
| 2002/0040344 A1 | 4/2002 | Preiser et al. |
| 2002/0042835 A1 | 4/2002 | Pepin et al. |
| 2002/0046137 A1 | 4/2002 | Odom et al. |
| 2002/0046157 A1 | 4/2002 | Solomon |
| 2002/0049664 A1 | 4/2002 | Hoffman et al. |
| 2002/0069049 A1 | 6/2002 | Turner |
| 2002/0069134 A1 | 6/2002 | Solomon |
| 2002/0069184 A1 | 6/2002 | Tilly et al. |
| 2002/0073015 A1 | 6/2002 | Chan et al. |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0091580 A1 | 7/2002 | Wang |
| 2002/0099562 A1 | 7/2002 | Bruce et al. |
| 2002/0099656 A1 | 7/2002 | Poh Wong |
| 2002/0111889 A1 | 8/2002 | Buxton et al. |
| 2002/0111907 A1 | 8/2002 | Ling |
| 2002/0116318 A1 | 8/2002 | Thomas et al. |
| 2002/0120548 A1 | 8/2002 | Etkin |
| 2002/0120554 A1 | 8/2002 | Vega |
| 2002/0123959 A1 | 9/2002 | Mozley et al. |
| 2002/0147655 A1 | 10/2002 | Say |
| 2002/0174010 A1 | 11/2002 | Rice |
| 2002/0174031 A1 | 11/2002 | Weiss |
| 2002/0174050 A1 | 11/2002 | Eynard et al. |
| 2002/0184610 A1 | 12/2002 | Chong et al. |
| 2002/0188670 A1 | 12/2002 | Stringham |
| 2002/0193986 A1 | 12/2002 | Schirris |
| 2002/0198713 A1 | 12/2002 | Franz et al. |
| 2003/0005159 A1 | 1/2003 | Kumhyr |
| 2003/0014350 A1 | 1/2003 | Duell |
| 2003/0018885 A1 | 1/2003 | Landsman et al. |
| 2003/0022719 A1 | 1/2003 | Donald et al. |
| 2003/0033137 A1 | 2/2003 | Holubar et al. |
| 2003/0046059 A1 | 3/2003 | Litster et al. |
| 2003/0050861 A1 | 3/2003 | Martin |
| 2003/0055747 A1 | 3/2003 | Carr et al. |
| 2003/0074462 A1 | 4/2003 | Grove |
| 2003/0078033 A1 | 4/2003 | Sauer et al. |
| 2003/0083952 A1 | 5/2003 | Simpson et al. |
| 2003/0084051 A1 | 5/2003 | Depura et al. |
| 2003/0088566 A1 | 5/2003 | Wang |
| 2003/0093326 A1 | 5/2003 | Poon et al. |
| 2003/0110047 A1 | 6/2003 | Santosuosso et al. |
| 2003/0139975 A1 | 7/2003 | Perkowski |
| 2003/0154134 A1 | 8/2003 | Wang |
| 2003/0167213 A1 | 9/2003 | Jammes et al. |
| 2003/0208352 A1 | 11/2003 | Lee |
| 2003/0229545 A1 | 12/2003 | Veres et al. |
| 2003/0229554 A1 | 12/2003 | Veres et al. |
| 2004/0001106 A1 | 1/2004 | Deutscher et al. |
| 2004/0039692 A1 | 2/2004 | Shields et al. |
| 2004/0049423 A1 | 3/2004 | Kawashima et al. |
| 2004/0073507 A1 | 4/2004 | Scott et al. |
| 2004/0078297 A1 | 4/2004 | Veres et al. |
| 2005/0021455 A1 | 1/2005 | Webster |
| 2005/0102151 A1 | 5/2005 | Fuwa et al. |
| 2005/0240392 A1 | 10/2005 | Munro et al. |
| 2006/0015452 A1 | 1/2006 | Kulasooriya et al. |
| 2006/0074792 A1 | 4/2006 | Wagoner et al. |
| 2006/0089897 A1 | 4/2006 | Maas et al. |
| 2006/0136301 A1 | 6/2006 | Grovit |
| 2006/0200353 A1 | 9/2006 | Bennett |
| 2006/0294005 A1 | 12/2006 | Drepak |
| 2007/0112643 A1 | 5/2007 | Veres et al. |
| 2007/0198391 A1 | 8/2007 | Dreyer et al. |
| 2008/0147479 A1 | 6/2008 | Johnson |
| 2008/0152095 A1 | 6/2008 | Kleindienst et al. |
| 2010/0131510 A1 | 5/2010 | Boone et al. |
| 2010/0228536 A1 | 9/2010 | Grove |
| 2010/0312695 A1 | 12/2010 | Digrigoli et al. |
| 2011/0231530 A1 | 9/2011 | Veres et al. |
| 2011/0307384 A1 | 12/2011 | Digrigoli et al. |
| 2012/0047029 A1 | 2/2012 | Veres et al. |
| 2012/0246233 A1 | 9/2012 | Veres et al. |
| 2012/0303529 A1 | 11/2012 | Digrigoli et al. |

FOREIGN PATENT DOCUMENTS

| | | |
|---|---|---|
| CN | 102129642 A | 7/2011 |
| DE | 4308597 A1 | 8/1993 |
| EP | 0251619 A2 | 1/1988 |
| EP | 0254812 A2 | 2/1988 |
| EP | 0542298 A2 | 5/1993 |
| EP | 0590861 A2 | 4/1994 |
| FR | 2658635 A1 | 8/1991 |
| GB | 2261579 A | 5/1993 |
| GB | 2296413 A | 6/1996 |
| JP | 2000322490 A | 11/2000 |
| JP | 2001000469 A | 1/2001 |
| JP | 2001319098 A | 11/2001 |
| JP | 2001338179 A | 12/2001 |
| JP | 2001357248 A | 12/2001 |
| JP | 2002092390 A | 3/2002 |
| JP | 2002109286 A | 4/2002 |
| JP | 2002207898 A | 7/2002 |
| JP | 2004094643 A | 3/2004 |
| KR | 20000018041 A | 4/2000 |
| KR | 20000024372 A | 5/2000 |
| KR | 20000049744 A | 8/2000 |
| KR | 20020059971 A | 7/2002 |
| KR | 20000037395 A | 4/2008 |
| NL | 9300266 A | 2/1993 |
| WO | WO-9116691 A1 | 10/1991 |
| WO | WO-9215174 A1 | 9/1992 |
| WO | WO-9512169 A1 | 5/1995 |
| WO | WO-9517711 A1 | 6/1995 |
| WO | WO-9633568 A1 | 10/1996 |
| WO | WO-9634356 A1 | 10/1996 |
| WO | WO-9636024 A1 | 11/1996 |
| WO | WO-9641315 A1 | 12/1996 |
| WO | WO-9704411 A1 | 2/1997 |
| WO | WO-9737315 A1 | 10/1997 |

(56) References Cited

FOREIGN PATENT DOCUMENTS

| WO | WO-9743727 A1 | 11/1997 |
|---|---|---|
| WO | WO-9748078 A2 | 12/1997 |
| WO | WO-9809447 A2 | 3/1998 |
| WO | WO-9809447 A3 | 3/1998 |
| WO | WO-9960503 A1 | 11/1999 |
| WO | WO-9963461 A1 | 12/1999 |
| WO | WO-0058862 A2 | 10/2000 |
| WO | WO-0062231 A1 | 10/2000 |
| WO | WO-0079461 A1 | 12/2000 |
| WO | WO-0102926 A2 | 1/2001 |
| WO | WO-0116815 A2 | 3/2001 |
| WO | WO-0129750 A1 | 4/2001 |
| WO | WO-0139059 A1 | 5/2001 |
| WO | WO-0152135 A1 | 7/2001 |
| WO | WO-0153929 A1 | 7/2001 |
| WO | WO-0157722 A1 | 8/2001 |
| WO | WO-0171579 A1 | 9/2001 |
| WO | WO-0171580 A1 | 9/2001 |
| WO | WO-0173665 A1 | 10/2001 |
| WO | WO-0180111 A1 | 10/2001 |
| WO | WO-0182115 A1 | 11/2001 |
| WO | WO-0205179 A1 | 1/2002 |
| WO | WO-0231737 A1 | 4/2002 |
| WO | WO-0233618 A1 | 4/2002 |
| WO | WO-0248828 A2 | 6/2002 |
| WO | WO-02069101 A2 | 9/2002 |
| WO | WO-02097582 A2 | 12/2002 |
| WO | WO-03038560 A2 | 5/2003 |
| WO | WO-03104931 A3 | 12/2003 |
| WO | WO-2004090666 A2 | 10/2004 |
| WO | WO-2004090666 A3 | 10/2004 |

OTHER PUBLICATIONS

"Andale Lister: Bulk List", Copyright © 2002 Andale Inc., [Online]. [Archived Oct. 5, 2002]. Retrieved from the Internet: <URL: http://web.archive.org/web/20021005074745/http://www.andale.com/corp/products/qs_sell_details_bulklist.jsp>, (2002), 1 pg.

"Andale lister: Design Center", Copyright © 2002 Andale Inc., [Online]. [Archived Dec. 15, 2004]. Retrieved from the Internet: <URL: http://web.archive.org/web/20021215192044/http://www.andale.com/corp/products/qs_sell_details_designcenter.jsp>, (2004), 1 pg.

"Andale Lister: In-Line Images", Copyright © 2002 Andale Inc., [Online]. [Archived Dec. 15, 2002]. Retrieved from the Internet: <URL: http://web.archive.org/web/20021215192408/http://www.andale.com/corp/products/qs_sell_details_inlineimg.jsp>, (2002), 1 pg.

"Andale Lister: Inventory Dashboard", Copyright © 2002 Andale Inc., [Online]. [Archived Dec. 15, 2002]. Retrieved from the Internet: <URL: http://web.archive.org/web/20021215192408/http://www.andale.com/corp/products/qs_sell_details_invdashboard.jsp, (2002), 2 pgs.

"Andale Lister: Launch Scheduler", Copyright © 2002 Andale Inc., [Online]. [Archived Dec. 15, 2002]. Retrieved from the Internet: <URL: http://web.archive.org/web/20021215192724/http://www.andale.com/corp/products/qs_sell_details_launchsched.jsp, (2002), 1 pg.

"Andale Lister: Online or Offline", Copyright © 2002 Andale Inc., [Online]. [Archived Dec. 15, 2002]. Retrieved from the Internet: <URL: http://web.archive.org/web/20021215194722/http://www.andale.com/corp/products/qs_sell_details_onoffline.jsp>, (2002), 2 pgs.

"Andale Lister: Overview", Copyright © 2002 Andale Inc., [Online]. [Archived Dec. 1, 2002]. Retrieved from the Internet: <URL: http://web.archive.org/web/20021201081906/http://www.andale.com/corp/products/qs_overview.jsp, (2002), 4 pgs.

U.S. Appl. No. 09/602,110, Advisory Action mailed Feb. 22, 2010, 3 pgs.

U.S. Appl. No. 09/602,110, Advisory Action mailed May 26, 2006, 3 pgs.

U.S. Appl. No. 09/602,110, Amendment filed Apr. 28, 2008, 17 pgs.

U.S. Appl. No. 09/602,110, Appeal Brief filed Apr. 26, 2010, 37 pgs.

U.S. Appl. No. 09/602,110, Appeal Brief filed Dec. 15, 2006, 34 pgs.

U.S. Appl. No. 09/602,110, Appeal Decision mailed Feb. 28, 2008, 13 pgs.

U.S. Appl. No. 09/602,110, Decision on Pre-Appeal Brief mailed Aug. 15, 2006, 2 pgs.

U.S. Appl. No. 09/602,110, Examiner's Answer to Appeal Brief mailed Jun. 11, 2010, 20 pgs.

U.S. Appl. No. 09/602,110, Final Office Action mailed Mar. 8, 2006, 11 pgs.

U.S. Appl. No. 09/602,110, Final Office Action mailed Sep. 2, 2004, 13 pgs.

U.S. Appl. No. 09/602,110, Final Office Action mailed Nov. 17, 2008, 12 pgs.

U.S. Appl. No. 09/602,110, Final Office Action mailed Nov. 21, 2005, 11 pgs.

U.S. Appl. No. 09/602,110, Final Office Action mailed Nov. 25, 2009, 17 pgs.

U.S. Appl. No. 09/602,110, Non Final Office Action mailed Jan. 21, 2004, 13 pgs.

U.S. Appl. No. 09/602,110, Non Final Office Action mailed Apr. 5, 2005, 11 pgs.

U.S. Appl. No. 09/602,110, Non-Final Office Action mailed Mar. 18, 2009, 19 pgs.

U.S. Appl. No. 09/602,110, Non-Final Office Action mailed Jul. 21, 2008, 12 pgs.

U.S. Appl. No. 09/602,110, Pre-Appeal Brief Request filed Jun. 27, 2006, 4 pgs.

U.S. Appl. No. 09/602,110, Reply Brief filed May 7, 2007, 11 pgs.

U.S. Appl. No. 09/602,110, Reply Brief filed Aug. 11, 2010, 6 pgs.

U.S. Appl. No. 09/602,110, Response filed Jan. 3, 2005 to Final Office Action mailed Sep. 2, 2004, 16 pgs.

U.S. Appl. No. 09/602,110, Response filed Jan. 23, 2006 to Final Office Action mailed Nov. 21, 2005, 15 pgs.

U.S. Appl. No. 09/602,110, Response filed Jan. 25, 2010 to Final Office Action mailed Nov. 25, 2009, 22 pgs.

U.S. Appl. No. 09/602,110, Response filed Feb. 17, 2009 to Final Office Action mailed Nov. 17, 2008, 21 pgs.

U.S. Appl. No. 09/602,110, Response filed May 8, 2006 to Final Office Action mailed Mar. 8, 2006, 17 pgs.

U.S. Appl. No. 09/602,110, Response filed May 21, 2004 to Non-Final Office Action mailed Jan. 21, 2004, 18 pgs.

U.S. Appl. No. 09/602,110, Response filed Jul. 20, 2009 to Non Final Office Action mailed Mar. 18, 2009, 21 pgs.

U.S. Appl. No. 09/602,110, Response filed Aug. 4, 2005 to Non Final Office Action mailed Apr. 5, 2005, 19 pgs.

U.S. Appl. No. 09/602,110, Response filed Oct. 21, 2008 to Non-Final Office Action mailed Jul. 21, 2008, 19 pgs.

U.S. Appl. No. 09/905,525, Advisory Action mailed May 2, 2008, 5 pgs.

U.S. Appl. No. 09/905,525, Final Office Action mailed Jan. 10, 2008, 15 pgs.

U.S. Appl. No. 09/905,525, Non-Final Office Action mailed Mar. 5, 2009, 25 pgs.

U.S. Appl. No. 09/905,525, Non-Final Office Action mailed Aug. 22, 2008, 17 pgs.

U.S. Appl. No. 09/905,525, Notice of Allowance mailed Sep. 18, 2009, 11 pgs.

U.S. Appl. No. 09/905,525, Response filed Mar. 27, 2008 to Non Final Office Action mailed Jan. 10, 2008, 17 pgs.

U.S. Appl. No. 09/905,525, Response filed Jun. 5, 2009 to Non Final Office Action mailed Mar. 5, 2009, 19 pgs.

U.S. Appl. No. 09/905,525, Response filed Jun. 10, 2008 to Advisory Action mailed May 2, 2008, 20 pgs.

U.S. Appl. No. 09/905,525, Response filed Sep. 25, 2007 to Non Final Office Action mailed Jun. 25, 2007, 17 pgs.

U.S. Appl. No. 09/905,525, Response filed Nov. 24, 2008 to Non Final Office Action mailed Aug. 22, 2008, 17 pgs.

U.S. Appl. No. 09/905,525, Final Office Action mailed Jun. 29, 2006, 14 pgs.

U.S. Appl. No. 09/905,525, Non Final Office Action mailed Jun. 25, 2007, 16 pgs.

(56) References Cited

OTHER PUBLICATIONS

U.S. Appl. No. 09/905,525, Non Final Office Action mailed Dec. 12, 2005, 12 pgs.
U.S. Appl. No. 09/905,525, Non Final Office Action mailed Dec. 14, 2004, 11 pgs.
U.S. Appl. No. 09/905,525, Non Final Office Action mailed Dec. 18, 2006, 15 pgs.
U.S. Appl. No. 09/905,525, Response filed Mar. 19, 2007 to Non Final Office Action mailed Dec. 18, 2006, 9 pgs.
U.S. Appl. No. 09/905,525, Response filed Apr. 12, 2006 to Non Final Office Action mailed Dec. 12, 2005, 8 pgs.
U.S. Appl. No. 09/905,525, Response filed Apr. 13, 2005 to Non Final Office Action mailed Dec. 14, 2004, 17 pgs.
U.S. Appl. No. 09/905,525, Response filed Sep. 22, 2006 to Final Office Action mailed Jun. 29, 2006, 19 pgs.
U.S. Appl. No. 09/976,301, 312 Amendment filed Jan. 10, 2010, 4 pgs.
U.S. Appl. No. 09/976,301, Advisory Action mailed Jun. 9, 2008, 5 pgs.
U.S. Appl. No. 09/976,301, Advisory Action mailed Aug. 13, 2009, 3 pgs.
U.S. Appl. No. 09/976,301, Advisory Action mailed Sep. 30, 2005, 3 pgs.
U.S. Appl. No. 09/976,301, Advisory Action mailed Nov. 30, 2006, 3 pgs.
U.S. Appl. No. 09/976,301, Decision on Pre-Appeal Brief mailed Jul. 29, 2008, 2 pgs.
U.S. Appl. No. 09/976,301, Examiner Interview Summary mailed Sep. 9, 2009, 4 pgs.
U.S. Appl. No. 09/976,301, Final Office Action mailed Mar. 17, 2008, 14 pgs.
U.S. Appl. No. 09/976,301, Final Office Action mailed Jun. 4, 2009, 15 pgs.
U.S. Appl. No. 09/976,301, Final Office Action mailed Jul. 13, 2005, 11 pgs.
U.S. Appl. No. 09/976,301, Final Office Action mailed Aug. 25, 2006, 14 pgs.
U.S. Appl. No. 09/976,301, Non Final Office Action mailed Mar. 9, 2007, 13 pgs.
U.S. Appl. No. 09/976,301, Non Final Office Action mailed Sep. 13, 2007, 12 pgs.
U.S. Appl. No. 09/976,301, Non Final Office Action mailed Nov. 24, 2004, 31 pgs.
U.S. Appl. No. 09/976,301, Non Final Office Action mailed Dec. 16, 2005, 17 pgs.
U.S. Appl. No. 09/976,301, Non-Final Office Action mailed Dec. 23, 2008, 23 pgs.
U.S. Appl. No. 09/976,301, Notice of Allowance mailed Dec. 2, 2009, 13 pgs.
U.S. Appl. No. 09/976,301, Pre-Appeal Brief Request filed Jun. 16, 2008, 5 pgs.
U.S. Appl. No. 09/976,301, PTO Response to 312 Amendment mailed Feb. 3, 2010, 2 pgs.
U.S. Appl. No. 09/976,301, Response filed Mar. 23, 2009 to Non Final Office Action mailed Dec. 23, 2008, 19 pgs.
U.S. Appl. No. 09/976,301, Response filed Apr. 6, 2005 to Non Final Office Action mailed Nov. 24, 2004, 15 pgs.
U.S. Appl. No. 09/976,301, Response filed May 16, 2006 to Non Final Office Action mailed Dec. 16, 2005, 24 pgs.
U.S. Appl. No. 09/976,301, Response filed May 19, 2008 to Final Office Action mailed Mar. 17, 2008, 19 pgs.
U.S. Appl. No. 09/976,301, Response filed Jun. 7, 2007 to Non Final Office Action mailed Mar. 9, 2007, 7 pgs.
U.S. Appl. No. 09/976,301, Response filed Aug. 4, 2009 to Final Office Action mailed Jun. 4, 2009, 15 pgs.
U.S. Appl. No. 09/976,301, Response filed Sep. 13, 2005 to Final Office Action mailed Jul. 13, 2005, 13 pgs.
U.S. Appl. No. 09/976,301, Response filed Sep. 29, 2008 to Final Office Action mailed Mar. 17, 2008, 19 pgs.
U.S. Appl. No. 09/976,301, Response filed Oct. 13, 2005 to Advisory Action mailed Sep. 30, 2005, 14 pgs.
U.S. Appl. No. 09/976,301, Response filed Oct. 24, 2006 to Final Office Action mailed Aug. 25, 2006, 6 pgs.
U.S. Appl. No. 09/976,301, Response filed Dec. 13, 2007 to Non-Final Office Action mailed Sep. 13, 2007, 17 pgs.
U.S. Appl. No. 09/976,301, Response filed Dec. 20, 2006 to Advisory Action mailed Nov. 30, 2006, 16 pgs.
U.S. Appl. No. 09/976,301, Response filed Sep. 4, 2009 to Final Office Action mailed Jun. 4, 2009, 20 pgs.
U.S. Appl. No. 10/252,126, Appeal Brief filed Feb. 4, 2009, 22 pgs.
U.S. Appl. No. 10/252,126, Examiner's Answer to Appeal Brief mailed Apr. 29, 2009, 12 pgs.
U.S. Appl. No. 10/252,126, Final Office Action mailed Feb. 26, 2008, 12 pgs.
U.S. Appl. No. 10/252,126, Final Office Action mailed Jun. 27, 2006, 11 pgs.
U.S. Appl. No. 10/252,126, Final Office Action mailed Sep. 4, 2008, 13 pgs.
U.S. Appl. No. 10/252,126, Non Final Office Action mailed Jan. 30, 2007, 9 pgs.
U.S. Appl. No. 10/252,126, Non Final Office Action mailed Feb. 3, 2006, 8 pgs.
U.S. Appl. No. 10/252,126, Non Final Office Action mailed Aug. 20, 2007, 8 pgs.
U.S. Appl. No. 10/252,126, Notice of Allowance mailed Dec. 30, 2010, 13 pgs.
U.S. Appl. No. 10/252,126, Response filed May 3, 2006 to Non Final Office Action mailed Feb. 3, 2006, 7 pgs.
U.S. Appl. No. 10/252,126, Response filed Jun. 25, 2007 to Non Final Office Action mailed Jan. 30, 2007, 11 pgs.
U.S. Appl. No. 10/252,126, Response filed Jul. 28, 2008 to Final Office Action mailed Feb. 26, 2008, 7 pgs.
U.S. Appl. No. 10/252,126, Response filed Oct. 27, 2006 to Final Office Action mailed Jun. 27, 2006, 8 pgs.
U.S. Appl. No. 10/252,126, Response filed Dec. 20, 2007 to Non-Final Office Action mailed Aug. 20, 2007, 8 pgs.
U.S. Appl. No. 10/252,126, Response filed Dec. 29, 2005 to Restriction Requirement mailed Oct. 31, 2005, 5 pgs.
U.S. Appl. No. 10/252,126, Restriction Requirement mailed Oct. 31, 2005, 7 pgs.
U.S. Appl. No. 10/252,127, Advisory Action mailed Jan. 10, 2007, 3 pgs.
U.S. Appl. No. 10/252,127, Advisory Action mailed Mar. 29, 2010, 3 pgs.
U.S. Appl. No. 10/252,127, Advisory Action mailed May 1, 2008, 3 pgs.
U.S. Appl. No. 10/252,127, Advisory Action mailed Dec. 12, 2008, 3 pgs.
U.S. Appl. No. 10/252,127, Appeal Brief filed Mar. 11, 2009, 27 pgs.
U.S. Appl. No. 10/252,127, Decision on Pre-Appeal Brief mailed Feb. 11, 2009, 2 pgs.
U.S. Appl. No. 10/252,127, Decision on Pre-Appeal Brief mailed May 12, 2008, 3 pgs.
U.S. Appl. No. 10/252,127, Final Office Action mailed Jan. 7, 2010, 11 pgs.
U.S. Appl. No. 10/252,127, Final Office Action mailed Jan. 11, 2008, 11 pgs.
U.S. Appl. No. 10/252,127, Final Office Action mailed Sep. 4, 2008, 12 pgs.
U.S. Appl. No. 10/252,127, Final Office Action mailed Oct. 6, 2006, 10 pgs.
U.S. Appl. No. 10/252,127, Interview Summary filed Apr. 15, 2011, 2 pgs.
U.S. Appl. No. 10/252,127, Non Final Office Action mailed Mar. 21, 2006, 9 pgs.
U.S. Appl. No. 10/252,127, Non Final Office Action mailed Jul. 11, 2007, 9 pgs.
U.S. Appl. No. 10/252,127, Non-Final Office Action mailed Jun. 26, 2009, 14 pgs.
U.S. Appl. No. 10/252,127, Non-Final Office Action mailed Sep. 10, 2010, 11 pgs.

(56) References Cited

OTHER PUBLICATIONS

U.S. Appl. No. 10/252,127, Notice of Allowance mailed Mar. 18, 2011, 16 pgs.
U.S. Appl. No. 10/252,127, Notice of Allowance mailed Jul. 28, 2011, 6 pgs.
U.S. Appl. No. 10/252,127, Pre-Appeal Brief Request filed Jan. 5, 2009, 5 pgs.
U.S. Appl. No. 10/252,127, Pre-Appeal Brief Request filed Apr. 7, 2010, 5 pgs.
U.S. Appl. No. 10/252,127, Pre-Appeal Brief Request filed Apr. 10, 2008, 5 pgs.
U.S. Appl. No. 10/252,127, Response filed Jan. 14, 2011 to Non Final Office Action mailed Sep. 10, 2011, 18 pgs.
U.S. Appl. No. 10/252,127, Response filed Mar. 8, 2010 to Final Office Action mailed Jan. 7, 2010, 17 pgs.
U.S. Appl. No. 10/252,127, Response filed Mar. 27, 2008 to Final Office Action mailed Jan. 11, 2008, 16 pgs.
U.S. Appl. No. 10/252,127, Response filed Jun. 12, 2008 to Advisory Action mailed May 1, 2008, 16 pgs.
U.S. Appl. No. 10/252,127, Response filed Jun. 12, 2008 to Final Office Action mailed Jan. 11, 2008, 16 pgs.
U.S. Appl. No. 10/252,127, Response filed Jun. 21, 2006 to Non Final Office Action mailed Mar. 21, 2006, 8 pgs.
U.S. Appl. No. 10/252,127, Response filed Sep. 28, 2009 to Non Final Office Action mailed Jun. 26, 2009, 16 pgs.
U.S. Appl. No. 10/252,127, Response filed Oct. 11, 2007 to Non-Final Office Action mailed Jul. 11, 2007, 15 pgs.
U.S. Appl. No. 10/252,127, Response filed Nov. 4, 2008 to Final Office Action mailed Sep. 4, 2008, 22 pgs.
U.S. Appl. No. 10/252,127, Response filed Dec. 6, 2006 to Final Office Action mailed Oct. 6, 2006, 14 pgs.
U.S. Appl. No. 10/252,128, Appeal Brief filed Dec. 15, 2009, 23 pgs.
U.S. Appl. No. 10/252,128, Decision on Pre-Appeal Brief Request mailed Oct. 15, 2009, 2 pgs.
U.S. Appl. No. 10/252,128, Examiner's Answer to Appeal Brief mailed Mar. 31, 2010, 11 pgs.
U.S. Appl. No. 10/252,128, Final Office Action mailed Apr. 3, 2009, 27 pgs.
U.S. Appl. No. 10/252,128, Non-Final Office Action mailed Mar. 21, 2008, 12 pgs.
U.S. Appl. No. 10/252,128, Pre-Appeal Brief Request filed Aug. 3, 2009, 4 pgs.
U.S. Appl. No. 10/252,128, Response filed Jul. 21, 2008 to Non-Final Office Action mailed Mar. 21, 2008, 11 pgs.
U.S. Appl. No. 10/252,128, Response filed Dec. 23, 2008 to Restriction Requirement mailed Nov. 24, 2008, 10 pgs.
U.S. Appl. No. 10/252,128, Restriction Requirement mailed Nov. 24, 2008, 8 pgs.
U.S. Appl. No. 10/252,129, Advisory Action mailed Mar. 13, 2007, 3 pgs.
U.S. Appl. No. 10/252,129, Advisory Action mailed Sep. 2, 2009, 2 pgs.
U.S. Appl. No. 10/252,129, Advisory Action mailed Oct. 4, 2010, 3 pgs.
U.S. Appl. No. 10/252,129, Advisory Action mailed Oct. 6, 2009, 3 pgs.
U.S. Appl. No. 10/252,129, Advisory Action mailed Nov. 26, 2008, 3 pgs.
U.S. Appl. No. 10/252,129, Appeal Brief filed Jan. 24, 2011, 21 pgs.
U.S. Appl. No. 10/252,129, Appeal Brief filed Apr. 25, 2011, 32 pgs.
U.S. Appl. No. 10/252,129, Examiner Interview Summary mailed Mar. 19, 2008, 2 pgs.
U.S. Appl. No. 10/252,129, Examiner Interview Summary mailed Mar. 31, 2009, 2 pgs.
U.S. Appl. No. 10/252,129, Examiner Interview Summary mailed Jul. 11, 2008, 2 pgs.
U.S. Appl. No. 10/252,129, Examiner's Answer to Appeal Brief mailed May 13, 2011, 19 pgs.
U.S. Appl. No. 10/252,129, Final Office Action mailed Apr. 23, 2010, 18 pgs.
U.S. Appl. No. 10/252,129, Final Office Action mailed May 29, 2008, 9 pgs.
U.S. Appl. No. 10/252,129, Final Office Action mailed Jun. 18, 2009, 12 pgs.
U.S. Appl. No. 10/252,129, Final Office Action mailed Sep. 15, 2008, 11 pgs.
U.S. Appl. No. 10/252,129, Final Office Action mailed Oct. 5, 2007, 10 pgs.
U.S. Appl. No. 10/252,129, Final Office Action mailed Dec. 27, 2006, 12 pgs.
U.S. Appl. No. 10/252,129, Non Final Office Action mailed May 15, 2007, 10 pgs.
U.S. Appl. No. 10/252,129, Non Final Office Action mailed Aug. 18, 2006, 10 pgs.
U.S. Appl. No. 10/252,129, Non-Final Office Action mailed Jan. 14, 2008, 10 pgs.
U.S. Appl. No. 10/252,129, Non-Final Office Action mailed Feb. 10, 2009, 11 pgs.
U.S. Appl. No. 10/252,129, Non-Final Office Action mailed Nov. 12, 2009, 19 pgs.
U.S. Appl. No. 10/252,129, Response filed Feb. 12, 2010 to Non Final Office Action mailed Nov. 12, 2009, 20 pgs.
U.S. Appl. No. 10/252,129, Response filed Feb. 22, 2007 to Final Office Action mailed Dec. 27, 2006, 14 pgs.
U.S. Appl. No. 10/252,129, Response filed Apr. 14, 2008 to Non-Final Office Action mailed Jan. 14, 2008, 14 pgs.
U.S. Appl. No. 10/252,129, Response filed May 11, 2009 to Non Final Office Action mailed Feb. 10, 2009, 15 pgs.
U.S. Appl. No. 10/252,129, Response filed Jul. 31, 2008 to Final Office Action mailed May 29, 2008, 13 pgs.
U.S. Appl. No. 10/252,129, Response filed Aug. 13, 2007 to Non-Final Office Action mailed May 15, 2007, 16 pgs.
U.S. Appl. No. 10/252,129, Response filed Aug. 18, 2009 to Final Office Action mailed Jun. 18, 2009, 19 pgs.
U.S. Appl. No. 10/252,129, Response filed Sep. 18, 2009 to Advisory Action mailed Sep. 2, 2009, 19 pgs.
U.S. Appl. No. 10/252,129, Response filed Sep. 23, 2010 to Final Office Action mailed Apr. 23, 2010, 16 pgs.
U.S. Appl. No. 10/252,129, Response filed Oct. 5, 2006 to Non Final Office Action mailed Aug. 18, 2006, 15 pgs.
U.S. Appl. No. 10/252,129, Response filed Oct. 19, 2009 to Advisory Action mailed Oct. 6, 2009, 17 pgs.
U.S. Appl. No. 10/252,129, Response filed Nov. 11, 2008 to Final Office Action mailed Sep. 15, 2008, 14 pgs.
U.S. Appl. No. 10/252,129, Response filed Nov. 26, 2007 to Final Office Action mailed Oct. 5, 2007, 15 pgs.
U.S. Appl. No. 10/252,129, Response filed Dec. 2, 2008 to Final Office Action mailed Sep. 15, 2008, 14 pgs.
U.S. Appl. No. 10/407,756, Advisory Action mailed Apr. 3, 2009, 3 pgs.
U.S. Appl. No. 10/407,756, Appeal Brief filed Jul. 27, 2010, 27 pgs.
U.S. Appl. No. 10/407,756, Decision on Pre-Appeal Brief Request mailed May 27, 2010, 2 pgs.
U.S. Appl. No. 10/407,756, Final Office Action mailed Jan. 7, 2009, 28 pgs.
U.S. Appl. No. 10/407,756, Final Office Action mailed Jan. 15, 2010, 16 pgs.
U.S. Appl. No. 10/407,756, Non Final Office Action mailed Aug. 6, 2009, 14 pgs.
U.S. Appl. No. 10/407,756, Non-Final Office Action mailed Jun. 27, 2008, 10 pgs.
U.S. Appl. No. 10/407,756, Pre-Appeal Brief Request filed Apr. 15, 2010, 5 pgs.
U.S. Appl. No. 10/407,756, Preliminary Amendment filed Nov. 3, 2003, 12 pgs.
U.S. Appl. No. 10/407,756, Reply Brief filed Dec. 28, 2010, 3 pgs.
U.S. Appl. No. 10/407,756, Response filed Mar. 6, 2009 to Final Office Action mailed Jan. 7, 2009, 14 pgs.
U.S. Appl. No. 10/407,756, Response filed May 7, 2009 to Advisory Action mailed Apr. 3, 2009, 14 pgs.
U.S. Appl. No. 10/407,756, Response filed Sep. 26, 2008 to Non-Final Office Action mailed Jun. 27, 2008, 17 pgs.

(56) References Cited

OTHER PUBLICATIONS

U.S. Appl. No. 10/407,756, Response filed Nov. 6, 2009 to Non Final Office Action mailed Aug. 6, 2009, 14 pgs.
U.S. Appl. No. 10/607,587, Advisory Action mailed Jul. 2, 2008, 2 pgs.
U.S. Appl. No. 10/607,587, Advisory Action mailed Sep. 11, 2009, 2 pgs.
U.S. Appl. No. 10/607,587, Appeal Brief filed Dec. 9, 2009, 27 pgs.
U.S. Appl. No. 10/607,587, Decision on Appeals mailed Jan. 11, 2012, 10 pgs.
U.S. Appl. No. 10/607,587, Examiner's Answer received Feb. 4, 2010 to Appeal Brief filed Dec. 9, 2009, 29 pgs.
U.S. Appl. No. 10/607,587, Final Office Action mailed Apr. 21, 2008, 28 pgs.
U.S. Appl. No. 10/607,587, Final Office Action mailed Jun. 23, 2009, 11 pgs.
U.S. Appl. No. 10/607,587, Final Office Action mailed Oct. 25, 2012, 28 pgs.
U.S. Appl. No. 10/607,587, Non Final Office Action mailed Apr. 16, 2012, 22 pgs.
U.S. Appl. No. 10/607,587, Non-Final Office Action mailed Nov. 30, 2007, 19 pgs.
U.S. Appl. No. 10/607,587, Non-Final Office Action mailed Dec. 19, 2008, 31 pgs.
U.S. Appl. No. 10/607,587, Pre-Appeal Brief Request filed Sep. 23, 2009, 5 pgs.
U.S. Appl. No. 10/607,587, Response filed Feb. 28, 2008 to Non-Final Office Action mailed Nov. 30, 2007, 15 pgs.
U.S. Appl. No. 10/607,587, Response filed Mar. 12, 2012 to Decision on Appeal mailed Jan. 11, 2012 and to Final Office Action mailed Jun. 23, 2009, 11 pgs.
U.S. Appl. No. 10/607,587, Response filed Mar. 19, 2009 to Non Final Office Action mailed Dec. 19, 2008, 12 pgs.
U.S. Appl. No. 10/607,587, Response filed Jun. 19, 2008 to Final Office Action mailed Apr. 21, 2008, 17 pgs.
U.S. Appl. No. 10/607,587, Response filed Aug. 15, 2012 to Non Final Office Action mailed Apr. 16, 2012, 12 pgs.
U.S. Appl. No. 10/607,587, Response filed Aug. 21, 2009 to Final Office Action mailed Jun. 23, 2009, 13 pgs.
U.S. Appl. No. 10/607,587, Response filed Oct. 16, 2008 to Final Office Action mailed Apr. 21, 2008, 15 pgs.
U.S. Appl. No. 10/608,525, Advisory Action mailed Sep. 8, 2009, 3 pgs.
U.S. Appl. No. 10/608,525, Advisory Action mailed Jul. 29, 2008, 3 pgs.
U.S. Appl. No. 10/608,525, Decision on Pre-Appeal Brief Request mailed Sep. 12, 2008, 2 pgs.
U.S. Appl. No. 10/608,525, Decision on Pre-Appeal Brief Request mailed Nov. 17, 2009, 2 pgs.
U.S. Appl. No. 10/608,525, Final Office Action mailed May 1, 2008, 8 pgs.
U.S. Appl. No. 10/608,525, Final Office Action mailed Jun. 26, 2009, 11 pgs.
U.S. Appl. No. 10/608,525, Non-Final Office Action mailed Sep. 11, 2007, 6 pgs.
U.S. Appl. No. 10/608,525, Non-Final Office Action mailed Dec. 16, 2008, 14 pgs.
U.S. Appl. No. 10/608,525, Notice of Allowance mailed Feb. 8, 2010, 6 pgs.
U.S. Appl. No. 10/608,525, Pre-Appeal Brief Request filed Sep. 28, 2009, 5 pgs.
U.S. Appl. No. 10/608,525, Pre-Appeal Brief Request mailed Jul. 31, 2008, 2 pgs.
U.S. Appl. No. 10/608,525, Response filed Jan. 11, 2008 to Non-Final Office Action mailed Sep. 11, 2007, 15 pgs.
U.S. Appl. No. 10/608,525, Response filed Mar. 16, 2009 to Non-Final Office Action mailed Dec. 16, 2008, 15 pgs.
U.S. Appl. No. 10/608,525, Response filed Jul. 1, 2008 to Final Office Action mailed May 1, 2008, 15 pgs.
U.S. Appl. No. 10/608,525, Response filed Aug. 21, 2009 to Final Office Action mailed Jun. 26, 2009, 16 pgs.
U.S. Appl. No. 10/608,525, Response filed Oct. 16, 2008 to Final Office Action mailed May 1, 2008, 17 pgs.
U.S. Appl. No. 10/831,421, Response filed Sep. 7, 2012 to Non Final Office Action mailed May 10, 2012, 9 pgs.
U.S. Appl. No. 10/831,421, Final Office Action mailed Jun. 13, 2008, 18 pgs.
U.S. Appl. No. 10/831,421, Final Office Action mailed Jul. 9, 2009, 18 pgs.
U.S. Appl. No. 10/831,421, Final Office Action mailed Aug. 31, 2011, 25 pgs.
U.S. Appl. No. 10/831,421, Final Office Action mailed Sep. 7, 2010, 20 pgs.
U.S. Appl. No. 10/831,421, Non Final Office Action mailed Mar. 14, 2011, 21 pgs.
U.S. Appl. No. 10/831,421, Non Final office Action mailed May 10, 2012, 34 pgs.
U.S. Appl. No. 10/831,421, Non-Final Office Action mailed Jan. 12, 2009, 16 pgs.
U.S. Appl. No. 10/831,421, Non-Final Office Action mailed Mar. 5, 2010, 20 pgs.
U.S. Appl. No. 10/831,421, Non-Final Office Action mailed Nov. 28, 2007, 12 pgs.
U.S. Appl. No. 10/831,421, Response filed Jan. 11, 2010 to Final Office Action mailed Jul. 9, 2009, 6 pgs.
U.S. Appl. No. 10/831,421, Response filed Feb. 28, 2008 to Non-Final Office Action mailed Nov. 28, 2007, 23 pgs.
U.S. Appl. No. 10/831,421, Response filed Apr. 13, 2009 to Non Final Office Action mailed Jan. 12, 2009, 18 pgs.
U.S. Appl. No. 10/831,421, Response filed Jul. 6, 2010 to Non Final Office Action mailed Mar. 5, 2010, 7 pgs.
U.S. Appl. No. 10/831,421, Response filed Oct. 10, 2008 to Final Office Action mailed Jun. 13, 2008, 20 pgs.
U.S. Appl. No. 10/831,421, Response filed Nov. 29, 2010 to Final Office Action mailed Sep. 7, 2010, 8 pgs.
U.S. Appl. No. 10/831,421, Response Filed Nov. 30, 2011 to Non-Final Office Action mailed Aug. 31, 2011, 11 pgs.
U.S. Appl. No. 10/831,421, Response filed Jun. 14, 2011 to Non Final Office Action mailed Mar. 14, 2011, 7 pgs.
U.S. Appl. No. 11/641,262, Advisory Action mailed Aug. 13, 2012, 3 pgs.
U.S. Appl. No. 11/641,262, Advisory Action mailed Oct. 21, 2010, 3 pgs.
U.S. Appl. No. 11/641,262, Decision from Pre-Appeal Brief mailed Oct. 3, 2012, 2 pgs.
U.S. Appl. No. 11/641,262, Decision on Pre-Appeal Brief Request mailed Dec. 6, 2010, 2 pgs.
U.S. Appl. No. 11/641,262, Final Office Action mailed May 23, 2012, 9 pgs.
U.S. Appl. No. 11/641,262, Final Office Action mailed Aug. 5, 2010, 12 pgs.
U.S. Appl. No. 11/641,262, Non Final Office Action mailed Nov. 2, 2011, 9 pgs.
U.S. Appl. No. 11/641,262, Non-Final Office Action mailed Mar. 11, 2010, 16 pgs.
U.S. Appl. No. 11/641,262, Pre-Appeal Brief Request filed Nov. 5, 2010, 5 pgs.
U.S. Appl. No. 11/641,262, Pre-Appeal Brief Request for Review filed Aug. 23, 2012, 5 pgs.
U.S. Appl. No. 11/641,262, Response filed Feb. 2, 2012 to Non Final Office Action mailed Nov. 2, 2011, 19 pgs.
U.S. Appl. No. 11/641,262, Response filed Jun. 11, 2010 to Non Final Office Action mailed Mar. 11, 2010, 18 pgs.
U.S. Appl. No. 11/641,262, Response filed Jul. 23, 2012 to Final Office Action mailed Mar. 23, 2012, 16 pgs.
U.S. Appl. No. 11/641,262, Response filed Oct. 5, 2010 to Final Office Action mailed Aug. 5, 2010, 15 pgs.
U.S. Appl. No. 11/647,728, Examiner Interview Summary mailed Aug. 11, 2010, 3 pgs.
U.S. Appl. No. 11/647,728, Final Office Action mailed Jul. 13, 2010, 17 pgs.

(56) References Cited

OTHER PUBLICATIONS

U.S. Appl. No. 11/647,728, Non-Final Office Action mailed Mar. 8, 2010, 18 pgs.
U.S. Appl. No. 11/647,728, Notice of Allowance mailed Oct. 19, 2010, 11 pgs.
U.S. Appl. No. 11/647,728, Response filed Jun. 8, 2010 to Non Final Office Action mailed Mar. 8, 2010, 13 pgs.
U.S. Appl. No. 11/647,728, Response filed Sep. 22, 2010 to Final Office Action mailed Jul. 13, 2010, 6 pgs.
U.S. Appl. No. 12/693,275, Response filed Mar. 19, 2012 to Non Final Office Action mailed Dec. 30, 2011, 13 pgs.
U.S. Appl. No. 12/693,275, Non Final Office Action Mailed Dec. 30, 2011, 6 pgs.
U.S. Appl. No. 12/693,275, Notice of Allowance mailed May 8, 2012, 11 pgs.
U.S. Appl. No. 12/783,458, Final Office Action mailed Sep. 25, 2012, 12 pgs.
U.S. Appl. No. 12/783,458, Non Final Office Action mailed Mar. 8, 2012, 16 pgs.
U.S. Appl. No. 12/783,458, Response filed Jun. 8, 2012 to Non Final Office Action mailed Mar. 8, 2012, 9 pgs.
U.S. Appl. No. 12/818,935, Non Final Office Action mailed Nov. 23, 2010, 6 pgs.
U.S. Appl. No. 12/818,935, Notice of Allowance mailed May 5, 2011, 7 pgs.
U.S. Appl. No. 12/818,935, Notice of Allowance mailed Aug. 5, 2011, 7 pgs.
U.S. Appl. No. 12/818,935, Response filed Feb. 17, 2010 to Non-Final Office Action mailed Nov. 23, 2010, 7 pgs.
U.S. Appl. No. 13/080,426, Non Final Office Action mailed Oct. 31, 2011, 8 pgs.
U.S. Appl. No. 13/080,426, Notice of Allowance mailed Jan. 26, 2012, 7 pgs.
U.S. Appl. No. 13/080,426, Notice of Allowance mailed Apr. 23, 2012, 7 pgs.
U.S. Appl. No. 13/080,426, Response filed Dec. 28, 2011 to Non Final Office Action mailed Oct. 31, 2011, 9 pgs.
U.S. Appl. No. 13/212,994, Non Final Office Action mailed Dec. 12, 2011, (Dec. 15, 2011), 7 pgs.
U.S. Appl. No. 13/212,994, Notice of Allowance mailed May 7, 2012, 8 pgs.
U.S. Appl. No. 13/212,994, Preliminary Amendment Filed Oct. 4, 2011, 3 pgs.
U.S. Appl. No. 13/212,994, Response filed Mar. 8, 2012 to Non Final Office Action mailed Dec. 12, 2011, 7 pgs.
U.S. Appl. No. 13/285,916, Non Final Office Action mailed Jun. 4, 2012, 16 pgs.
U.S. Appl. No. 13/285,916, Response filed Aug. 30, 2012 to Non Final Office Action mailed Jun. 4, 2012, 15 pgs.
U.S. Appl. No. 13/489,646, Non Final Office Action mailed Sep. 19, 2012, 8 pgs.
"Auction Watch: Buyer and Seller Services", [Online]. Retrieved from the Internet: <URL: http://web.archive.org/web/20000830150100/http://www.auctionwatch.com>, (Aug. 15, 2000), 30 pgs.
"Auctionwatch", [Online]. Retrieved from the Internet: <URL: http://web.archive.org/web/20000830150100/http://www.auctionwatch.com>, (Aug. 15, 2008), 46 pgs.
"AuctionWatch.com", [Online]. Retrieved from the Internet: <URL: http://web.archive.org.web/200112171901 08/wsacp.auctionwatch.com/login.html?ret=/my/acp/>, (Dec. 17, 2001), 19 pgs.
"BarterBee.com: Buy, Sell, Why Points?", [Online]. Retrieved from the Internet: <URL: http://www.barterbee.com/xmain0003/?_hp=trade>, (Copyright 1948-2004), 1 pg.
"BarterBee.com: Help & FAQ", [Online]. Retrieved from the Internet: <URL: http://www.barterbee.com/xmain0005/?_hp=faq_4_requesting>, (Copyright 1948-2004), 2 pgs.
"BarterBee.com: Points Q & A", [Online]. Retrieved from the Internet: <URL: http://www.barterbee.com/xmain0003/?_hp=point>, (Copyright 1948-2004), 1 pg.
"Blackthorne Products Page", [Online]. Retrieved from the Internet: <URL: http://web.archive.org/web/19990508065201/ www.blackthornesw.com/Bthome/products>, (1999), 2 pgs.
Chinese Application Serial No. 200480015567.0, Final Office Action mailed Jan. 19, 2011, with English translation of claims, 14 pgs.
"DHL and UPS offer country-specific services", Transportation and distribution, vol. 38, Iss. 12, (Dec. 1997), 18.
"Ebay—Your Personal Trading Community", [Online]. Retrieved from the Internet: <URL: http://web.archive.org/web/19991007062815/www.ebay.com>, (Oct. 1999), 23 pgs.
European Application Serial No. 01959319.3, Office Action mailed May 15, 2007, 3 pgs.
European Application Serial No. 01959319.3, Response filed Nov. 23, 2007 to Office Action mailed May 15, 2007, 23 pgs.
European Application Serial No. 01959319.3, Summons to Attend Oral Proceedings mailed Jul. 13, 2012, 3 pgs.
European Application Serial No. 02723169.5 Response filed Jun. 14, 2011 to Office Action mailed Feb. 15, 2011, 12 pgs.
European Application Serial No. 02723169.5, Office Action mailed Feb. 20, 2008, 6 pgs.
European Application Serial No. 02723169.5, Supplementary European Search Report mailed Sep. 26, 2006, 3 pgs.
European Application Serial No. 03757395.3, Office Action mailed Oct. 8, 2010, 3 pgs.
European Application Serial No. 03757395.3, Office Action Response filed Apr. 18, 2011, 9 pgs.
European Application Serial No. 03757395.3, Search Report mailed Sep. 4, 2009, 2 pgs.
European Application Serial No. 02723169.5, Office Action mailed Feb. 15, 2011, 4 pgs.
"Frequently Asked Questions about Mister Lister", [Online]. Retrieved from the Internet: <URL: http://pages.ebay.co.uk/help/sellerguide/mr-lister-faq.html>, (Copyright 1995-2005), 5 pgs.
"Google looking at more Country Specific Domains", Europmedia, (Jan. 17, 2002), 1 pg.
"Hello direct store joins eBay network of merchants", PR Newswire, New York, NY, (May 23, 2002), 2 pgs.
International Application Serial No. 1921/KOLNP/2004, First Examination Report mailed Apr. 7, 2008, 11 pgs.
International Application Serial No. PCT/US00/17136 International Search Report mailed Nov. 16, 2000, 6 pgs.
International Application Serial No. PCT/US00/17136, International Search Report mailed Nov. 16, 2000, 5 pgs.
International Application Serial No. PCT/US00/32088, International Search Report mailed Apr. 4, 2001, 6 pgs.
International Application Serial No. PCT/US01/02584, International Search Report mailed Apr. 16, 2001, 4 pgs.
International Application Serial No. PCT/US01/04811, International Search Report mailed Jun. 28, 2001, 6 pgs.
International Application Serial No. PCT/US01/12398 International Search Report mailed Aug. 27, 2001, 3 pgs.
International Application Serial No. PCT/US01/23854, International Preliminary Examination Report mailed Aug. 19, 2002, 3 pgs.
International Application Serial No. PCT/US01/23854, International Search Report mailed Dec. 28, 2001, 3 pgs.
International Application Serial No. PCT/US01/23854, International Search Report mailed Dec. 28, 2001, 6 pgs.
International Application Serial No. PCT/US02/04692, International Search Report mailed Jun. 12, 2002, 5 pgs.
International Application Serial No. PCT/US03/17915, International Preliminary Examination Report mailed Mar. 26, 2004, 10 pgs.
International Application Serial No. PCT/US03/17915, International Search Report mailed Nov. 26, 2003, 6 pgs.
International Application Serial No. PCT/US04/10084, International Search Report and Written Opinion mailed Mar. 17, 2005, 18 Pages.
International Application Serial No. PCT/US99/18510, International Search Report mailed Oct. 29, 1999, 4 pgs.
International Application Serial No. PCT/US99/29312, International Search Report mailed Apr. 18, 2000, 6 pgs.
"New eBay-like auction software released", Business Wire, Business Editors/High-Tech Writers; Business Wire; New York, (Mar. 17, 1999), 2 pgs.

(56) References Cited

OTHER PUBLICATIONS

"OED Online Main entry text Frame", [Online]. <URL: http://dictionary.oed.com/cgi/entry_main/50218727?query_type=word&queryword=select&first=1&max_to show+10&sort at Http://dictionary.oed.com/cgi/entry_main/50218727?query_type=word&queryword=approve&first=1&max_to show+10&sort>, (Accessed Apr. 14, 2008), 8 pgs.

"Onsale Joins Fray as Online Shopping Picks Up Speed: Internet Booms", Computer Reseller News, CMP Publications, Inc., USA, (Jun. 5, 1995), 1 pg.

"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.

"Peerflix: How it Works", Copyright © 2004-2006 Peerflix, Inc., [Online]. Retrieved from the Internet: <URL: http://www.peerflix.com/Default.aspx?tabid=64>, (Accessed Aug. 14, 2006), 2 pgs.

"Peerflix: Netflix, Blockbuster and Peerflix: Compare Online DVD Rentals vs. Buying vs. Trading", Copyright © 2004-2006 Peerflix, Inc., [Online]. Retrieved from the Internet: <URL: http://www.peerflix.com/Default.aspx?tabid=171>, (Accessed Aug. 14, 2006), 2 pgs.

"Photodisc localizes Internet presence to better serve global markets;Adds country-specific content and languages to its Award -wining Websites", Business Wire, (May 27, 1998), 3 pgs.

"PSINet Teams with WorldPay Ltd. to Launch the World's First Secure Multi-Currency Solution for International Electronic Commerce", PR Newswire Association, (Oct. 6, 1997), 3 pgs.

"RSA signs deal with China", Internet Week, 2(7), (Feb. 12, 1996), 2 pgs.

"Thin Client", (c) Wikipedia, [Online]. Retrieved from the Internet: <URL:http://en.wikipedia.org/wiki/Thin_client>, (Accessed Feb. 15, 2008), 13 pgs.

"Thin Client Computing", [Online]. Retrieved from the Internet: <URL: http://web.archive.org/web/20040122033629/http://www.thinclient.net>, (Jan. 22, 2004), 24 pgs.

"Yahoo Homepage", Internet Archive Wayback Machine, http://web.archive.org/web/19991003015603/http://www.yahoo.com/index.html, (Oct. 3, 1999), 1 p.

"Yahoo!—Regional:Countries:Afghanistan", Copyright © 1994-97 Yahoo! Inc., [Online]. Retrieved from the Internet: <URL: http://web.archive.org/web/20060921181441/ http://dir.yahoo.com/Regional/countries/afghanistan>, (Jun. 16, 1997), 1 pg.

"Yahoo!—Regional:Countries:Sweden", Copyright © 1994-97 Yahoo! Inc., [Online]. Retrieved from the Internet: <URL: http://web.archive.org/web/19970616194441/www.yahoo.com/Regional/Countries/Sweden/>, (Jun. 16, 1997), 2 pgs.

"Yahoo! Auctions Celebrates One-Year Anniversary; As Online Auction Usage Continues to Grow, Yahoo! is Quickly Becoming the World Marketplace of the New Millennium", Business Wire, (Sep. 14, 1999), 3 pages.

Akin, David, "Web retailing gains market muscle as concerns fade: Record season: Increasing number of sites catering for Canadian dollars", Financial Post, p. 04, XP002905105, (Dec. 26, 1998), 3 pages.

Alice, Michele, "eBay's 'Mister Lister' Auction Management Software", Auctionbytes-Update, No. 22, [Online]. Retrieved from the Internet: <URL: http://www.auctionbytes.com/cab/abu/y200/m09/abu0022/s05>, (Sep. 24, 2000), 3 pgs.

Asbrand, Deborah, "Taking Stock in Trading Exchanges", [Online]. Retrieved from the Internet: <URL: http://www.reed-electronics.com/eb-mag/index.asp?layout=articlePrint&articleID=CA42124>, (Apr. 1, 2000), 5 pgs.

Auctionwatch.com, et al., AuctionWatch.com's Official Guide to Online Buying and Selling: Professional Tips, Tactics and Techniques at Your Fingertips., Prima Publishing, Roseville, CA. ISBN 0-7615-2999-3, (2000), 307 pgs.

Auctionwatch.com, et al., "AuctionWatch CD", AuctionWatch.com's Official Guide to Online Buying and Selling: Professional Tips, Tactics and Techniques at Your Fingertips., Prima Publishing, Roseville, CA., (2000).

Baumann, G. W., "Personal Optimized Decision/Transaction Program", IBM Technical Disclosure Bulletin,, (Jan. 1995), 83-84.

Bers, Joanna Smith, "Cyberspace: The new promised land", Bank Systems & Technology, 32(7), (Jul. 1995), 32-37.

Bidnbuy, "Going, going, virtually gone . . . ", Business and Finance Dialog File 20#06012646, (Jun. 17, 1999), 3 pgs.

Business Wire, "Bay Builder Releases Major Innovation for Online Wireless Auctions.", Recovered via Dialog Database on Feb. 15, 2008, (Mar. 10, 2000), 2 pgs.

Business Wire, "Mediappraise Receives National Award for Web-based Technology That Enables Companies to Solve Thorny HR Problem", Business Wire, (Dec. 14, 1998), 1-2.

Business Wire, "Subasta.com Enters Into Strategic Partnership with From2.com", Business Wire, Obtained from Proquest, Document No. 43206061, (Jul. 16, 1999), 2 pages.

Business Wire, "Subasta.com, the Premier Online Auction Board for Latin America, Spain, and the Hispanic Sector of the U.S., Has Attracted Over 60,000 Viewers in Less Than Two Months!", Business Wire, (Jul. 16, 1999), 2 pages.

Business Wire, "Yahoo! Launches Three New European Auctions Services;Yahoo! Italy, Yahoo! Spain and Yahoo! Sweden Unveil New Local Auctions", Business Wire, Obtained from Proquest, Document No. 45061209, (Sep. 23, 1999), 3 pages.

Chan, H. C., et al., "Design and implementation of a mobile agent-based auction system", Communications, Computers and signal Processing, 2001. PACRIM. 2001 IEEE Pacific Rim Conference, vol. 2, (Aug. 26-28, 2001), 740-743.

Chapman, Robert L, et al., Roget's International thesaurus fourth, Thomas Y Crowell, Publishers New York sec 637, (1997), 3 pgs.

Chen, Jian, "Bidders strategy under group-buying auction on the Internet", Systems, Man and Cybernetics, Part A, IEEE Transactions on, vol. 32 Issue: 6, (Nov. 2002), 680-690.

Clemons, E., "Evaluating the prospects for alternative electronic securities", Proceedings of ICIS 91: 12th International Conference on Information Systems, (Dec. 16-18, 1991), 53-61.

Cohen, Jackie, "Citibank's Bid to be the King of Cash (Citibank unveils Electronic Monetary System prototype, a digital currency system capable of replacing all current monetary systems)", Bank Technology News, 9(9), (Sep. 1996), p. 9+.

Collete, Stacy, "Thin Clients Pull in Car Customers: Auto Auction company eyes move to Web.(Industry Trend or Event)", Computerworld recovered via dialog database on Feb. 15, 2008, (Apr. 5, 1999), p. 41(1).

Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Document No. 46338867, (Nov. 15, 1999), 5 pages.

Creed, Adam, "Haggling Online in the Philippines—Magtawaran Auction site—Company Business and Marketing—Brief Article", Newsbytes News Network, http://www.findarticles.com/p/articles/mi_m0NEW/is_2000_May_1/ai_61859593, (May 1, 2000), Web Page.

Dalton, Gary, "Going, Going, Gone!—E-commerce is leading to an anything-goes environment of online bidding and dynamic pricing", Information Week, http://www.informationweek.com/755/auction.htm, (Oct. 4, 1999), 4 pages.

Davidow, Emily, "The dynamics of pricing", Home Textiles Today, (Feb. 2000), p. 42.

Edwards, Mark, "Your Web Browser is Bugged", Windows IT Pro, http://www.windowsitpro.com/WindowsSecurity/Article/ArticleID/9543/WindowsSecurity_9543.html, (Jul. 13, 2000), 3 pages.

Edwards, Morris, "New B2B player spreads benefits of e-commerce", Communications News, (Jan. 2001), 4 pages.

Fisher, Dennis, "More Goods on the Block", EWeek, (Dec. 2000), 4 pages.

(56) References Cited

OTHER PUBLICATIONS

Franse, Karen, "Distribution Briefs—Are Auctions in Vogue?", Var Business, http://www.varbusiness.com/sections/strategy/strategy.jhtml?articleId=18828086, (Mar. 11, 2002), 2 pages.
Goldsborough, Reid, "Internet Auctions Examined", Link-Up, 17, (Nov./Dec. 2000), p. 24.
Goldstein, D E, "Medical E-procurement-navigating in a B2B Market", Health Management Technology, 21(8), (Aug. 2000), 30-6.
Graham, Ian, "The Emergence of Linked Fish Markets in Europe", Electronic Markets. vol. 8, No. 2, (1998), 1-4.
Greengard, Samuel, "What Traffic Will Bear", BusinessFinanceMag.com, http://www.businessfinancemag.com/magazine/archives/article.html?articleID=13725, (Mar. 2001), 4 pages.
Grubbs, L., "Top 5 auction utilities", PC World.com, San Francisco, CA, (Dec. 4, 2000), 2 pgs.
Gupta, Pankaj, "Most Flexible FF?", Google Groups, (Oct. 29, 1996), 2 pages.
Hansell, Saul, "Meg Whitman and eBay, Net Survivors", New York Times, (May 5, 2002), 5 pgs.
Hauser, R., "Anonymous Delivery of Goods in Electronic Commerce", IBM Technical Disclosure Bulletin, 39(3), (Mar. 1996), 363-366.
Hess, C. M, et al., "Computerized Loan Organization System: An Industry Case Study of the Electronic Markets Hypothesis", MIS Quarterly, vol. 18(3), (Sep. 1994), 251-274.
Hutchinson, Art, "E- Commerce : Building a Model", Art. Communications Week recovered via Dialog Database on Feb. 15, 2008., (Mar. 17, 1997), p. 57.
Jaroneczyk, Jennifer, "Sold on an Old Idea", Internet World Magazine, (Feb. 15, 2001), 3 pages.
Kalin, Sari, "Mar. 2001", Darwin, http://www.darwinmag.com/read/040101/low.html, (Apr. 2001), 5 pages.
Klein, Stefan, "Introduction to Electronic Auctions", Focus Theme, vol. 7, No. 4, (1997), 1-4.
Kumar, Manoj, et al., "Sales Promotions on the Internet", Proceedings of the Usenix Conference on E-commerce, (1998), 1-11.
Lassila, Ora, "Web metadata; A Matter of Semantics", IEEE Internet Computing, vol. 2 i4 p. 30 Proquest #1424143061, (1998), 15 pgs.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "Aucnet: Electronic Intermediary for Used-Car Transactions", Focus Theme, Electronic Markets, vol. 7, No. 4, (1997), 24-28.
Lee, Pui-Mun, et al., "Considering exchange rate movements in economic evaluation of foreign direct investments", Engineering Economist, 40(2), (Winter, 1995), 171-199.
Lindsay, Jeff, et al., "The Historic Use of Computerized Tools for Marketing and Market Research: A Brief Survey", Published as Document 6359D at IP.com, (Dec. 27, 2001), 20 pages.
M2 Presswire, "HP completes online strategy with launch of e-commerce site", Proquest#43225990, (Jun. 29, 1999), 3 pgs.
M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.
Malone, T., et al., "Electronic Markets and Electronic Hierarchies", Communications of the ACM, 14(25), (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
McClenahen, John, "Net Gains", Industry Week,Proquest # 41808971,., (May 17, 1999), 8 pgs.
McDougall, Bruce, "Electronic evolution", Canadian Banker, 102(5), (Sep.-Oct. 1995), p. 28(6).
McKendrick, Joseph, "Old Economy Players Step Up", EC World, (Nov. 2000), 35-44.
Meade, J., "Visual 360: A Performance Appraisal System That's 'Fun'", HR Magazine, Society for Human Resource Management., (Jul. 1999), 3 pgs.
Merlino, Laurel, "Auction Anxiety", Upside Today, (Oct. 2000), 247-251.
Merrill, K., "GE Capital to Extend Integrator Buying Spree", Computer Reseller News, (Jul. 1996), pp. 2 and 32.
Mitchell, Lori, "BayBuilder delivers easy, profitable reverse auctions", Infoworld, http://www.infoworld.com/articles/eu/xml/00/06/05/000605eubaybuilder.html, (Jun. 2, 2000), 6 pages.
Mollison, Caitlin, "America West Airlines opt for reverse auctions", Internet World, 8(4), (Apr. 1, 2002), 42(3).
Mollman, Steve, "Are you ready to bicker over the price of that sandwich? In the new economy you won't pay retail for anything.", PC/Computing, (Jan. 1, 2000), 8-10.
Morgan, Lisa, "Pick Your Lot: Build consumer-oriented auctions with AuctionBuilder", Internet Week, (Sep. 18, 2000), 4 pages.
Morin, Lee M.E., "Multilingual Communications Device", U.S. Appl. No. 08/200,049, filed Feb. 22, 1994, (Mar. 2, 2004), 7 pgs.
Neo, B. S, "The implementation of an electronic market for pig trading in Singapore", Journal of Strategic Information Systems; vol. 1(5), (Dec. 1992), 278-288.
Ohlson, Kathleen, "Looking behind, beyond B2B marketplace woes", Network World Fusion, http://www.nwfusion.com/archive/2001/119669_06-11-2011.html, (Jun. 11, 2001), 4 pages.
Patel, Jeetu, et al., "New Platform Options Fuel E-Commerce", Information Week,, http://www.informationweek.com/779/ecommerce.htm, (Mar. 27, 2000), 3 Pages.
Piccinelli, G, et al., "e-service composition: supporting dynamic definition of process-oriented negotiation parameters", 12th International Workshop on Database and Expert Systems Applications, 2001. Proceedings., (Sep. 3-7 , 2001), 727-731.
Pollick, M., "Sold! on eBay: As antique and collectible dealers see their sales increase through online auctions such as eBay, more of them are deciding that the internet is not something to be afraid of", Sarasota Herald Tribune, Obtained from Proquest, Document No. 45499060, (Oct. 11, 1999), 8 pages.
Post, D. L, et al., "Application of auctions as a pricing mechanism for the interchange of electric power", IEEE Transactions on Power Systems, 10(3), (Aug. 1995), 1580-1584.
PR Newswire Europe Ltd., "Mitsubishi Venture, Wells Fargo Partner to Offer Multi-Currency E-Commerce Storefront", PR Newswire, Obtained from Proquest, Document No. 39345965, (Mar. 1, 1999), 3 pages.
Preist, Chris, et al., "Adaptive Agents in a Persistent Shout Double Auction", International Conference on Information and Computation Economies, Proceedings of the first international conference on Information and computation economies, (1999), 11-18.
Pressler, Margaret, "Sells on eBay; Housewife finds herself head of multinational software firm", Washington Post, Proquest # 44484325, (Sep. 5, 1999), 3 pgs.
Queree, Anne, "Bid it Out", Global Finance, (Jan. 2000), 36-37.
Reck, Martin, "Trading-Process Characteristics of Electronic Auctions", Focus Theme, vol. 7, No. 4, (1997), 17-23.
Resnick, Paul, "Reputation systems", Communications of the ACM, 43(12), (Dec. 2000), 45-48.
Rockoff, T. E, et al., "Design of an Internet-based system for remote Dutch auctions", Internet Research: Electronic Networking Applications and Policy, vol. 5(4), (Jan. 1, 1995), 10-16.
Schmid, B. F, "The Development of Electronic Commerce", EM—Electronic Markets, No. 9-10, (Oct. 1993), 2 pgs.
Schneider, G. M, et al., "An Introduction to Programming and Problem Solving with Pascal", An Introduction to Programming and Problem Solving with Pascal, Second Edition, John Wiley & Sons, Inc., New York, (1982), 3 Pages.
Siegmann, Ken, "Nowhere to go but up", PC Week; vol. 12(42), Ziff-Davis Publishing Company, (Oct. 23, 1995), 1-3.
Strassmann, Paul, "The Impact of B2B", Computerworld, (Oct. 2, 2000), 3 pages.

(56) References Cited

OTHER PUBLICATIONS

Tak, Y., et al., "The SIFT Information Dissemination System", ACM Transactions on Database Systems. vol. 24, Issue 4. ACM Press, (Dec. 1999), 529-565.

Tapscott, D., "eBay endagners traditional papers auctioneer can pack far more punch in your sales pitch", National Post, Proquest# 54945579, (Oct. 9, 1999), 3 pgs.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Turek, Norbert, "Online Portals Offer Bandwidth and Voice Services", Information Week, http://www.informationweek.com/784/bandwidth.htm, (May 1, 2000), 4 pages.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-15.

Weiss, Scott, "Pan-Am FF Program", Google Groups, (Oct. 16, 1996), 3 pages.

Wilson, D., "Going . . . Going . . . Gone!Bargain-hunters and collectors can scour auctions from home via the internet", The Gazette, Proquest #4116732, (Apr. 27, 1999), 4 pgs.

Wilson, T., "Act Globally, Think Locally", InternetWeek, Issue 789, Obtained from Proquest, Document No. 46352181, (Nov. 15, 1999), 4 p.

Wilson, Tim, "B2B Sellers Fight Back on Pricing", InternetWeek.com, http://www.internetweek.com/lead/lead121200.htm, (Dec. 12, 2000), 3 pages.

Zwass, V., "Electronic Commerce: Structures and Issues", International Journal of Electronic Commerce, Fall 1996, vol. 1, No. 1, (Fall 1996), 3-23.

U.S. Appl. No. 11/641,262, Reply Brief filed Jul. 10, 2013 in response to Examiner's Answer mailed May 10, 2013, 8 pgs.

U.S. Appl. No. 13/285,916, Non Final Office Action mailed Jul. 15, 2013, 17 pgs.

U.S. Appl. No. 09/602,110, Non Final Office Action mailed Aug. 14, 2013, 20 pgs.

U.S. Appl. No. 09/976,301, Examiner Interview Summary mailed Dec. 8, 2006, 4 pgs.

U.S. Appl. No. 10/252,126, Decision on Appeal mailed Sep. 15, 2010, 8 pgs.

U.S. Appl. No. 10/252,126, Examiner Interview Summary mailed Oct. 26, 2007, 1 pg.

U.S. Appl. No. 10/252,128, Decision on Appeal mailed Jan. 31, 2013, 6 pgs.

U.S. Appl. No. 10/252,129, Response filed Dec. 2, 2008 to Advisory Action mailed Nov. 26, 2008, 14 pgs.

U.S. Appl. No. 10/831,421 , Response filed Aug. 23, 2013 to Non Final Office Action mailed May 23, 2013, 12 pgs.

U.S. Appl. No. 10/831,421, Response filed Aug. 23, 2013 to Non Final Office Action mailed May 23, 2013, 12 pgs.

U.S. Appl. No. 12/783,458 , Response filed Aug. 15, 2013 to Non Final Office Action mailed May 10, 2013, 9 pgs.

U.S. Appl. No. 12/783,458, Response filed Jan. 18, 2013 to Final Office Action mailed Sep. 25, 2012, 10 pgs.

U.S. Appl. No. 13/567,902, Response filed Aug. 12, 2013 to Final Office Action mailed May 22, 2013, 12 pgs.

U.S. Appl. No. 10/831,421, Final Office Action mailed Oct. 16, 2013, 30 pgs.

U.S. Appl. No. 12/783,458, Notice of Allowance mailed Sep. 24, 2013, 6 pgs.

U.S. Appl. No. 13/285,916, Response filed Oct. 14, 2013 to Non Final Office Action mailed Jul. 15, 2013, 13 pgs.

"U.S. Appl. No. 09/602,110, Appeal Decision mailed May 29, 2013", 10 pgs.

"U.S. Appl. No. 09/602,110, Examiners Answer to Appeal Brief mailed Mar. 7, 2007", 13 pgs.

"U.S. Appl. No. 10/252,127, Decision on Pre-Appeal Brief Request mailed Feb. 11, 2009", 2 pgs.

"U.S. Appl. No. 10/252,127, Decision on Pre-Appeal Brief Request mailed May 12, 2008", 2 pgs.

"U.S. Appl. No. 10/252,127, Decision on Pre-Appeal Brief Request mailed May 14, 2010", 2 pgs.

"U.S. Appl. No. 10/252,128, Notice of Allowance mailed May 30, 2013", 9 pgs.

"U.S. Appl. No. 10/407,756, Appeal Decision mailed May 31, 2013", 10 pgs.

"U.S. Appl. No. 10/831,421, Examiner Interview Summary mailed Apr. 30, 2013", 3 pgs.

"U.S. Appl. No. 10/831,421, Final Office Action mailed Nov. 30, 2012", 30 pgs.

"U.S. Appl. No. 10/831,421, Non Final Office Action mailed May 23, 2013", 18 pgs.

"U.S. Appl. No. 10/831,421, Response filed 04-30-13 to Final Office Action mailed Nov. 30, 2012", 14 pgs.

"U.S. Appl. No. 11/641,262, Appeal Brief filed Jan. 3, 2013", 30 pgs.

"U.S. Appl. No. 11/641,262, Examiner's Answer mailed May 10, 2013", 10 pgs.

"U.S. Appl. No. 12/783,458, Non Final Office Action mailed May 10, 2013", 12 pgs.

"U.S. Appl. No. 13/285,916, Advisory Action mailed Jan. 30, 2013", 3 pgs.

"U.S. Appl. No. 13/285,916, Final Office Action mailed Nov. 21, 2012", 17 pgs.

"U.S. Appl. No. 13/285,916, Response filed Jan. 17, 2013 to Final Office Action mailed Nov. 21, 2012", 15 pgs.

"U.S. Appl. No. 13/489,646, 312 Amendment filed Mar. 7, 2013", 4 pgs.

"U.S. Appl. No. 13/489,646, Notice of Allowance mailed Jan. 10, 2013", 7 pgs.

"U.S. Appl. No. 13/489,646, PTO Response to 312 Amendment mailed Mar. 14, 2013", 2 pgs.

"U.S. Appl. No. 13/489,646, Response filed Dec. 3, 2012 to Non Final Office Action mailed Sep. 19, 2012", 11 pgs.

"U.S. Appl. No. 13/567,902, Final Office Action mailed May 22, 2013", 9 pgs.

"U.S. Appl. No. 13/567,902, Non Final Office Action mailed Dec. 20, 2012", 8 pgs.

"U.S. Appl. No. 13/567,902, Response filed Mar. 20, 2013 to Non Final Office Action mailed Dec. 20, 2012", 9 pgs.

\* cited by examiner

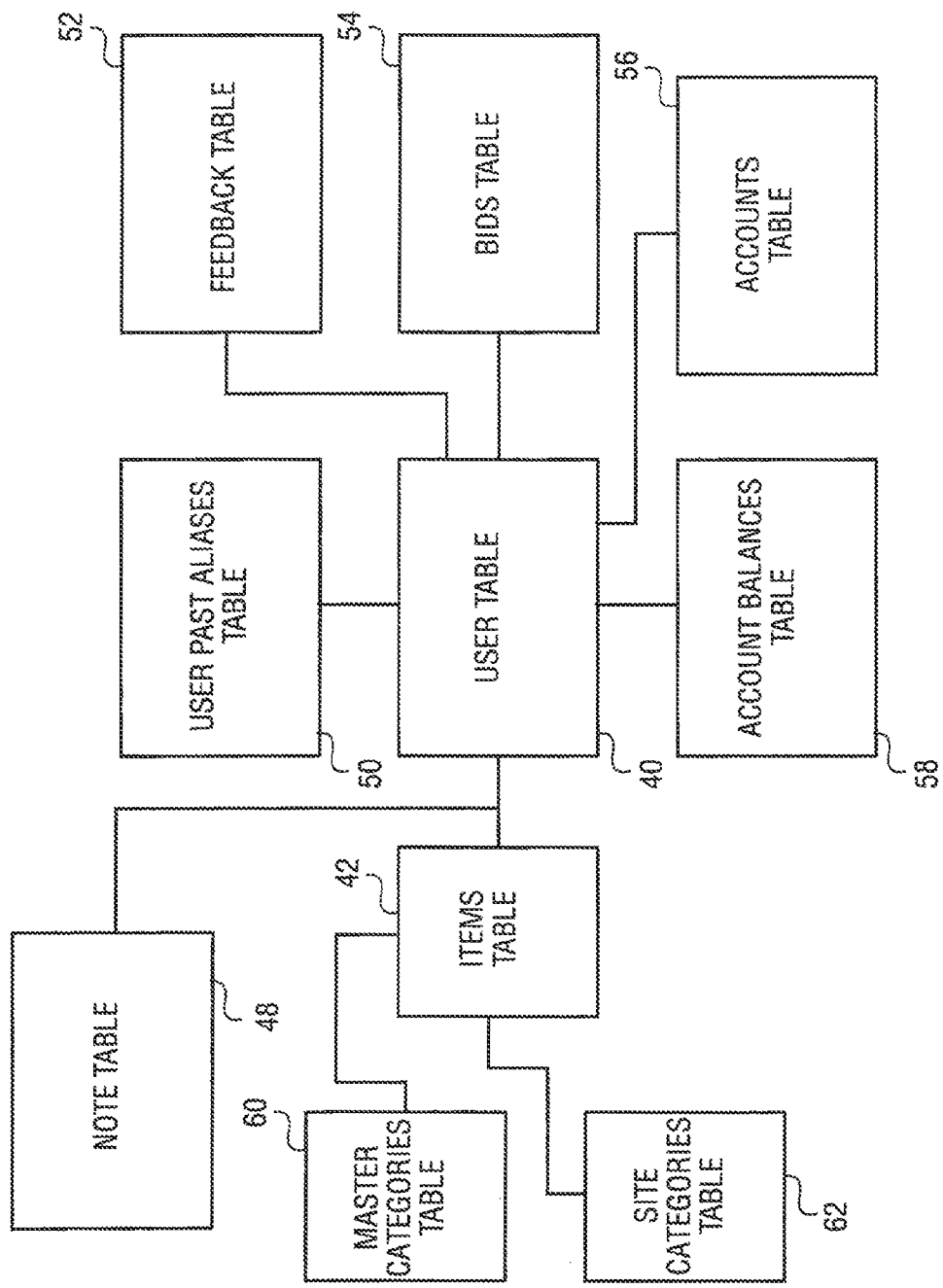

MASTER CATEGORIES TABLE ~60

- CATEGORY_ID
- NAME
- DESCRIPTION
- PARENT_ID
- PARENT_NAME

FIG. 3B

ITEMS TABLE ~62

- SITE_ID
- CATEGORY_ID
- NAME
- DESCRIPTION
- PARENT_ID
- PARENT_NAME
- CURRENCY
- LANGUAGE

Paranormal (14)
Poetry (4)
Religion (23)
Sports (87)
Travel (32)
True Crime (6)
Vehicles (173)

262

Featured Auctions in Books

There are no featured items in this category.
To find out how to be listed in this section and seen by thousands, please visit this link Featured Auctions

Items in Books
Current

You are on page 1 of 85. Next Page ▶

☐ = Gallery  ☐ = Picture  🔨 = Hot!

| Status | Item | Auction Price | Converted Amount* | Bids | Ends BST |
|---|---|---|---|---|---|
| ☐ | Dorothy Dunnett-Checkmate-UK 1st dj NR | £12.00 | | 1 | 07-Sep 21:35 |
| | Harry Potter Chamber Secrets UK Deluxe 1st Ed | £57.00 | | 10 | 07-Sep 21:38 |
| ☐ | P G Wodehouse. The Jeeves Cocktail book *Pic* | £26.32 | | 4 | 07-Sep 21:43 |
| | Morag Joss FEARFUL SYMMETRY 1st Ed. UK | £9.99 | | 1 | 07-Sep 21:45 |
| ☐ | William Morris Book Vintage Fabric. | US $26.00 | £18.10 | 3 | 07-Sep 21:47 |
| | Nick Hornby ABOUT A BOY 1st Ed. UK | £7.99 | | 1 | 07-Sep 21:48 |
| ☐ | John Le Carre Smiley's People First Ed 1980 | US $20.00 | £13.92 | - | 07-Sep 21:50 |
| ☐ | Wind off the Small Isles MARY STEWART '68 dj | US $26.75 | £18.62 | 9 | 07-Sep 21:50 |
| ☐ | Ogden Nash-Good Intentions-1st UK ed. 1943 | £3.50 | | - | 07-Sep 21:52 |
| | Knight Rider 1982 UK Annual | £1.00 | | - | 07-Sep 21:56 |
| | CAPTAINS LOG : UNAUTHORISED GUIDE (SCAN) | £4.00 | | - | 07-Sep 22:02 |
| ☐ | Soccer, Tactics and Skills (Football) | £1.35 | | - | 07-Sep 22:02 |
| | Star Wars - book of the original film. (pic) | £4.00 | | - | 07-Sep 22:03 |
| ☐ | The Crystal Cave MARY STEWART 1970 UK 1st dj | US $9.75 | £6.79 | - | 07-Sep 22:03 |
| | Fireball x15 1966 UK Annual RARE NEAR MNT pic | £36.00 | | 5 | 07-Sep 22:05 |
| ☐ | McDougalls Cookery Book | £2.00 | | 1 | 07-Sep 22:08 |
| ☐ | Be-Ro Home Recipes | £2.20 | | 2 | 07-Sep 22:08 |

FIG. 12B

| | | | | | |
|---|---|---|---|---|---|
| 📷 | Vintage textile Book Colour Prints Provence | US $50.00 | £34.80 | - | 07-Sep 22:09 |
| | Betty Neels - No need to say goodbye | US $2.00 | £1.39 | - | 07-Sep 22:14 |
| 📷 | In the Troll Wood illus. John Bauer | £10.50 | | 7 | 07-Sep 22:14 |
| | Betty Neels - Only by chance | US $2.00 | £1.39 | - | 07-Sep 22:14 |
| | Catalogue du Cabinet Secret du Prince Galitzi | £1.00 | | - | 07-Sep 22:17 |
| 📷 | The Hollow Hills MARY STEWART 1973 UK 1st dj | US $9.75 | £6.79 | 1 | 07-Sep 22:18 |
| | The Mists of Avalon. Marion Bradley | £2.00 | | - | 07-Sep 22:20 |
| | ILLUSTRATED HISTORY OF WELCH RUGBY UNION | £4.99 | | - | 07-Sep 22:22 |
| | Minette Walters - The Dark Room | US $2.00 | £1.39 | 1 | 07-Sep 22:22 |
| | Michael Moorcack - The Fortress of the Pearl | US $2.00 | £1.39 | - | 07-Sep 22:24 |
| | Day of Judgement. Jack Higgins. | £2.00 | | - | 07-Sep 22:24 |
| 📷 | INSOMNIA by Stephen King | US $13.00 | £9.05 | - | 07-Sep 22:24 |
| | E C Tubb - Kalin | US $2.00 | £1.39 | - | 07-Sep 22:25 |
| | Georgette Heyer - Beauvallet | US $2.00 | £1.39 | 1 | 07-Sep 22:26 |
| | Philippa Carr - A Time for Silence | US $2.00 | £1.39 | - | 07-Sep 22:27 |
| | Hawksmoor. Peter Ackroyd | £2.00 | | - | 07-Sep 22:27 |
| | Victoria Holt - My Enemy the Queen | US $2.00 | £1.39 | - | 07-Sep 22:27 |
| | Richard Laymon "Among The Missing" H/back | £2.00 | | 1 | 07-Sep 22:28 |
| | Victoria Holt - The Curse of the Kings | US $2.00 | £1.39 | - | 07-Sep 22:29 |
| | Catherine Cookson - Maggie Rowan | US $2.00 | £1.39 | - | 07-Sep 22:30 |
| | Catherine Cookson - Fanny McBride | US $2.00 | £1.39 | 1 | 07-Sep 22:31 |
| | The Horse Rampant. J. J. Pearce | £4.97 | | 2 | 07-Sep 22:31 |
| | Catherine Cookson - The Round Tower | US $2.00 | £1.39 | 1 | 07-Sep 22:32 |
| 📷 | 6 LADYBIRD BOOKS - DISNEY | £4.99 | | - | 07-Sep 22:35 |
| | Dogs Dogs Dogs Dogs Dogs. Paul Hamlyn Pub. | £2.00 | | 1 | 07-Sep 22:35 |
| 📷 | 4 Red Nose Readers - Ahlberg & McNaughton | £5.00 | | - | 07-Sep 22:35 |
| 🏠 📷 | Palestine Holy Land Syria 1902 Bk. Col Illus | US $59.95 | £41.73 | 1 | 07-Sep 22:36 |
| 📷 | LADYBIRD BOOKS SET - SAY THE SOUNDS | £4.99 | | 2 | 07-Sep 22:43 |
| | Catherine Cookson - A Grand Man | US $2.00 | £1.39 | 1 | 07-Sep 22:51 |
| | Catherine Cookson - The Nice Bloke | US $7.51 | £5.23 | 5 | 07-Sep 22:52 |

FIG. 12C

262 

| Catherine Cookson - The Black Candle | US $2.00 | £1.39 | - | 07-Sep 22:53 |
| Catherine Cookson - The Unbaited Trap | US $2.00 | £1.39 | 1 | 07-Sep 22:54 |
| Catherine Cookson - Mary Ann and Bill | US $5.01 | £3.49 | 2 | 07-Sep 22:55 |

For more items in this category, click these pages:
= 1 = 2 3 4 5 6 ... 20 ... 40 ... 60 ... 80 ... 85  (next page)

Click on a title to get a description and to bid on that item. A red ending time indicates that an auction is ending in less than five hours. These items are not verified by eBay; caveat emptor. This page is updated regularly; don't forget to use your browser's reload button for the latest version. The system may be unavailable during regularly scheduled maintenance - Please note the regularly scheduled maintenance time is Fridays, 09:00 to 11:00 BST (Fridays, 01:00 a.m. to 05:00 a.m., eBay time).

Updated: 07-Sep 21:30:05 BST Check eBay official time
Use your browser's reload button to see the latest version.

FIG. 12D

Nature (39)
New Age & Paranormal (70)
Poetry (7)
Religion & Philosophy (85)
Sports (39)
Travel (52)
True Crime (11)
Vehicles (47)

262

Featured Auctions in Books

= Gallery   = Picture   = Hot!

| Status | Item | Auction Price | Converted Amount* | Bids | Ends BST |
|---|---|---|---|---|---|
|  | ELLIOTT, NATURES LAW Stock market wave theory | AU $249.00 |  | - | 08-Sep 09:47 |
|  | CHARLES DICKENS - MARTIN CHUZZLEWIT 1844 1st | AU $349.00 |  | - | 14-Sep 11:31 |

To find out how to be listed in this section and seen by thousands, please visit this link Featured Auctions

Items in Books
Current

You are on page 1 of 66. Next Page ▶
 = Gallery   = Picture   = Hot!

| Status | Item | Auction Price | Converted Amount* | Bids | Ends BST |
|---|---|---|---|---|---|
|  | SAVAGE GARDEN - Pictorial Book With Poster | US $5.50 | AU $9.46 | 2 | 08-Sep 08:58 |
|  | ELLIOT, NATURES LAW Stock market wave theory | AU $249.00 |  | - | 08-Sep 09:47 |
|  | FAIRIES IN FRANCE---FELIX LORIOUX - OSTROGA | AU $129.00 |  | - | 08-Sep 09:50 |
|  | Remember - By Barbara Taylor Bradford | AU $3.00 |  | - | 08-Sep 09:51 |
|  | GEORGE RAWLINSON, ANCIENT EGYPT --------1895 | AU $39.00 |  | 1 | 08-Sep 09:52 |
|  | MONSARRAT, THE MASTER MARINER Vols 1&2 1st Ed | AU $39.00 |  | - | 08-Sep 09:53 |
|  | LANE-POOLE, THE BARBARY CORSAIRS 1896 pirates | AU $49.00 |  | 1 | 08-Sep 09:54 |
|  | What Katy Did At School - Susan Coolidge | AU $3.00 |  | - | 08-Sep 10:03 |
|  | Barb. Taylor Bradford - The Woman in his life | AU $3.00 |  | - | 08-Sep 10:09 |
|  | Wagon Train Emily Brown 1958 LGB | US $7.00 | AU $12.42 | - | 08-Sep 10:14 |

| | | | | | |
|---|---|---|---|---|---|
| | MASTER-STROKE...MARILYN SHARP | AU $1.00 | | - | 08-Sep 10:14 |
| | XAVIERA...BY XAVIERA HOLLANDER | AU $1.50 | | - | 08-Sep 10:16 |
| | THE KGB DIRECTIVE....RICHARD COX | AU $1.50 | | - | 08-Sep 10:17 |
| | THE COMMISSAR'S REPORT...MARTYN BURKE | AU $1.00 | | - | 08-Sep 10:18 |
| | THREADS...B A HIRSCH | AU $2.00 | | - | 08-Sep 10:19 |
| | Ann Rule 3-in-1 True Crime hardback w/dj | AU $17.00 | | 2 | 08-Sep 10:33 |
| | Star Trek Movie Memories new William Shatner | AU $4.40 | | 1 | 08-Sep 10:34 |
| | Star Trek Movie Memories new William Shatner | AU $4.40 | | - | 08-Sep 10:34 |
|  | TROUBLE FOR SKINHEAD RICHARD ALLEN 1974 BOOK | US $15.50 | AU $27.51 | 7 | 08-Sep 10:34 |
| | Ancestors - Robyn Davidson. | AU $3.00 | | - | 08-Sep 10:40 |
|  | GUNSMOKE Seymour Reit 1974 LGB | US $7.00 | AU $12.42 | - | 08-Sep 10:44 |
|  | PETER RABBIT-Beatrix Potter-Dinner Set-AUSSIE | US $19.99 | AU $35.48 | 1 | 08-Sep 11:01 |
|  | STRANGE CASE OF THE END OF CIVILISATION MOVIE | US $4.00 | AU $7.10 | 1 | 08-Sep 11:02 |
|  | KEN HOLT MYSTERY OF THE GREEN FLAME 1958 | US $4.00 | AU $7.10 | 2 | 08-Sep 11:29 |
|  | Tom & Jerry meet little Quack 1972 LGB | US $4.00 | AU $7.10 | - | 08-Sep 11:30 |
|  | Chitty Chitty Bang Bang 1974 LGB | US $8.00 | AU $14.20 | - | 08-Sep 11:42 |
|  | Biography-HENRY FONDA-1982-SB-career&personal | AU $6.50 | | - | 08-Sep 11:53 |
|  | Lassie & the Big Clean-up day 1972 LGB | US $7.00 | AU $12.42 | - | 08-Sep 11:58 |
|  | THE WOMAN AND THE CAR | US $25.00 | AU $44.37 | - | 08-Sep 12:07 |
|  | Christmas Carols RARE ERROR version LGB 1961 | US $7.00 | AU $12.42 | - | 08-Sep 12:10 |
|  | Disneys OLD YELLER LGB 1959 | US $7.00 | AU $12.42 | - | 08-Sep 12:14 |
|  | The Motoring Montagus. | US $15.00 | AU $26.62 | - | 08-Sep 12:20 |
|  | Disney SNOW WHITE & seven dwarfs LGB 1972 | US $7.00 | AU $12.42 | - | 08-Sep 12:23 |

FIG. 13C

262

| | | | | | |
|---|---|---|---|---|---|
| 📷 | Power Operated Hood s/Rolls-Royce/Bentley | US $12.00 | AU $21.30 | 2 | 08-Sep 12:30 |
| 📷 | ROLLS-ROYCE Coachwork Sketches. | US $18.50 | AU $32.83 | 4 | 08-Sep 12:41 |
| 📷 | TARZAN LGB 1964 edgar rice burroughs | US $7.00 | AU $12.42 | - | 08-Sep 12:48 |
| 📷 | The Three Litre BENTLEY | US $16.50 | AU $29.28 | 4 | 08-Sep 12:52 |
| 📷 | ROLLS-ROYCE. Bulletin. June 1939 | US $15.00 | AU $26.62 | - | 08-Sep 13:01 |
| | Sir John Constantine by "Q" | AU $5.00 | | - | 08-Sep 13:07 |
| 📷 | Hop, little Kangaroo 1973 LGB | AU $9.00 | | - | 08-Sep 13:14 |
| 📷 | Pepper plays Nurse 1964 LGB | AU $5.00 | | - | 08-Sep 13:35 |
| 📷 | AIREPLANES 1973 LGB | AU $6.00 | | - | 08-Sep 13:43 |
| 📷 | Dr Dan the bandage man 1977 LGB | AU $9.00 | | - | 08-Sep 13:54 |
| 📷 | Return to OZ 1985 LGB wizard of oz | AU $9.00 | | - | 08-Sep 14:01 |
| 📷 | disneys The Rescuers 1977 LGB | AU $9.00 | | - | 08-Sep 14:17 |
| 📷 | Jack & the Beanstalk 1955 LGB | AU $9.00 | | - | 08-Sep 14:24 |
| 📷 | Johann Wolfgang von Goethe life mask faust | US $49.00 | AU $86.96 | - | 08-Sep 14:24 |
| 📷 | ENID BLYTON - FAMOUS FIVE X 2 STORIES | US $2.00 | AU $3.55 | - | 08-Sep 14:30 |
| 📷 | JOHN KEATS LIFE MASK POET SHELLEY | US $39.00 | AU $69.22 | - | 08-Sep 14:31 |
| 📷 | ENID BLYTON - 10 x MYSTERY AND ADVENTURE - PB | US $4.99 | AU $8.86 | - | 08-Sep 14:41 |

For more items in this category, click these pages:
= 1 = 2 3 4 5 6 ... 20 ... 40 ... 60 ... 66 (next page)

Click on a title to get a description and to bid on that item. A red ending time indicates that an auction is ending in less than five hours. These items are not verified by eBay; caveat emptor. This page is updated regularly; don't forget to use your browser's reload button for the latest version. The system may be unavailable during regularly scheduled maintenance - Please note the regularly scheduled maintenance time is Fridays, 09:00 to 11:00 BST (Fridays, 01:00 a.m. to 05:00 a.m., eBay time).

Updated: 08-Sep 7:30:05 EDST Check eBay official time
Use your browser's reload button to see the latest version.

FIG. 13D home | my page | site map | sign in    262

Browse | Sell | Services | Search | Help | Community all items | gallery items ← Shop with pictures!

▷ Create and edit your About Me page.
▷ Learn more about What is eBay?

☐ Search titles and descriptions

[        ] Search  tips
[      ▽]

Updated: 08-Sep 07:30:05 BST Check eBay official time

Top : Books, Films, Music : Books
Current || New Today || Ending Today || Going, Going, Gone Jump to a list of all items in Books Items in AU $          All items located in          All items available to Australia
                           Australia

General (6075)          Fiction (27405)          Paperbacks (3527)
Audio (2989)            General (6406)               Rare (9447)
                            Adventure (1947)
Business & Educational (11072)  Fantasy (2234)
    General (994)           Horror (1427)
    Business, Finance (1117)  Humour (1136)
    Computers, Internet (664) Military (535)
    Homeschool (1422)       Mystery (4510)
    Language (503)          Poetry (546)
    Medical (1178)          Romance (4628)
    Reference (1170)        Sci-Fi (4036)
    Science/Technology (1132)
    Self-Help (1656)        First Editions (7124)
    Textbooks (1236)        General (5790)
                            Signed (1334)
Children (18133)
    General (4598)          Non-Fiction (52801)
    Antique (1453)          General (4921)
    Classics (1873)         Arts, Entertainment (3374)
    Early Readers (1242)    Auto/Biography (4980)
    Fairy Tales (568)       Collectibles (2038)
    Little Golden Books (1091)  Cooking (4792)
    Mystery, Adventure (1213)   Entertainment (1869)
    Non-Fiction (720)       History (7150)
    Picture Books (1294)    Hobby, Crafts (2633)
    Series (2821)           Home & Garden (1443)
    Young Adult (1260)      Hunting, Fishing (1126)
                            Instructional (2025)
                            Military (3221)

⌐302    ⌐304       ⌐306
http://local-listings|ebay.co.uk|aw/listings-avail|ist/all/category267/index.html

FIG. 14A

Nature (1594)
New Age & Paranormal (1120)
Poetry (588)
Religion & Philosophy (4216)
Sports (1711)
Travel (1398)
True Crime (638)
Vehicles (1164)

262

Featured Auctions in Books

◨ = Gallery  ◙ = Picture  ⌬ = Hot!

| Status | Item | Auction Price | Converted Amount* | Bids | Ends BST |
|---|---|---|---|---|---|
| ◙ | ELLIOTT, NATURES LAW Stock market wave theory | AU $249.00 | | - | 08-Sep 09:47 |
| ◙ | CHARLES DICKENS - MARTIN CHUZZLEWIT 1844 1st | AU $349.00 | | - | 14-Sep 11:31 |

To find out how to be listed in this section and seen by thousands, please visit this link Featured Auctions

Items in Books
Current

You are on page 1 of 66. Next Page ▶

◨ = Gallery  ◙ = Picture  ⌬ = Hot!

| Status | Item | Auction Price | Converted Amount* | Bids | Ends BST |
|---|---|---|---|---|---|
| ◙ | 1952 Clinical laboratory diagnosis w/illustr. | US $9.99 | AU $17.73 | - | 08-Sep 07:30 |
| ◙ | Ask Mr. Bear Vintage Old Book NR | US $3.25 | AU $5.77 | 4 | 08-Sep 07:30 |
| ◙ | Sweet Texas Wildfire by Lauren Wilde~Historic | US $1.00 | AU $1.77 | - | 08-Sep 07:30 |
| ◙ | CREATION CRAFTS | US $1.00 | AU $1.77 | 1 | 08-Sep 07:30 |
| | One Man's Island David Conover biography | US $3.95 | AU $7.01 | - | 08-Sep 07:30 |
| ◙ | SOLVE YOUR CHILD'S SLEEP PROBLEMS - FERBER | US $7.01 | AU $12.44 | 4 | 08-Sep 07:30 |
| | Janet Dailey - 3 PB/1 HC - Illusions, etc. | US $2.00 | AU $3.55 | - | 08-Sep 07:31 |
| ◙ | Morman Apostle, Captain Fear Not, LDS. | US $9.99 | AU $17.73 | - | 08-Sep 07:31 |
| ◙ | Rachel's Choice~Judith French~Like New~PB~NR | US $2.00 | AU $3.55 | 1 | 08-Sep 07:31 |
| ◙ | 1942 Boots Mystery Of The Unlucky Vace Book | US $2.99 | AU $5.31 | - | 08-Sep 07:31 |
| ◙ | awake and away school text pic | US $35.00 | AU $62.12 | - | 08-Sep 07:31 |

| | | | | | |
|---|---|---|---|---|---|
| 📷 | George Elio Works vol. VIII MIDDLEMARCH 1911 | US $8.00 | AU $14.20 | - | 08-Sep 07:31 |
| 📷 | Ngaio Marsh-"A Wreath for Rivera" | US $5.00 | AU $8.87 | - | 08-Sep 07:31 |
| 📷 | FISH AND GAME COOKING COOKBOOK | US $7.99 | AU $14.18 | 1 | 08-Sep 07:31 |
| 📷 | LOVE 49 Peoms of Love | US $2.00 | AU $3.55 | - | 08-Sep 07:31 |
| 📷 | The O'Connors~Karen Young~Like New! ~PB~NR | US $2.00 | AU $3.55 | - | 08-Sep 07:31 |
| 📷 | an Ill Fate Marshalling by Glen Cook, NR | US $5.00 | AU $8.87 | 1 | 08-Sep 07:31 |
| 📷 | CRIMINAL CONVERSATION | US $9.99 | AU $17.73 | - | 08-Sep 07:32 |
| 📷 | ALCOTT: EIGHT COUSINS ILLUS. OLD GORGEOUS | US $7.99 | AU $14.18 | - | 08-Sep 07:32 |
| 📷 | Savage Persuasion~Edwards~Like New! ~PB~NR | US $2.00 | AU $3.55 | - | 08-Sep 07:32 |
| 📷 | Art Instruction Books 1 dozen 1950-1969 | US $8.00 | AU $14.20 | 4 | 08-Sep 07:32 |
| | LONDON, Sidney Dark ill. Joseph Pennell 1936 | US $7.00 | AU $12.42 | 1 | 08-Sep 07:32 |
| 📷 | Snow Kisses~Carlow~Harte~Madi~Like New!~PB~NR | US $2.00 | AU $3.55 | - | 08-Sep 07:32 |
| 📷 | Illustrated Encyclopedia Of Symbols | US $3.75 | AU $6.66 | 3 | 08-Sep 07:32 |
| 📷 | Ginny Gordon & The Missing Heirlom-50's Book | US $9.99 | AU $17.73 | - | 08-Sep 07:32 |
| 📷 | PETAL PORCELAIN PROJECTS & PLANS (3 BOOKS) | US $3.49 | AU $6.19 | 1 | 08-Sep 07:32 |
| | This is Your Georgia, Bernice McCullar | US $6.00 | AU $10.65 | - | 08-Sep 07:33 |
| 📷 | BIRTHDAY CAKES/KIDS Cookbook No Fancy Pans | US $4.62 | AU $8.20 | 5 | 08-Sep 07:33 |
| 📷 | ANGEL'S FOOD Church COOKBOOK Naples FL 1985 | US $8.30 | AU $14.73 | 7 | 08-Sep 07:33 |
| | Sugar Busters!#1 NY Times Bestseller | US $11.09 | AU $19.68 | 3 | 08-Sep 07:33 |
| 📷 | Wyoming Territory by Jackie Merritt~Historic | US $1.00 | AU $1.77 | - | 08-Sep 07:33 |
| 📷 | KNOX GELATIN 6 vintage recipe leaflets. NR | US $6.02 | AU $10.68 | 3 | 08-Sep 07:33 |
| 📷 | Say you Love Me~Lindsey~Historical~PB~NR | US $2.00 | AU $3.55 | - | 08-Sep 07:33 |

FIG. 14C

| | | | | | |
|---|---|---|---|---|---|
| 📷 | 1866 HISTORY OF THE UNITED STATES FROM AD 432 | US $15.50 | AU $27.51 | 2 | 08-Sep 07:33 |
| 📷 | 1954 THE HAPPY LION by Louise Fatio | US $4.00 | AU $7.10 | 1 | 08-Sep 07:33 |
| | HUGE Historical Reference Library on CD-ROM | US $11.99 | AU $21.28 | - | 08-Sep 07:33 |
| | HUGE Historical Reference Library on CD-ROM | US $11.99 | AU $21.28 | - | 08-Sep 07:33 |
| 📷 | Abraham Lincoln The Boy and The Man | US $8.00 | AU $14.20 | - | 08-Sep 07:33 |
| 📷 | '54-G.Meredith-"ORDEAL of RICHARD FEVEREL"-UK | US $3.95 | AU $7.01 | - | 08-Sep 07:33 |
| 📷 | HOMESCHOOLING UNIT STUDIES abchomeschool.com | US $39.95 | AU $70.90 | - | 08-Sep 07:33 |
| 📷 | LET'S GO TO THE MOON - 1977 NAT. GEO. GRAPH | US $3.99 | AU $7.08 | - | 08-Sep 07:34 |
| 📷 | Apache Magic--Janis Hudson--Historical--PB--NR | US $2.00 | AU $3.55 | - | 08-Sep 07:34 |
| 📷 | WILL ROGERS by P.J. O'BRIEN WILEY POST 1935!! | US $1.00 | AU $1.77 | - | 08-Sep 07:34 |
| 📷 | 1914 THE CAMP FIRE GIRLS ON THE MARCH | US $1.00 | AU $1.77 | - | 08-Sep 07:34 |
| 📷 | Book. 1929 Friends A Primer/Pennnell&Cusak | US $4.24 | AU $7.53 | 2 | 08-Sep 07:34 |
| 📷 | BADGER CLARK. Signed SUN & SADDLE LEATHER | US $21.67 | AU $38.46 | 6 | 08-Sep 07:34 |
| 📷 | CHARLES BUKOWSKI "TRIGGER" T-SHIRT XL RARE! | US $9.99 | AU $17.73 | 1 | 08-Sep 07:34 |
| 📷 | 1944 Operative oral surgery w/illustr. | US $9.99 | AU $17.73 | 1 | 08-Sep 07:34 |
| 📷 | CHARLES BUKOWSKI T-SHIRT XL "DAMNED LIPS" | US $9.99 | AU $17.73 | - | 08-Sep 07:34 |
| | (audio) BEN BOVA - DEATH DREAM - SF 2 Cassett | US $2.25 | AU $3.99 | - | 08-Sep 07:34 |

262

For more items in this category, click these pages:
= 1 = 2 3 4 5 6 ... 20 ... 40 ... 60 ... 80 ... 100 ... 120 ... 140 ... 160 ... 180 ... 200 ... 220 ... 240 ... 260 ... 280 ... 300 ... 320 ... 340 ... 360 ... 380 ... 400 ... 420 ... 440 ... 460 ... 480 ... 500 ... 520 ... 540 ... 560 ... 580 ... 600 ... 620 ... 640 ... 660 ... 680 ... 700 ... 720 ... 740 ... 760 ... 780 ... 800 ... 820 ... 840 ... 860 ... 880 ... 900 ... 920 ... 940 ... 960 ... 980 ... 1000 ... 1020 ... 1040 ... 1060 ... 1080 ... 1100 ... 1120 ... 1140 ... 1160 ... 1180 ... 1200 ... 1220 ... 1240 ... 1260 ... 1280 ... 1300 ... 1320 ... 1340 ... 1360 ... 1380 ... 1400 ... 1420 ... 1440 ... 1460 ... 1480 ... 1500 ... 1520 ... 1540 ... 1560 ... 1580 ... 1600 ... 1620 ... 1640 ... 1660 ... 1680 ... 1700 ... 1720 ... 1740 ... 1760 ... 1780 ... 1800 ... 1820 ... 1840 ... 1860 ... 1880 ... 1900 ... 1920 ... 1940 ... 1960 ... 1980 ... 2000 ... 2020 ... 2040 ... 2060 ... 2080 ... 2100 ... 2120 ... 2140 ... 2160 ... 2180 ... 2200 ... 2220 ... 2240 ... 2260 ... 2280 ... 2300 ... 2320 ... 2340 ... 2360 ... 2380 ... 2400 ... 2420 ... 2440 ... 2460 ... 2480 ... 2500 ... 2520 ... 2540 ... 2560 ... 2580 ... 2600 ... 2620 ... 2640 ... 2660 ... 2680 ... 2700 ... 2720 ... 2740 ... 2756 ... (next page)

Hot Items in Books
Current

You are on page 1 of 66. Next Page ▶

🗂 = Gallery  📷 = Picture  🔥 = Hot!

| Status | Item | Auction Price | *Converted Amount** | Bids | Ends BST |
|---|---|---|---|---|---|
| 🗂 📷 🔥 | Principles of Instrumental Analysis, 4th ed. | US $40.04 | AU $71.06 | 39 | 11-Sep 03:44 |
| 📷 🔥 | Bible on Cassette--New Test--King James-$1.00 | US $3.00 | AU $5.32 | 70 | 11-Sep 16:20 |

Click on a title to get a description and to bid on that item. A red ending time indicates that an auction is ending in less than five hours. These items are not verified by eBay; caveat emptor. This page is updated regularly; don't forget to use your browser's reload button for the latest version. The system may be unavailable during regularly scheduled maintenance - Please note the regularly scheduled maintenance time is Fridays, 09:00 to 11:00 BST (Fridays, 01:00 a.m. to 05:00 a.m., eBay time).

Updated: 08-Sep 7:30:05 EDST Check eBay official time
Use your browser's reload button to see the latest version.

Hörspiele (45)
Fanartikel & Memorabilia (2031)

Briefmarken & Münzen (1333)
Deutsche Briefmarken (66)
Briefmarken Europa (128)
Briefmarken International (247)
Briefmarken Motive (279)
Briefmarken Sonstige (166)
Münzen Altertum (15)
Münzen Deutschland bis 1945 (5)
Münzen Deutschland ab 1945 (34)
Münzen Europa (113)
Münzen International (138)
Münzen Sonstige (1)
Papiergeld (69)
Historische Wertpapiere (71)
Patente & Rechte (0)
Finanzen (0)
Sonstige (1)

Computer & Computerspiele (3206)
Apple (123)
Bürobedarf (2)
Hardware (1391)
Klassische Computer (18)
Klassische Konsolen (73)
Literatur (59)
Notebooks (85)
PDAs & Organiser (109)
Software (540)
Spiele: Amiga (5)
Spiele: Apple (1)
Spiele: Internet (42)
Spiele: Nintendo (188)
Spiele: PC (274)
Spiele: Playstation (177)
Spiele: Sega (62)
Spiele: Merchandise (0)
Domainnamen (44)
Bannerwerbeplatz (6)
Sonstige (7)

Ansichtskarten (308)

Spielzeug & Modellbau (898)
Modelleisenbahn (68)
Modelleisenbahn Spur H0 (37)
Modellautos (574)
Modellbau (19)
RC-Modellbau (29)
Spielzeug (99)
Gesellschaftsspiele (71)
Sonstige (1)

Sport (2482)
Sportgeräte (432)
Fahrräder (44)
Wassersport (262)
Memorabilia (1090)
Trading Cards (654)

Uhren & Schmuck (2364)
Klassische Armbanduhren (414)
Trenduhren (12)
Swatch (53)
Sonstige Uhren (21)
Uhrenzubehör (21)
Wereartikel & Merchandising (1)
Klassischer Schmuck (1292)
Ringe (16)
Edelsteine (491)
Modeschmuck (41)
Sonstige (2)

Baumaschinen (1)
Elektrotechnik (0)
Hotellerie & Gastronomie (2)
Nutzfahrzeuge (0)
Medizintechnik & Gesundheit (4)
Landmaschinen (0)

Artikel
Endet innerhalb von fünf Stunden           = Galerie   = Bild   = Hot!

Klicken Sie auf einen Titel, um eine Beschreibung des Artikels zu erhalten und um auf den Artikel zu bieten. Der
Verkäufer trägt die volle Verantwortung für das Anbieten dieses Artikels. Eine rote Endzeit gibt an, dass die
Auktion innerhalb von fünf Stunden zu Ende geht. Bitte beachten Sie, dass das System unter Umständen

FIG. 15B während der regulären Wartungzeit nicht zur Verfügung steht - diese Wartungszeiten sind Freitag, 10:00 bis 12:00 MESZ sind (eBay Deutschland Zeit).

Aktualisiert: 07. Sep. 22:30:05 MESZ Prüfen Sie die offizielle eBay Zeit
Verwenden Sie die Schaltfläche Aktualisieren/Erneut laden ihres Browsers, um die neueste Version zu sehen.

page d'accueil | mon eBay | plan du site | ouvrir session

Parcourir ▸ Vendre ▸ Services ▸ Rechercher ▸ Aide ▸ Village voir article

| SGSGSG |
| Article n°1041307 |

Coins & Stamps:Currency: World:Europe

Description

Actuellement 1,00 GBP (environ 14 FF)  
Quantité 1  
Temps restant 6 jours, 16 heures +

A commencé le Sep-07-00 09:55:52 Paris  
Se termine le Sep-14-00 09:55:52 Paris

Bid

Veneur auman (4)  
(Evaluation) afficher les commentaires dans le profil d'évaluation du vendeur | afficher les autres enchères du vendeur | poser une question au vendeur Enchére la plus haute ---

Paiement Mandat ou chéques tirés, Chéque bancaire. Pour les méthodes de paiement, veuillez consulter la description de l'article Expédition Destination de l'expédition : Royaume-Uni uniquement. Pour les frais d'expédition, veuillez consulter la description de l'article Mise à jour de l'article Vendeur: Si cet article n'a pas reç d'enchéres, vous pouvez le modifier.

Première enchére 1,00 GBP (environ 14 FF)  
Nb d'enchéres 0 historique de l'enchére | avec emails  
Emplacement sgsgsg  
Pays Royaume-Uni  
✉ envoyez cette enchére à un ami  
∞ suivre cet article Le vendeur assume l'entiére responsabilité de la mise en vente de cet article. Si vous avez des questions, veuillez le contacter avant d'enchérir. La devise de la vente aux enchéres est Livres Anglais (GBP) á moins de la mention du contraire.

Description sgsgsgsgs

Enchérir sgsgsg  
Article n°1041307  
Enchére départ : 1,00 GBP  
Votre enchére maximale : [        ]  
(Mise á prix : 1,00 GBP)

Comment enchérir?

1. Inscrivez-vous pour enchérir si ce n'est pas déjà fait. C'est gratuit!

2. Au sujet de ce vendeur - lisez le prfil d'évaluation établi par d'autres utilsateurs.

FIG. 20B

METHOD AND SYSTEM FOR PROVIDING A RECORD

RELATED APPLICATIONS

The present application is a continuation of U.S. application Ser. No. 12/693,275, filed Jan. 25, 2012, which application is a continuation of U.S. application Ser. No. 09/905,525 filed Jul. 13, 2001 (issuing as U.S. Pat. No. 7,660,740 on Feb. 9, 2010), which claims priority from U.S. Provisional Patent Application No. 60/241,081 filed Oct. 16, 2000, which applications are incorporated herein by reference in their entirety.

FIELD OF THE INVENTION

The present invention relates generally to the field of Internet-based commerce and, more specifically, to a method of facilitating electronic commerce (e.g., the auction of goods and/or services) in a regional manner.

BACKGROUND OF THE INVENTION

Electronic commerce (a.k.a., e-commerce) technology holds the promise of introducing efficiencies into marketplace and trading activities by automating many trading activities, providing near real-time information to both buyers and sellers and providing convenient channels between buyers and sellers. The ubiquity of the Internet, in particular, has led to the widespread utilization of this technology as a platform for the conducting of electronic commerce and for providing global on-line marketplaces. The increasing globalization of business and trading, no doubt facilitated by the Internet, has exposed a number geographic and regional challenges to electronic commerce. For example, the automated functionality provided by an electronic commerce facility may be unsuitable for global deployment for language, cultural and other reasons.

SUMMARY OF THE INVENTION

According to the present invention, a method to facilitate network-based commerce includes determining a site that a user accesses, the site being one of multiple sites operated by a network-based commerce facility. A category list available for the site is retrieved, the category list identifying categories of offerings available via the site. The category list is communicated to the user. The site is a regional site, and the category list is a region-specific category list.

BRIEF DESCRIPTION OF THE DRAWINGS

The present invention is illustrated by way of example and not limitation in the figures of the accompanying drawings, in which like references indicate similar elements and in which:

FIG. 2 is a database diagram illustrating an exemplary database maintained and accessed via a database engine server that supports the auction facility.

FIG. 3B illustrates an exemplary embodiment of a "master categories" table maintained by the exemplary auction facility.

FIGS. 12A-12D, 13A-13D, and 14A-14E illustrate examples of item list index pages generated by a plurality of different regional sites.

FIGS. 15A-15C illustrate a category browse index page, according to an exemplary embodiment of the present invention, for a German site operated by a network-based commerce facility.

FIGS. 20A-20B illustrate exemplary item pages for an item originally listed in pounds, but where the item pages are retrieved via U.S. and French sites, respectively.

DETAILED DESCRIPTION

Figure 1:
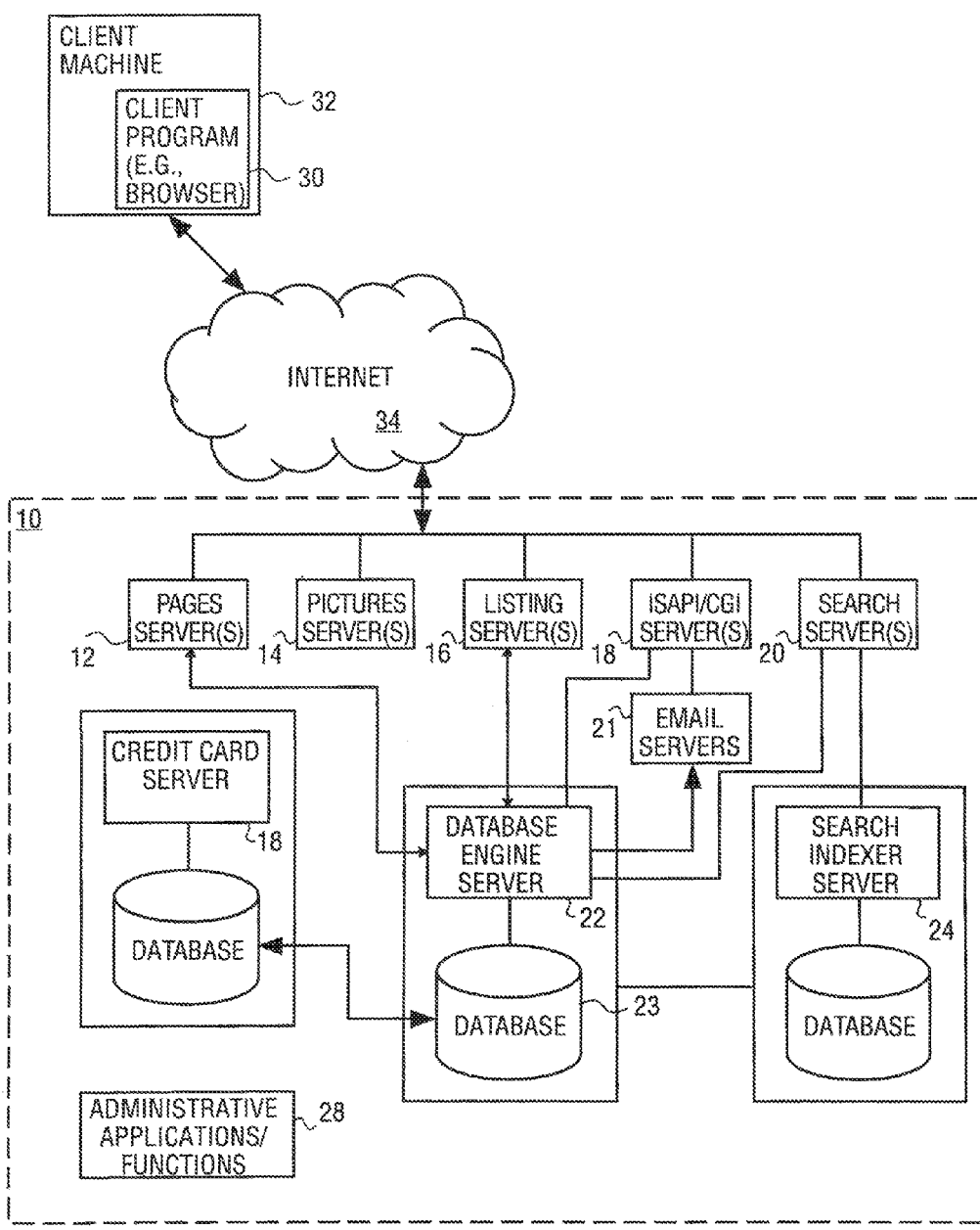
FIG. 1 is a block diagram illustrating an exemplary network-based commerce facility, in the form of an Internet-auction facility.

In the following description, for purposes of explanation, numerous specific details are set forth in order to provide a through understanding of the present invention. It will be evident, however, to one skilled in the art that the present invention may be practiced without these specific details.

In general, embodiments described below feature a network-based commerce facility that allows a user of the system to bid on offerings (e.g., products or services) that are for sale by sellers. A preferred embodiment of the present invention features a network-based application for online auctions.

In one embodiment, the present invention is implemented as a network-based service that may be accessed through, for example, the Internet using a Web browser. According to a first aspect of the present invention, the service provides an interface that allows a user to browse through the offerings that are available in his/her country of location and bid on a particular offering. According to a second aspect of the present invention, the service provides geographically customized information and interfaces to a user of the service.

Internet-Related Technology

As indicated above, one embodiment of the present invention provides an Internet-based implementation. Accordingly, some introduction to Internet-related technology is helpful in understanding the present invention. The Internet is a vast and expanding network of computers and other devices linked together by various telecommunications media, enabling the various components to exchange and share data. Sites (so-called Web sites), accessible through Internet, provide information about numerous corporations and products, as well as education, research, entertainment and services.

A resource that is attached to the Internet is often referred to as a "host." Examples of such resources include conventional computer systems that are made up of one or more processors, associated memory and other storage devices and peripherals, such as modems, networks interfaces and the like that allow for connection to the Internet or other networks. In most cases, the hosting resource may be embodied as hardware and/or software components of a server or other computer system that includes an interface module, which allows for some dialog with users and that may process information through the submission of Web forms completed by the user. Generally, such a server will be accessed through the Internet's graphical user interface, the World Wide Web, (e.g., via Web browsers) in the conventional fashion In order to facilitate communications between hosts, each host has a numerical Internet Protocol (IP) address. The IP address of a hypothetical host computer might be 112.222.64.27. Each host also has a unique "fully qualified domain name." In the case of the hypothetical host 112.222.64.27, the "fully qualified domain name" might be "computer.domain.com", the three elements of which are the hostname ("computer"), a domain name ("domain") and a top-level domain ("corn"). A given host looks up the IP address of other hosts on the Internet through a system known as domain name service.

A previously indicated, in order to access the Internet most users rely on computer programs known as "Web browsers." Commercially available Web browsers include such well-known programs as Netscape's Navigator™ and Communicator™ and Microsoft's Internet Explorer™. If an Internet user desires to establish a connection with a Web page hosted at computer.domain.com, the Internet user might enter into a Web browser program the uniform resource locator (URL) "http://www.domain.com". The first element of the URL is a transfer protocol, most commonly "http" standing for hypertext transfer protocol, but others include "mailto" for electronic mail, "ftp" for tile transfer protocol, and "nntp" for network news transfer protocol. The remaining elements of this URL are an alias for the fully qualified domain name of the host.

Once a URL is entered into the browser, the corresponding IP address is looked up in a process facilitated by a server computer, called the top-level server. The top-level server matches the domain name to an IP address of a domain name server capable of directing the inquiry to the computer hosting the Web page. Thus, the domain name server ultimately matches an alphanumeric name such as www.domain.com with its numeric IP address 112.222.64.27.

When a host receives an inquiry from the Internet, it returns the data in the file pointed to by the request to the computer making the inquiry. Such data may make up a Web page, which may include a textual message, sound, picture, or a combination of such elements. A user can move between Web pages through the use of hyperlinks, which are links from one site on the Internet to another.

A component of one embodiment of the present invention is a computer server. Servers are computer programs that provide some service to other programs, called clients. A client and server communicate by means of message passing often over a network, and use some protocol, a set of formal rules describing how to transmit data, to encode the client's requests and/or responses and the server's responses and/or requests. The server may run continually waiting for client's requests and/or responses to arrive or it may be invoked by some higher-level continually running server, which controls a number of specific servers, Client-server communication is analogous to a customer (client) sending an order (request) on an order form to a supplier (server) dispatching the goods and an invoice (response). The order form and invoice are part of the protocol used to communicate in this case.

Yet another component of one embodiment of the present invention is cache. Cache is a temporary storage area for frequently accessed or recently accessed data. There are two kinds of cache: internal (or memory cache) and external (pr disk cache). Internal cache is built into a CPU, and external cache is located on a motherboard. When data is downloaded from a web page, the data is "cached" (i.e., temporarily stored on a computer). The next time the web page is accessed, instead of requesting a file from a Web server, a Web browser accesses it from the cache, so the page loads quickly.

Another component of the one embodiment of the present invention is Internet Server Application Program Interface (ISAPI), which is an application program interface for Internal Information Server (IIS) Web Server produced by Microsoft Corporation of Redmond, Washington. ISAPI enables programmers to develop Web-based applications that run much faster than conventional Common Gateway Interface (CGI) programs because they are more tightly integrated with the Web server.

Architecture

With these concepts in mind, an exemplary embodiment of a system architecture of the present invention can be explored. FIG. 1 is a block diagram illustrating an exemplary network-based commerce facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The term "offering" is used below to designate any offering by a seller to a buyer, and this term should be understood to include, but not be limited to, any product or service offering.

For the purposes of the present specification, the term "site" shall be taken to comprise a collection of linked resources that may be accessed via a network. For example, a site may be represented on the World Wide Web (WWW), and include a collection of web pages (e.g., markup language documents) that may be static, store documents, or dynamically generated documents, between which links exist. The resources that constitute the site may furthermore be any documents, files, applications, application components or the like. A site may, for example, be owned or managed by an individual, a company or organization. Within the context of the WWW, a web site typically is characterized in that all resources of the web site are addressed utilizing a common domain (e.g., www.ebay.com or www.ebay.co.uk).

For the purpose of the present specification, the term "region" shall be taken to include any geographically identifiable area, demarcated according to political, economic, cultural, social or other criteria. The term "community" shall similarly be taken to include any grouping of people, defined according to social, political, economic, cultural, geographic or other criteria.

Referring to FIG. 1, the auction facility 10 includes one or more of a number of types of front-end servers, namely communications servers in the exemplary form of page servers 12 that deliver web pages (e.g., markup language documents), picture servers 14 that dynamically deliver images to be displayed within Web pages, listing servers 16, processing servers in the exemplary form of CGI (or ISAPI) servers 18 that provide an intelligent interface to back-end servers, and search servers 20 that handle search requests to the facility 10. E-mail servers 21 provide, inter aria, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as browser (e.g., the Internet Explorer distributed by Microsoft Corp. of Redmond, Wash.) that executes on a client machine 32 (e.g., a personal computer, PDA, cell phone or the like) and accesses the facility 10 via a network 34 such as, for example, the Internet. Other examples of networks that a client may utilize to access the auction facility 10 include a wide area network (WAN), a local area network (LAN), a wireless network (e.g., cellular network), or the Plain Old Telephone Service (POTS) network.

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. The database 23 also includes an items table 42 that may be linked to the user table 40. A user record in the user table 40 may be linked to multiple items that are being, or have been, auctioned via the facility 10.

The database 23 also include a note table 48 populated with note records that may be linked to one or more item records within the items table 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, and an account balances table 58.

The database 23 is also shown to include two tables specifically to enable an exemplary embodiment of the present invention. A master categories table 60 stores records for all the item categories presented across multiple, regional or community views (or presentations) of item categories via regional or community sites presented by the facility 10 throughout the world. A site categories table 62 stores records indicating which item categories are to be presented for respective regional or community sites, (e.g., a country, region or city specific site) presented by the facility 10. In other words, the master categories table 60 stores records for each category of a global collection of categories, and the site categories table 62 stores records indicating which of the global collection of categories are to be presented by each of a number of regional sites, along which information pertaining to the customized presentation of each category in a region-specific manner (e.g., a regional description, currency, language etc.).

Figure 3A:
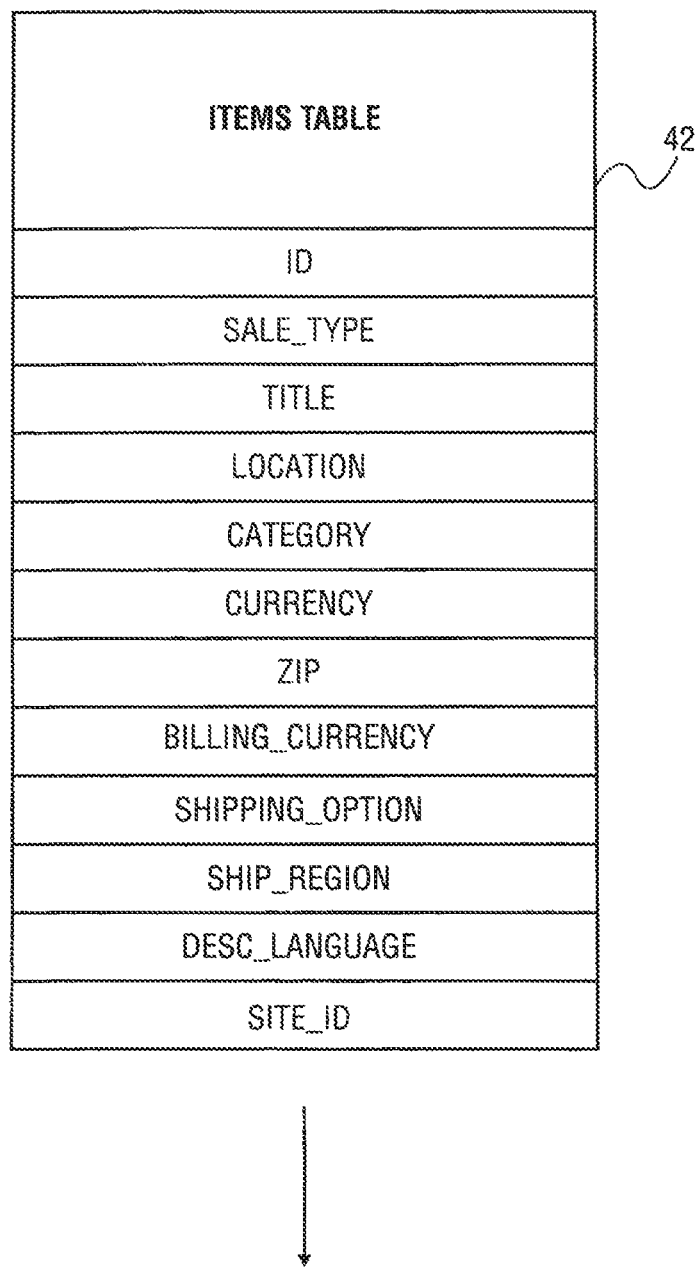
FIG. 3A illustrates an exemplary embodiment of an "items" table within a database maintained by the exemplary auction facility.

FIG. 3A illustrates an exemplary embodiment of the items table 42. An Id field stores a numerical identification number for each item available via the auction facility 10. A sale_type field contains information about acceptable payment options such as check, cash, and credit cards. The next field, title field, stores a descriptive title of the item to be displayed to the user of the auction facility 10. A location field contains information about a geographic location of the item, i.e. country, region, and specific address. This geographic location information may, in one embodiment, be a geographic location at which a seller of the item resides or may alternatively be information specified by the seller as the geographic location of the actual item. The information about which category the item belongs to is stored in a category field. For example, an item Barbie™ doll may belong to Toys category. Fields such as billing_currency, shipping_option, ship_region, description_language, site_id include information that depends on the location of the seller of the item or of the item itself, or the willingness of the owner of the item to ship the item to another geographic location or region. For example, the billing currency for a particular item may be derived from the currency utilized at a geographic location (e.g., a country) in which the seller resides. Alternatively, the seller of the item may specify a particular currency in which the seller wishes to receive payment.

The shipping option information is typically inputted by seller, and indicates one or more shipping options (e.g., mail, courier-same day, courier-next day) specified by the seller.

The ship_region information may be inputted by a seller to indicate one or more geographic regions to which the seller is willing to ship the item or, in the case of services, to perform a particular service.

The description language information may be, as a default condition, populated with a predominate language in a geographic region or location in which the seller resides. For example, a seller located in the US may, as a default condition, have a description language indicated as English. A seller located in Germany would have German indicated as a default description language. In one embodiment, the seller may also specify an alternative description language to override a default condition. For example, a seller located in Japan may wish to specify that the description language is English in order to have the description of the relevant item available to a broader worldwide audience.

Site_id information identifies a geographically specific, or regional, site, presented by the auction facility 10, via which the seller offered the item for sale. For example, a Japanese seller may have placed an item up for auction via a Japanese site, presented by the auction facility 10, in which case the site_id information identifies the Japanese site.

It will be appreciated by one skilled in the art that the tables may have additional fields and are not limited to the above-described fields.

FIG. 3B illustrates an exemplary embodiment of the master categories table 60. A category_id field contains a unique numeric identifier of a category and name field stores a descriptive name of the category that is displayed to the user using the auction facility 10. A description field of the table 60 contains descriptive information about the category. Parent_id and parent_name fields are used in locating a particular category in a tree data structure (e.g., a tree hierarchy) order when displaying categories to the user. It will be appreciated that the above-described fields are an exemplary embodiment and other fields may be incorporated into the master categories table.

Figure 3C:
FIG. 3C illustrates an exemplary embodiment of a "site categories" table maintained by the exemplary auction facility.

FIG. 3C illustrates an exemplary embodiment of the site categories table 62. The table 62 stores category information relevant to each of multiple regional (or geographically-specific) sites presented by the auction facility 10. One of the fields in the table is a site_id field, which stores a unique numeric identifier that is assigned to each of multiple regional or community sites. Category_id field stores a numeric identifier for a category that keys the relevant record to a category record within the master categories table 60. Name and description fields store a regional or community name of the category and description of the category. Parent_id and parent_name fields are used in placing a particular category in a tree data structure (e.g., a tree hierarchy) when displayed to the user of the auction facility 10. Fields such as currency and language are region specific and store information that facilitates displaying to the user information in the specified language and in the currency of the site. It will be appreciated that the above-described fields are an exemplary embodiment and other fields may be incorporated into the site categories table.

Figure 4:
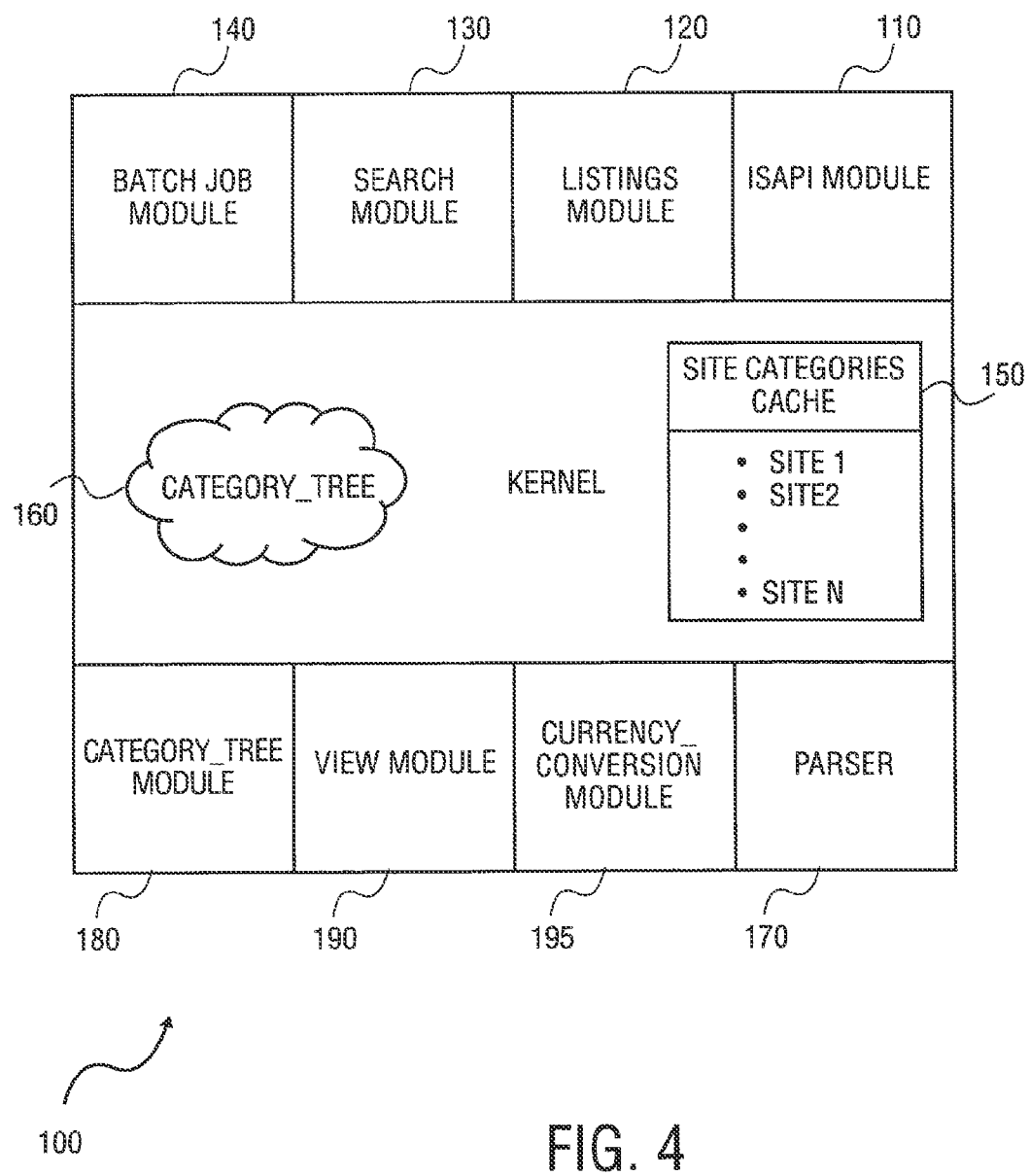
FIG. 4 illustrates an exemplary embodiment of a code system that includes software modules.

FIG. 4 illustrates an exemplary embodiment of a code system that contains some of the necessary modules that relate to the present invention. A kernel 100 is responsible for, inter alia, (1) determining which site the user entered and for (2) caching site categories in a site categories cache 150, ensuring higher performance by eliminating redundant accesses to the database 23 in which the tables 60 and 62 are stored. A category tree 160 stores categories in a tree data structure. A batch job module 140 is responsible for displaying initial web pages to a user of the auction facility 10. A search module 130 is responsible for performing searches through the item space, i.e. categories, when requested by the user. In one embodiment of the present invention, listings module 120 ensures that items that are displayed to the user are the ones that are available for shipping (or performance) in a region in which a user is located or that a user has specified. Another module that is present in the system is an ISAPI module 110. Category_tree update module 180, which is part of the kernel 100, is a piece of code that is responsible for constructing the category tree 160 in order to ensure that the categories are displayed in a correct hierarchical relationship to the user of the auction facility 10. Parser 170 is a module that determines which site the user has entered. View module 190 generates the user-requested items and for display to a user (e.g., via a Web browser). Currency conversion module 195 is responsible for converting a price in listing currency into a regional (or native) currency for a particular site.

Map File

In order to increase the performance efficiencies of the facility 10, according to one embodiment of the present invention, a map file 200 is generated by the listings module 120, the map file 200 including summarized item records for each of the complete item records maintained in the items table 42. Furthermore, the summarized item records within the map file 200 are pre-categorized, or grouped, so as to facilitate improved responses to queries against the map file 200. The grouping of summary item records is conveniently labeled as views 210, which may be retrieved with minimal processing for display to a user, The summary item records constituting the map file 200 may include limited information, such as an item identifier, a title, a currency, and a data value, for example. The map file 200 may be utilized to facilitate browsing of items that are actively being auctioned by the facility 10, wherein the facilitating of the browsing requires only limited information regarding each item.

Figure 5:
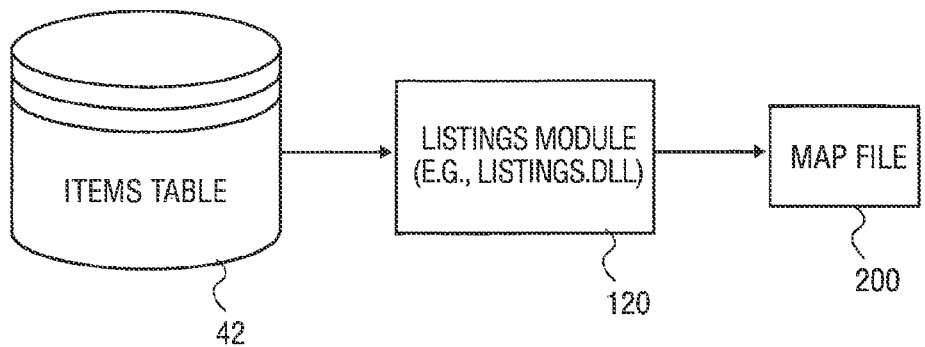
FIG. 5 is a diagrammatic representation, according to an exemplary embodiment of the present invention, of the generation of a map file by a listings module utilizing information contained in the items table.

FIG. 5 is a diagrammatic representation, according to an exemplary embodiment of the present invention, of the generation of the map file 200 by the listings module 120 utilizing information contained in the items table 42. For example, the listings module 120 may comprise a Dynamic Link Library (DLL), that is utilized periodically to generate a fresh map file 200 from the full item records of the items table 42. It will be appreciated that the frequency with which the map file 200 is regenerated may vary depending on the frequency with which records are added to the items table 42. For example, in a heavily trafficked and active facility 10, the frequency with which map file 200 requires regeneration by the listings module 120 will be more frequent than for a facility 10 that is less active.

Figure 6:
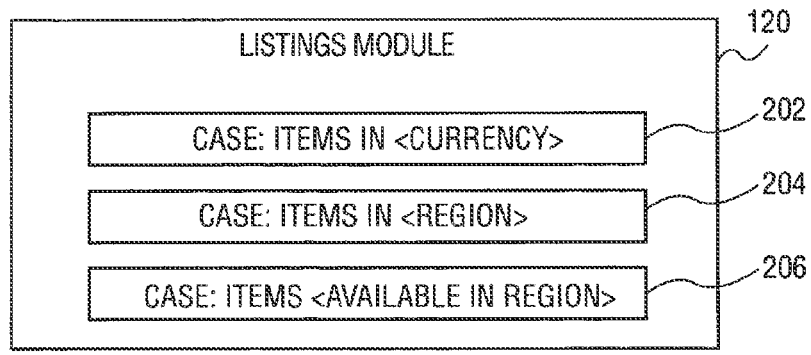
FIG. 6 is a diagrammatic representation of case logic implemented by the listings module, according to an exemplary embodiment of the present invention.

FIG. 6 is a diagrammatic representation of case logic implemented by the listings module 120, according to an exemplary embodiment of the present invention. Specifically, the listings module 120 is shown to implement three case statements, namely a "currency" case statement 202, a "region" case statement 204 and an "available" case statement 206. As will be described in further detail below, each of the case statements 202, 204 and 206 operates to generate a distinct view 210 of summary item records for each of multiple categories listed in the master categories table 60.

Figure 7:
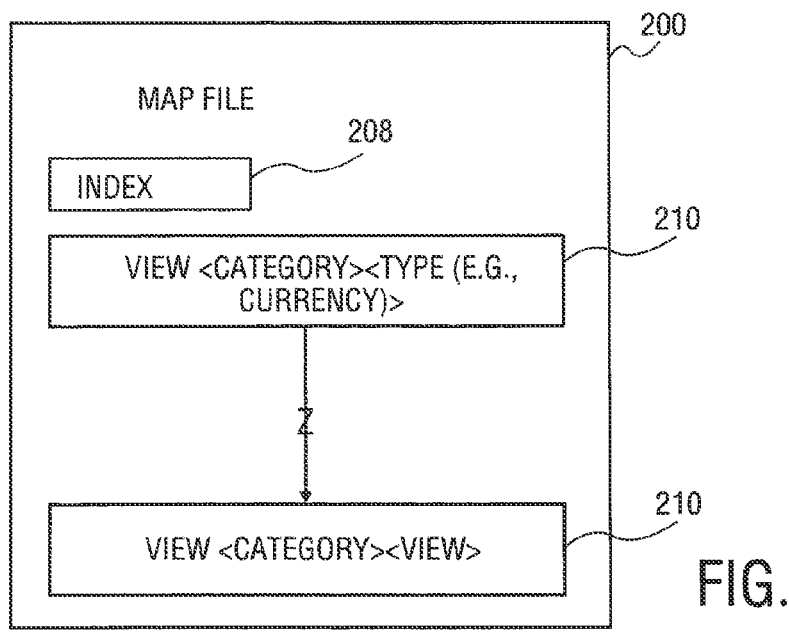
FIG. 7 is a diagrammatic representation of a map file, according to an exemplary embodiment of the present invention.

FIG. 7 is a diagrammatic representation of a map file 200, according to an exemplary embodiment of the present invention. Specifically, the map file 200 is shown to include an index 208 to multiple views of summary item records (e.g., within each category defined within the master categories table 60). In one embodiment, the map file 200 comprises a binary file. In summary, the map file 200 may be regarded as presenting a pre-organized (or grouped) summarization of information contained in the items table 42 that is maintained in memory of a computer system to provide performance advantages for browsing and searching operations.

Figure 8:
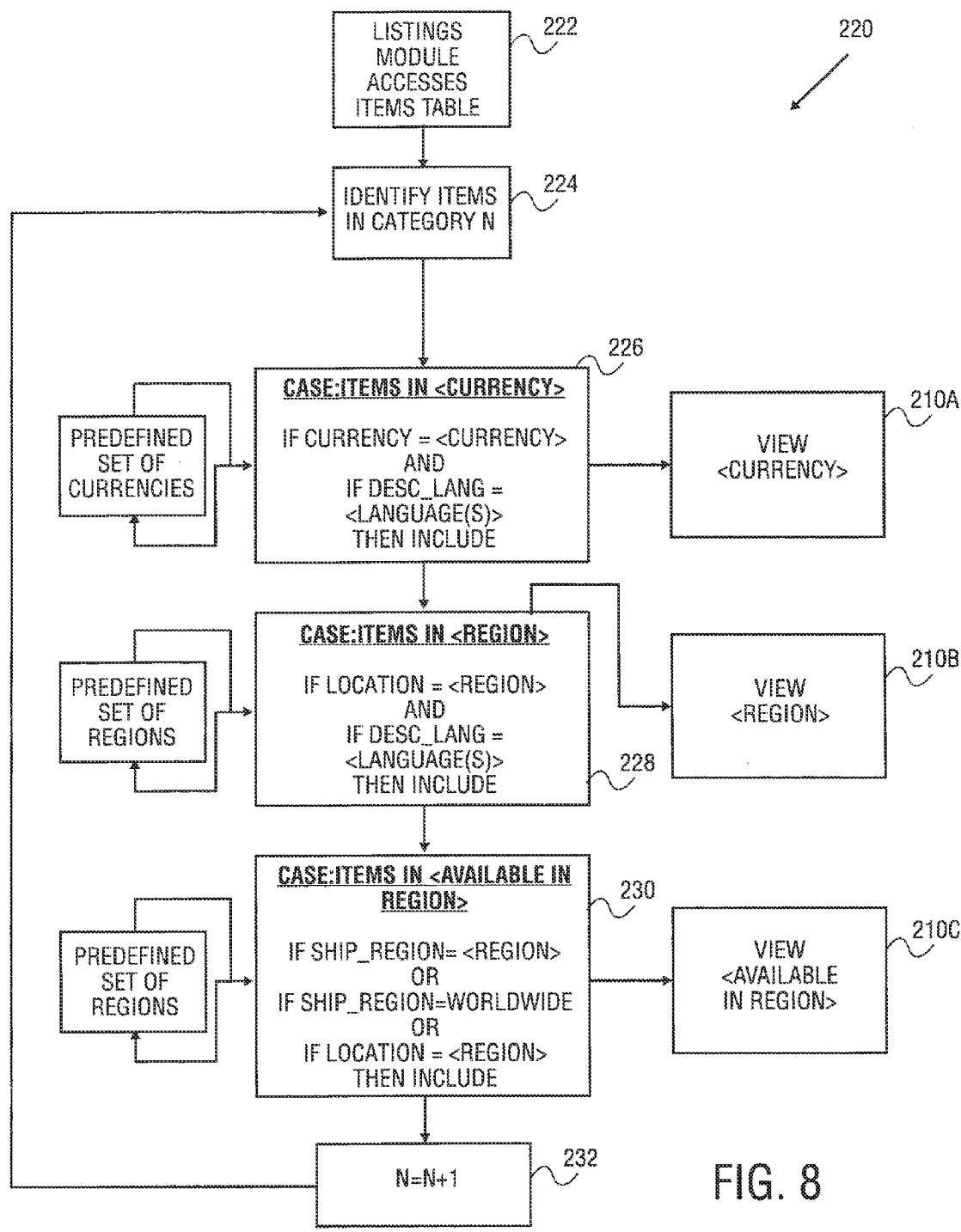
FIG. 8 is a flow chart illustrating a method, according to an exemplary embodiment of the present invention, of generating a map file.

FIG. 8 is a flow chart illustrating a method 220, according to an exemplary embodiment of the present invention, of generating the map file 200. At block 222, the listings module 120 accesses the items table 42 and, at block 224, identifies item records for items within a particular category N (e.g., category 0). Having then identified such item records, at block 226, the "currency" case statement 202 is applied against the item records identified at block 224 to generate a "currency" view 210A. Specifically, the listing module, for each of a pre-defined collection of currencies, determines if the currency information for each item record matches a respective pre-defined currency. For example, a first application of the case statement 202 at block 226 may determine whether the currency for each item record identified at block 224 is Australian dollars. Further, at block 226, the case statement 202 is applied to determine whether description language information for each of the relevant item records matches a predefined language, or set of languages, associated with the predefined currency. For example, a determination made during a first application of the case statement 202 may be made as to whether the description information language information indicates the English language. Assuming both the currency and description language comparisons are positive, then selected information from the relevant item record is included within the "currency" view 21A for the relevant currency. For example, a first application of the case statement 202 at block 226 may generate a view constituting summarized item records for all items being actively auctioned via the facility 10 for which the price is specified in Australian dollars, and the description language is English.

It will be appreciated that the case statement 202 will be applied for each of the predefined set of currencies to thereby generate a respective "currency" view 21A for each of the predefined set of currencies.

Similarly, at block 228, the "region" case statement 204 is applied against the item records retrieved at block 224 for each of a predefined set of regions, so as to generate a respective "region" view 210B for each of the set of regions. Specifically, location information from each of the item records is compared against a respective region of the predefined set of regions, and language description information is similarly compared against one or more languages associated with each of the regions to determine whether a summary item record, derived from the full item record, should be included within the relevant "region" view 210B. The predefined set of regions may specify regions with any resolution, ranging, for example, from a suburb of a city to a continent or broader geographically identifiable area. For example, a region could comprise a town, a city, a metropolitan area, a county, a state, a county or a continent.

Further, as noted above with respect to FIG. 3A, the location information within each item record of the items table 42 may be the indicated location of a seller of the item. This information may or may not be important to a buyer, depending on the nature of the item. For example, where the item is a motor vehicle, clearly the location of the seller, and therefore probably the item, is important to a buyer in that the buyer may be more inclined to purchase a motor vehicle from a local seller. On the other hand, should the item be easily shipped (e.g., a stamp), the location of the seller may be of less consequence.

Returning to the method 220 illustrated in FIG. 8, at block 230, the listings module 120 then applies the "available" case statement 206. The case statement 206 performs three inquiries that are OR'ed to determine whether a summary item record, derived from a full item record, should be included within a respective "available" view 210C. Again, for a predefined set of regions, the case statement 206 determines whether shipping region information indicated in the item record corresponds to a respective region of the predefined set of regions. A further determination is made as to whether the shipping region information indicates that the seller is willing to ship worldwide. A further determination is then made as to whether the location information of the item record indicates the seller location as being within the respective region. Should any of these three conditions be met, then a summary item record is generated from the relevant full item record, and included within the "available" view for the respective view 2100.

At block 232, the listings module 120 then increments a category number to a subsequent category, whereafter the method 220 loops back to block 224, to commence the view generation process 226-230 with respect to a further category.

While the method 220 is shown to generate multiple views 210 for each category based on currency, region and regional availability criteria, it will be appreciated that views (e.g., predefined groupings of information) may be generated based on any one of multiple criteria in terms of which item records may be conveniently browsed and/or searched.

Figure 9:
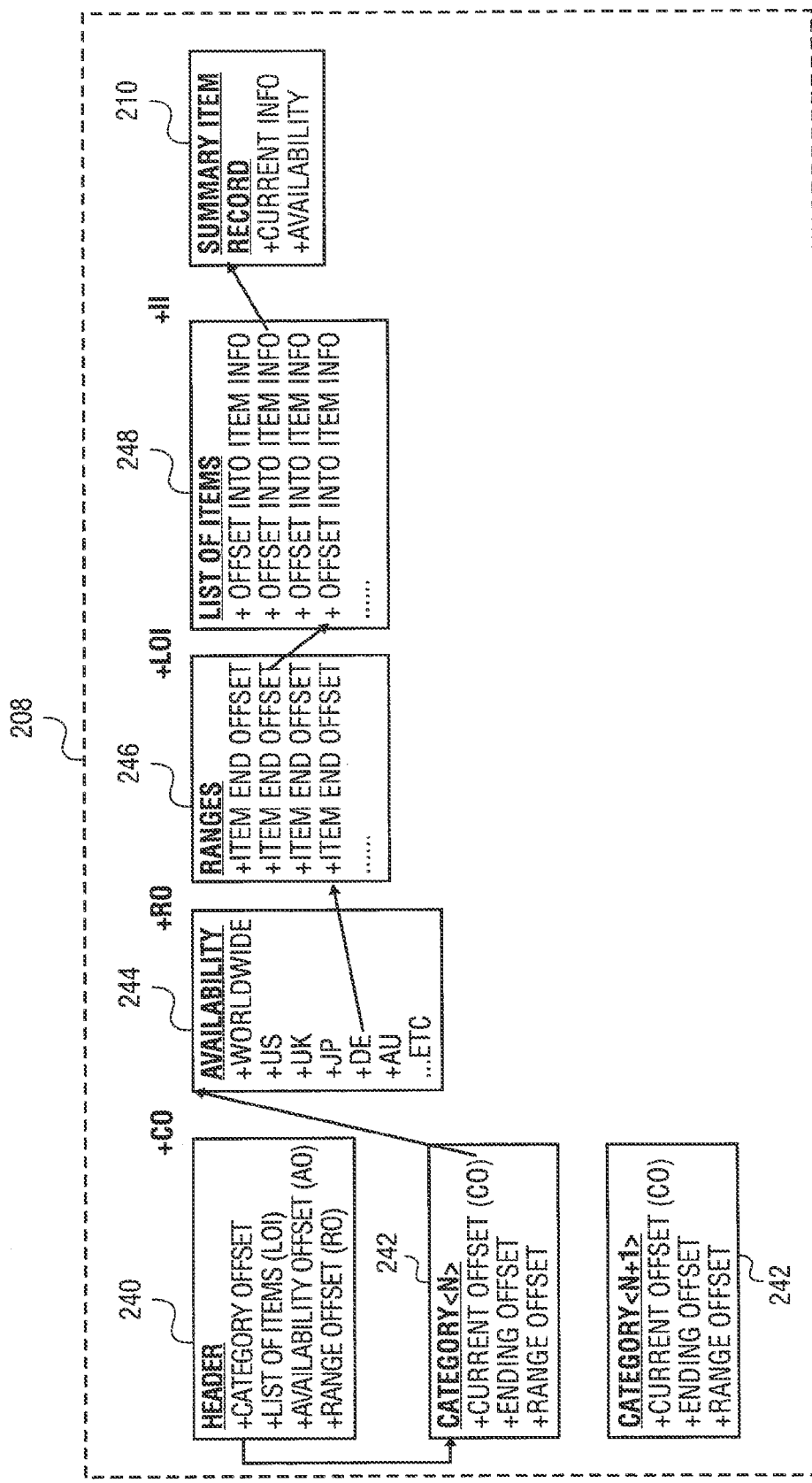
FIG. 9 is a diagrammatic representation illustrating further details of an exemplary implementation of a map file.

FIG. 9 is a diagrammatic representation showing further details of an exemplary implementation of the map file 200. Specifically, the index 208 is shown to constitute a header 240, a number of category indexes 242 that in turn point to an availability index 244 that points to a range index 246, that in turn points to a list of items index 248. Region and currency indexes, similar to the availability index 244, may be utilized to define the "region" views 210B and the "currency" views 210A.

Methodology and User Interfaces: Browsing

To enable users (e.g., potential buyers) conveniently to locate items that are being offered for sale via the facility 10 (e.g., via auction), the facility 10 may provide, according to the present invention, both item browse and search capabilities, each of which will be discussed below.

Dealing first with the browsing capability, this capability is enabled, in one embodiment, by a hierarchical structure of categories, as defined within the master categories table 60 and, for individual regional sites, within the site categories table 62. As discussed above with reference to FIGS. 3B and 3C, each of the tables 60 and 62 maintains a listing of categories, and also defines a hierarchical relationship between such categories. In one embodiment, the category_tree update module 180 accesses the tables 60 and 62 to construct hierarchical category data structures within the site categories cache 150.

Figure 10:
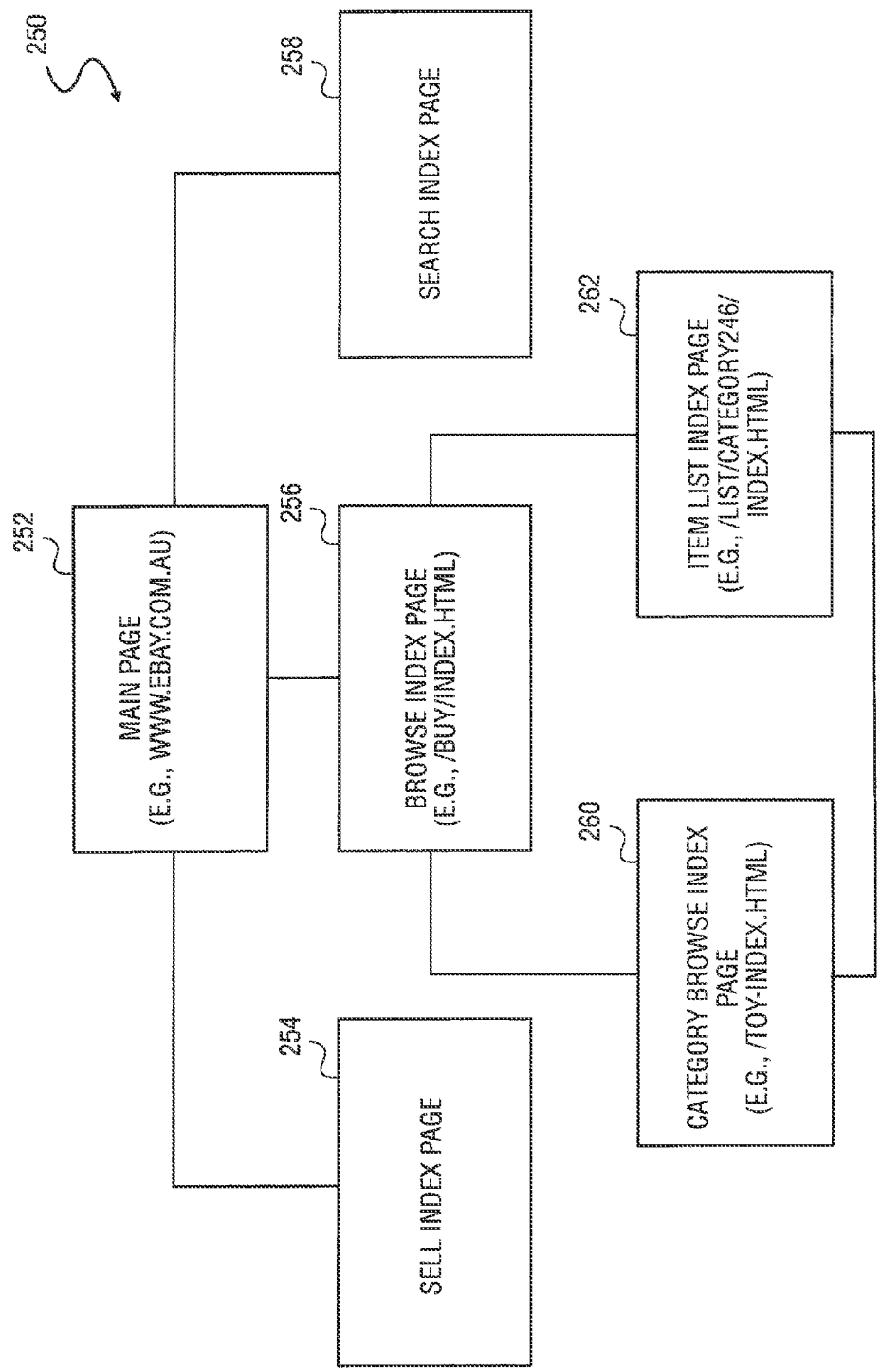
FIG. 10 is a page diagram illustrating an exemplary page map that constitutes part of a regional or community site supported by a network-based commerce facility.

FIG. 10 is a page map diagram illustrating an exemplary site map 250 that constitutes part of a regional or community site (e.g., www.ebay.com.au) provided by the facility 10. Specifically, each of the pages included within the map 250 provides links to multiple further pages, a limited number of these links being illustrated in FIG. 10 for the purposes of illustration.

A main page 252 is shown to provide links to a sell index page 254 that in turn links to resources to enable a seller to offer an item for sale (e.g., by auction) via the facility 10.

The main page 252 further provides links to a browse index page 258 that in turn provides access to search features to enable, for example, a potential buyer to search items offered for sale via the facility 10.

The main page 252 may also provide a link to a browse index page 256, which facilitates the browsing of offerings provided by the facility 10 utilizing the hierarchical category data structures discussed above. The browse index page 256 is furthermore shown to provide links to multiple category browser index pages 260, which represent pages displaying information concerning lower levels of a relevant hierarchical category data structure and item index pages 262 that lists items within a particular category, when the category to which the user has navigated includes a sufficiently small number of items. Further information concerning these items may be displayed to a user in a meaningful manner.

It will be appreciated that where the facility 10 provides multiple regional or community sites, each of which provide access to a common body of product offerings (e.g., the items included within the items table 42), it may be desirable to customize the browsing features provided by the respective regional or community sites according to regional or community conditions or preferences. In the present invention, such customization of the browsing features of each of multiple regional or community sites is facilitated in part by a site-specific category hierarchical data structures maintained within the site categories cache 150.

Figure 11:
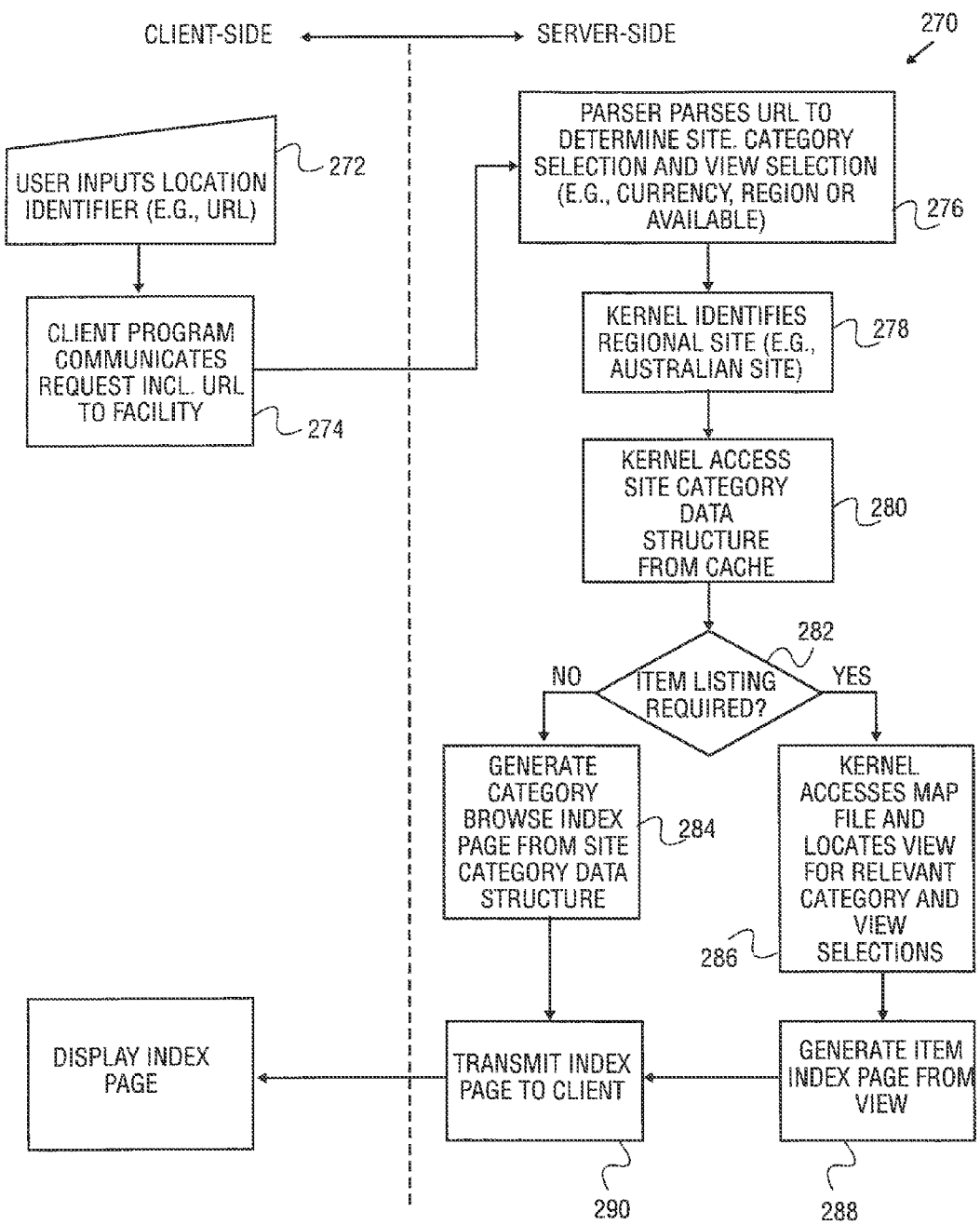
FIG. 11 is a flow chart illustrating a method, according to an exemplary embodiment of the present invention, of generating and communicating information concerning a hierarchical category data structure to a user.

FIG. 11 is a flowchart illustrating a method 270, according to an exemplary embodiment of the present invention, of generating and communicating information concerning a hierarchical category data structure to a user, an as to enable the user to browse a collection of offerings via the facility 10.

The method 270 commences at block 272 with the input by a user of a location identifier in the exemplary form of a Uniform Resource Locator (URL). The input of the URL may be performed by user selection of a link (e.g., user selection of hypertext) presented within any one of the pages 252-262 of the site map 250 illustrated in FIG. 10. Alternatively, the URL may be manually inputted into a URI field. The URL is, in one embodiment, inputted into a client program 30 operating on a client machine 32.

At block 274, the client program 30 communicates a request, including the inputted URI, via a network 44 to the facility 10.

At block 276, the parser 170 of the kernel 100 receives the request (e.g., an HTTP GET request) that includes the URL, and parses the URL to identify one of multiple regional sites provided by the facility 10 and potentially, a category selection indicated in the URL. The request may also specify a view by way of "currency/region/availability" view selection criteria. For example, receipt of the URL www.ebay.com.au indicates receipt of the request via an Australian site provided by an auction facility 10 (e.g., eBay, Incorporated, of San Jose, Calif.). Typically, the site may accordingly be identified from the machine domain portion of a URL, while the "path-of-file" portion of the URL may include category selection information. The "machine domain" portion of a URL is also sometimes referred as the "domain" portion while the subsequent content of the URL may be known as a "URL-path" portion, At block 178, the kernel 100 then identifies a regional site (e.g., an Australian site) supported by the facility 10, which is addressed by the URL. At block 280, the kernel 100 then accesses a hierarchical site category data structure, associated with the identified regional site, the relevant category data structure being maintained in the site categories cache 150.

At decision block 282, the kernel makes a determination as to whether an item listing is required. Specifically, this determination may be made dependent upon the number of items within a particular category. For example, if the number of items within the category may conveniently be displayed to the user (e.g., where the category comprises a "leaf" category) then an item listing may be determined as being required. Alternatively, should the category be "all" umbrella, category, clearly it may be undesirable to display listings for all items available for a particular site.

If it is determined at decision box 282 that an item listing is not required, at block 284, a further category browse index page is generated utilizing the relevant site category data structure. Specifically the browse index page generated may merely provide a listing of categories below the category indicated by the category selection identified at block 276.

On the other hand, should an item listing be required, at block 286, the kernel accesses the map file 200 to locate a view based on the relevant category selection, as well as the "currency;/region/availability" view selection criteria discerned at block 276.

At block 288, an item list index page 262 is generated.

At block 290, the index page generated at either block 284 or 288 is then transmitted from the facility 10, via the network 34, to the client machine 32, and displayed to a user at block 292 by the client program 30.

It should also be noted that the item index page 262, generated at block 288, may also include category information extracted from the site category data structure, or included within the view identified at block 286.

Examples of item list index pages 262 generated by two different regional sites are shown in FIGS. 12A-12D, 13A-13D, and 14A-14E. Specifically, FIGS. 12A-12D illustrate an exemplary item list index page 262 generated responsive to the URL indicated at 300. As will be apparent from the URL 300, the relevant regional site is the Untied Kingdom site provided by eBay, Incorporated, this site being identified by the machine domain 302.

A view selection criteria is indicated at 304 (e.g., the location view selection indicating that the view should provide items located in the United Kingdom), while a category selection is indicated at 306 (e.g., category 267 that is the "books" site category of the parent "books, films, music" category).

Figure 12A:
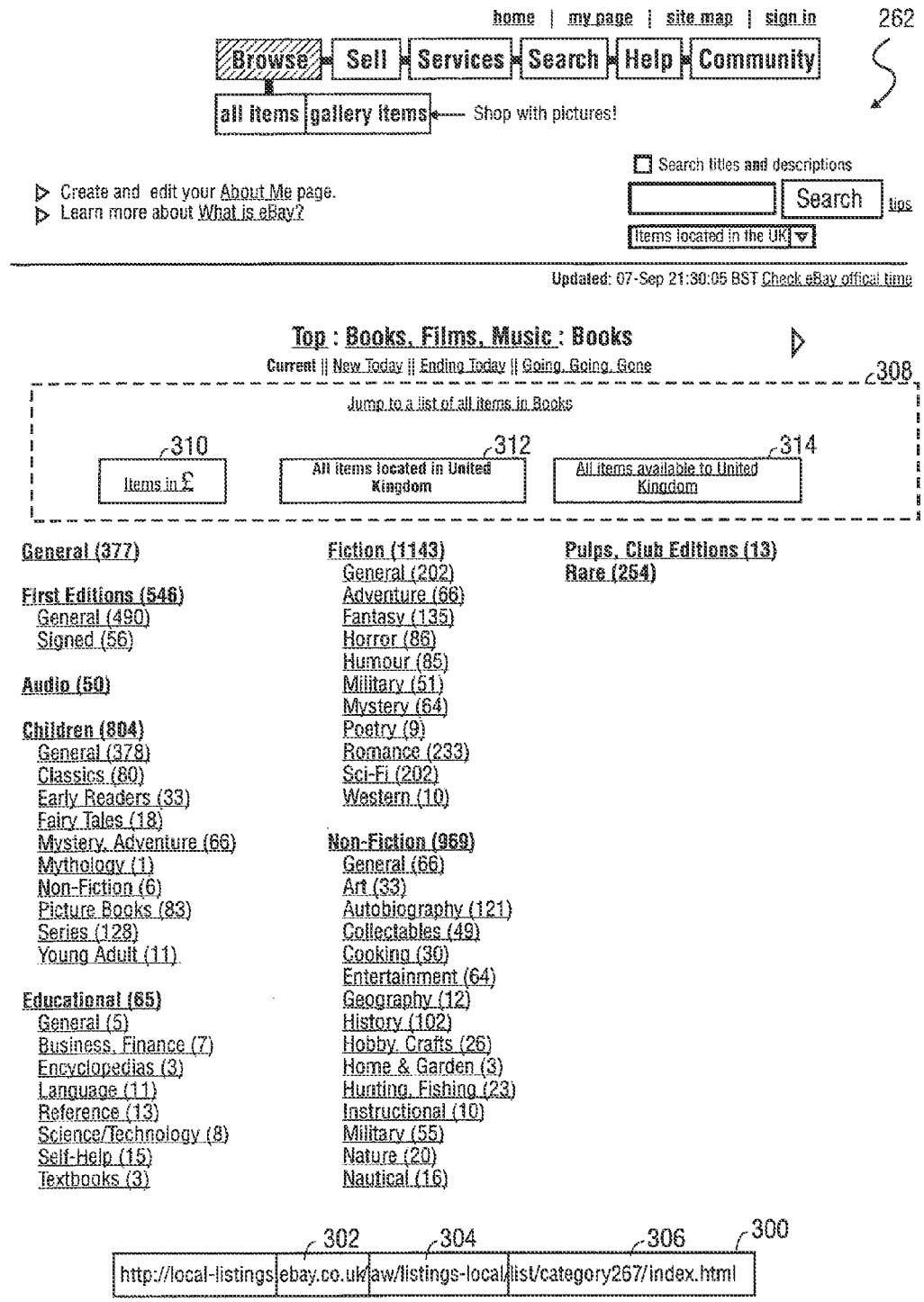
Figure 13A:
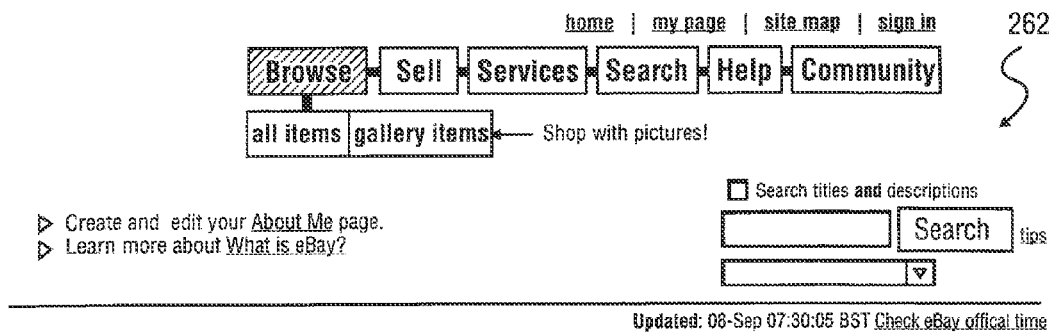

The item list index page 262 shown on FIG. 12A also includes view selector icons 308 that are user selectable to alter the view selection category 304. The view selector icons 308 include a currency view selection icon 310, a region view selection icon 312 and an available view selection icon 314. User selection of any of the icons 310, 312, 314, as described with reference to FIG. 11, results in the generation of a fresh index page propagated with an alternative view according to the viewer selection specified in URLs associated with each of icons 310, 312 and 314.

It will also be noted, from FIG. 12B, as the item list index page 262 is being presented via the United Kingdom site, a conversion from U.S. dollars to U.K. £ is automatically provided for items that may originally have been listed in U.S. dollars.

The item list index page 262 illustrated in FIGS. 13A-13D is generated by facility 10 for the Australian site supported by the facility 10. It will be noted that the categories presented for browsing in the Australian version of the index page 262 differ from those shown in the United Kingdom version shown in FIGS. 12A-12D. For items are listed in the currency other than the Australian dollar, a conversion to Australian dollars is also provided.

FIGS. 14A-14B illustrates an example of an item list index page 262, where the view selection 304 specified by an exemplary URL indicates the "available" action view for the Australian site.

Figure 15A:
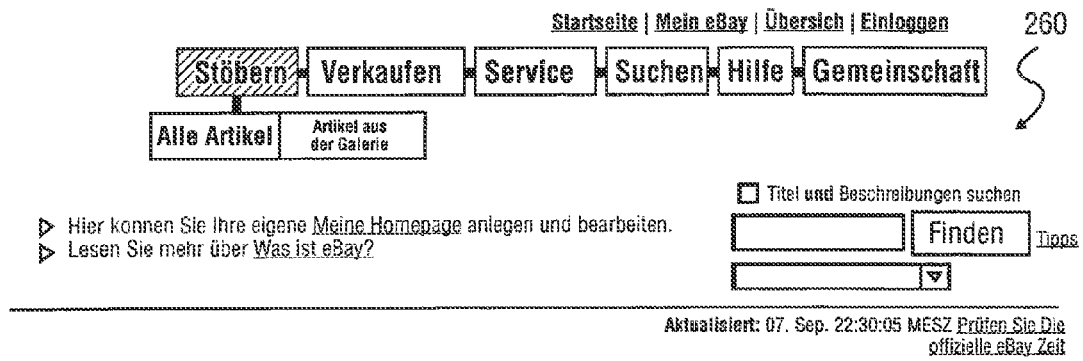
Figure 15C:

FIGS. 15A-15C illustrate an exemplary category browse index page 260 for a German site operated by a facility 10. The category descriptions, derived from the appropriate category records for the German site maintained in the site categories table 262, are in the German language.

Methodology and Use Interfaces: Search

Figure 16:
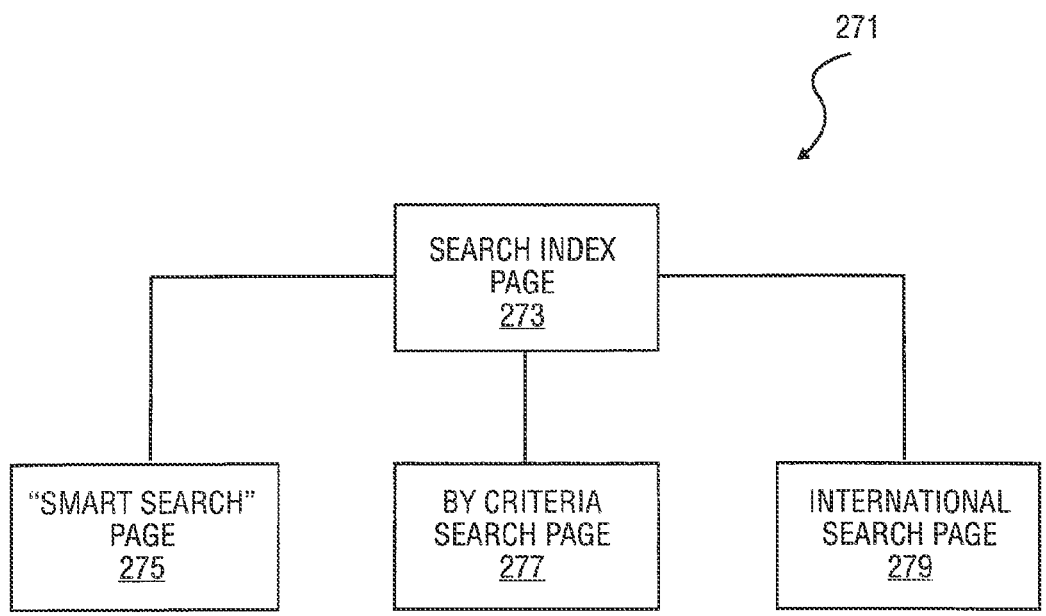
FIG. 16 is a page map, according to an exemplary embodiment of the present invention, that may be accessible via a search index page.

FIG. 16 illustrates a page map 271, according to an exemplary embodiment of the present invention, that may be accessible via a search index page 273, the pages of the page map 271 providing access to search resources to locate offerings via facility 10. More specifically, a "smart search" page 275, one or more by criteria search pages 277 and an international search page 279 may be provided by the facility 10. Examples of each of these pages shall be discussed below with reference to FIGS. 18A-18D.

Figure 17:
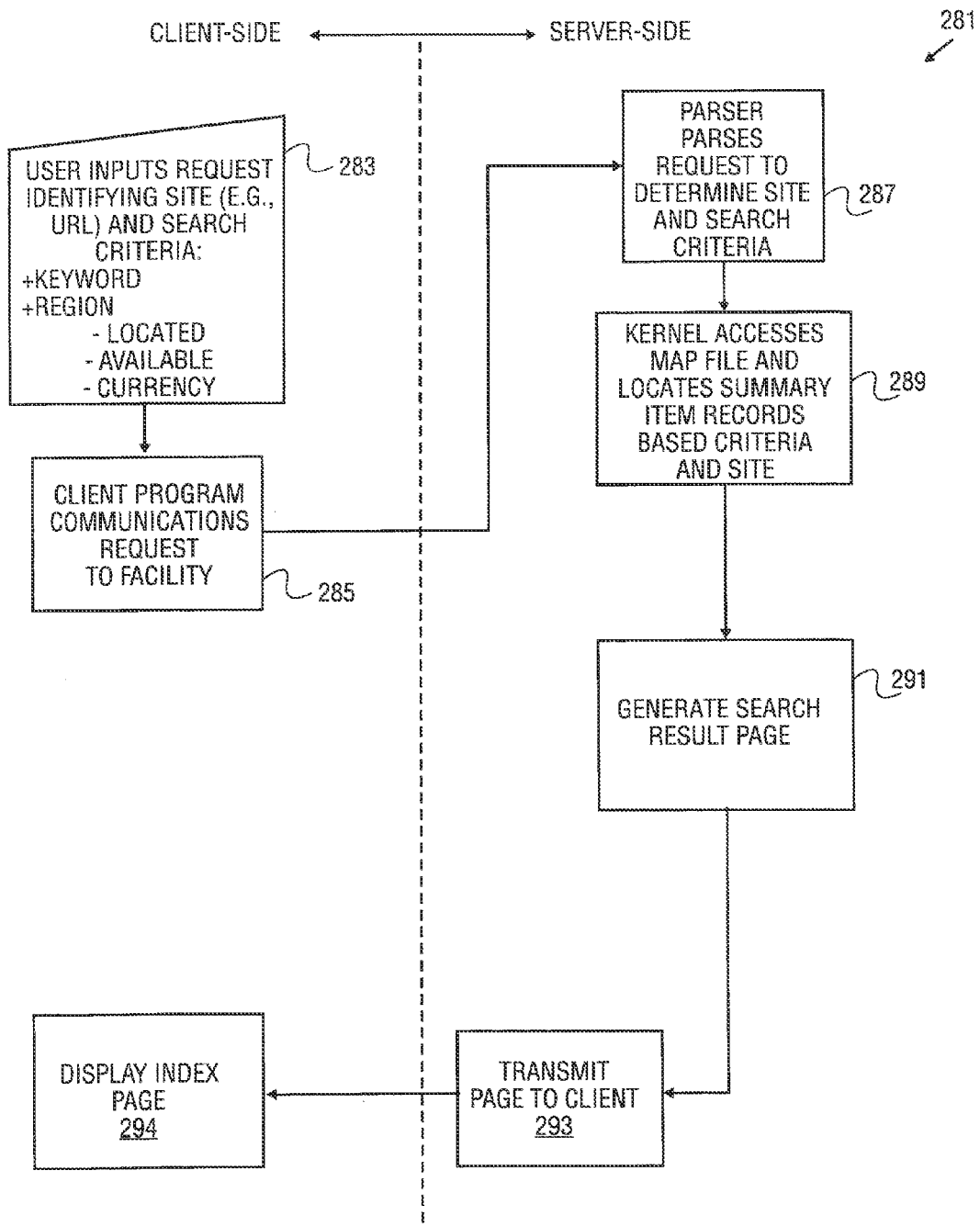
FIG. 17 is a flow chart illustrating a method, according to an exemplary embodiment of the present invention, of facilitating a search of offerings of a network-based commerce facility.

FIG. 17 is a flow chart illustrating a method 281, according to an exemplary embodiment of the present invention, of facilitating a search of offerings of a facility 10. The method 281 commences at block 283 with user input of a. search request that identifies the regional site via which the request originated (e.g., within the machine domain portion of the URL) as well as various search criteria. The search criteria may be inputted, as will be described below with reference to FIGS. 18A-18D into web page interfaces generated by the server 12 and communicated to a client machine 32 for display by client program 30. The search criteria may include any one or more of a key word, a region (or community) specification, and a user selection, indicating whether a relevant item should be located within the specified region, available within the specified region, or listed a currency of the specified region. Certain of the above criteria may be absent, or may automatically be specified by the relevant interface.

At block 285, the client program 30 then communicates the request (e.g., an HTTP POST request) via the network 34 to the facility 10.

At block 287, having received the request at the facility 10, the parser 170 parses the request to identify the site (e.g., the Australian site) from which the request originated and to extract the search criteria therefrom.

At block 289, the kernel 100 then accesses the map file 200, and locates summary item records based on the search criteria and the determined site. The location of the summary item records at block 289 may be performed in a number of ways. In a first embodiment of the present invention, the search module 130 may perform a "brute force" search of the map file 200. In an alternative embodiment, the kernel 100 may locate a view 210 utilizing the region specification, as well as the view specification (e.g., located, available or currency). Having so located an appropriate view, the search module 103 may then perform a search of only the appropriate view utilizing the key word.

In a further embodiment the kernel may access the items table 42 relative to a view to retrieve appropriate information from this table 42.

In yet another embodiment the kernel instead of accessing the map file 200, accesses a search database that is created from the items table 42 and indexed by the search indexer server 24. The data in the search database may be indexed by indices, e.g., the database may be indexed regionally. For example, for a regional search, the search dynamic link library (dll) first may retrieve all of items available in a particular region and then perform a key word search within the retrieved subset of results.

At block 290, a search result page is generated, which is then communicated to the client machine 32 at block 292, and displayed by the client program 30 to a user at block 294.

As will be appreciated from the below discussion of FIGS. 18A-18D, the search criteria included in the request transmitted from the client machine 32 to the facility 10 may include criteria in addition to those listed above. Specifically, category search criteria may also be included.

Figure 18A:
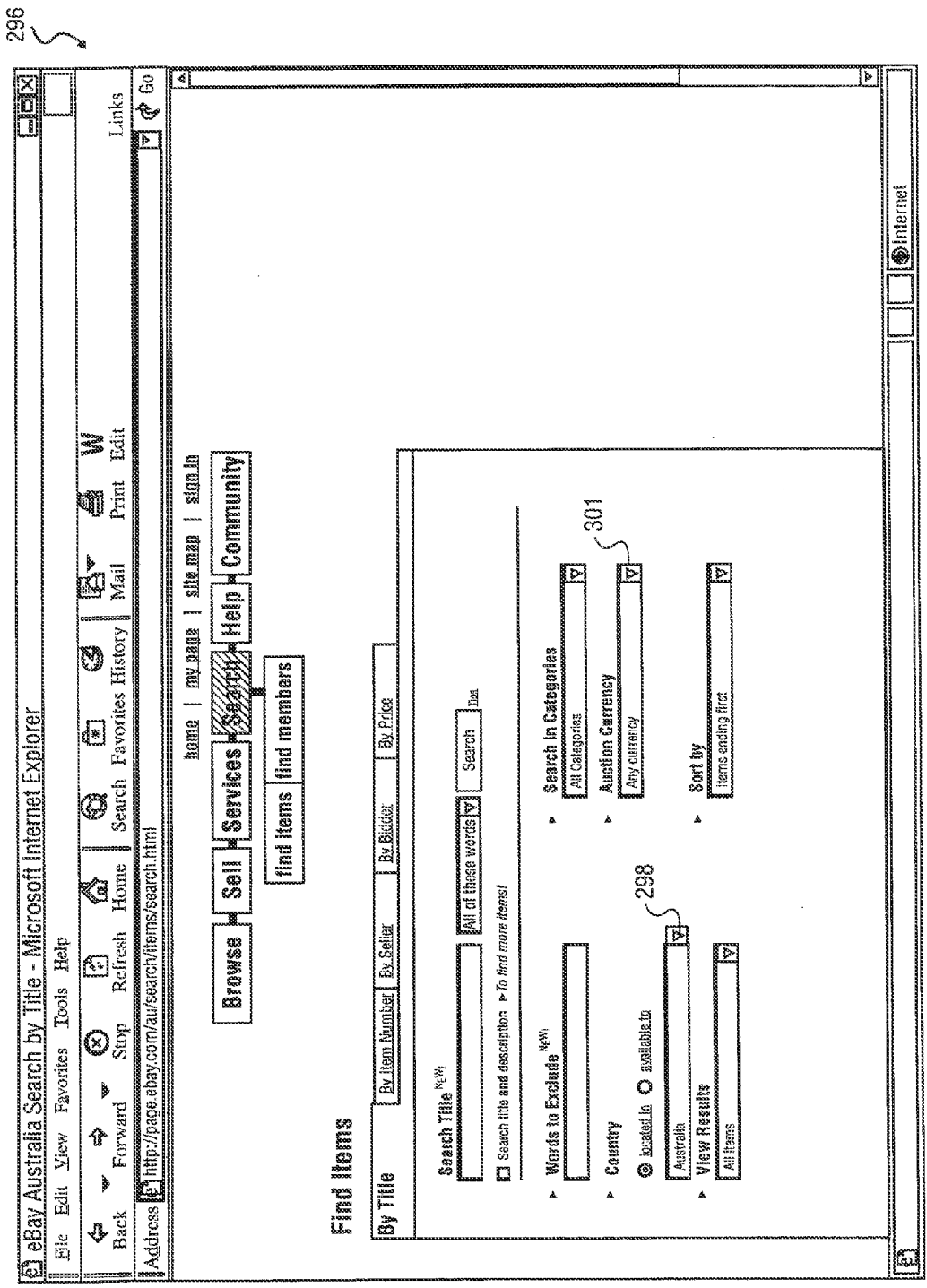
FIGS. 18A-18D illustrate exemplary web page interfaces generated by a server and communicated to a client machine, the web pages facilitating the input of search criteria.

FIG. 18A illustrates an exemplary search request interface 296, in the form of a markup language document, via which a user may input the above discussed search criteria. Utilizing a drop-down menu presented within a country input field 298, a user may specify a country (i.e., a region), and also indicate whether items located by the search should in fact be located within the country or merely available to the country. Further, utilizing a currency input field 301, which is populated utilizing a drop-down menu, the user may specify a currency in which items located by the search are listed.

Figure 18B:
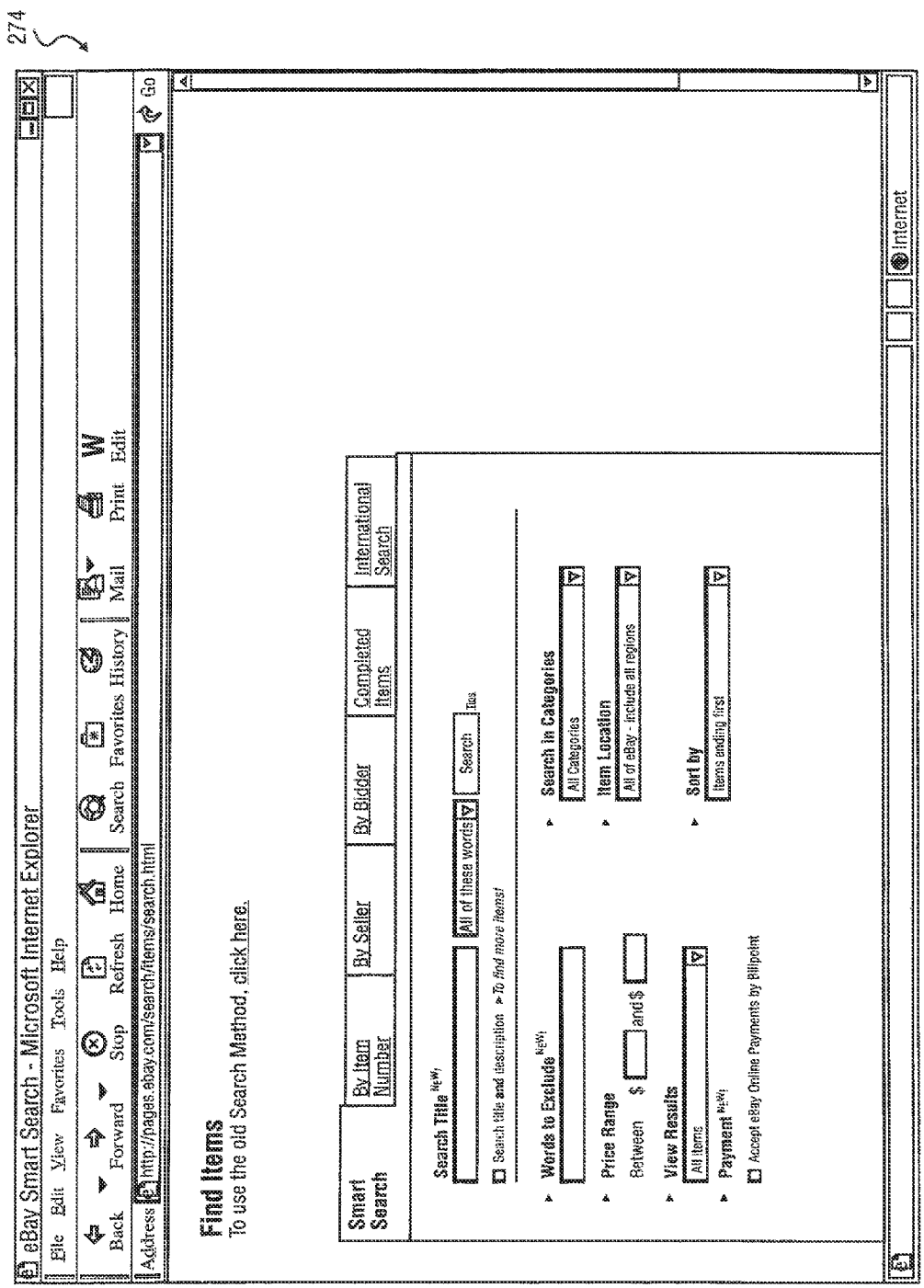

FIG. 18B illustrates the "smart search" page (or interface) 274 for a particular regional site. The "smart search" page 274 is distinguished in that a search request issued therefrom is identified by the facility 10 as having originated from a regional site, and the facility 10 thus excludes from the search result items that fail to meet certain criteria (e.g., language, currency or other criteria). For example, where a "smart search" is initiated from a Japanese site operated by facility 10, the facility 10 may only return items for which the description language is the Japanese language. Similarly, a search initiated from a "smart search" page 274 for a US site would exclude items for which the description language is Japanese.

Figure 18C:
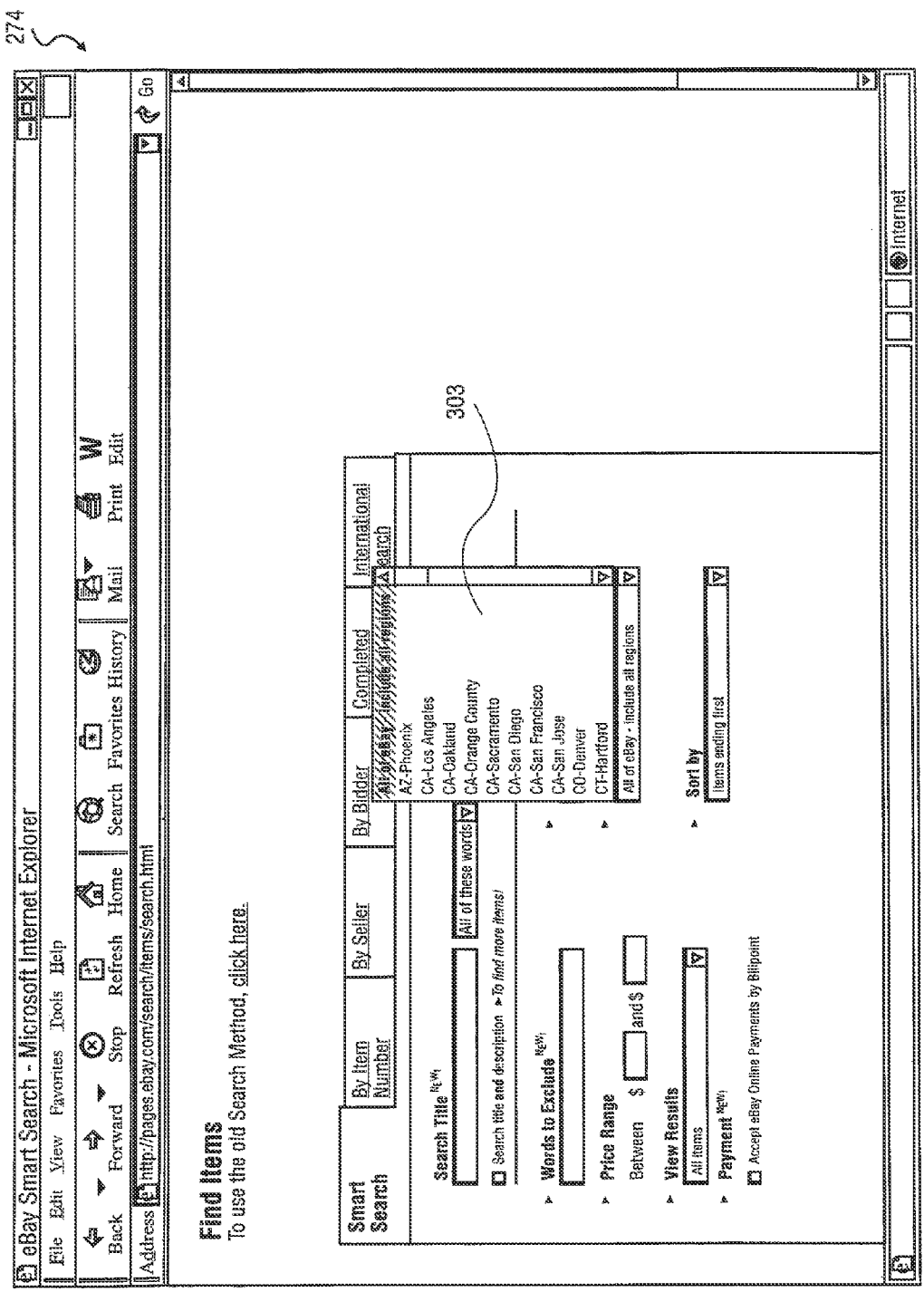

FIG. 18C illustrates the display of a drop-down menu 303 presenting a predetermined list of regions (e.g., U.S. cities) that may be presented by an interface for user selection. The predetermined list of regions presented in the drop-down menu 303 is dependent on the regional site.

Figure 18D:
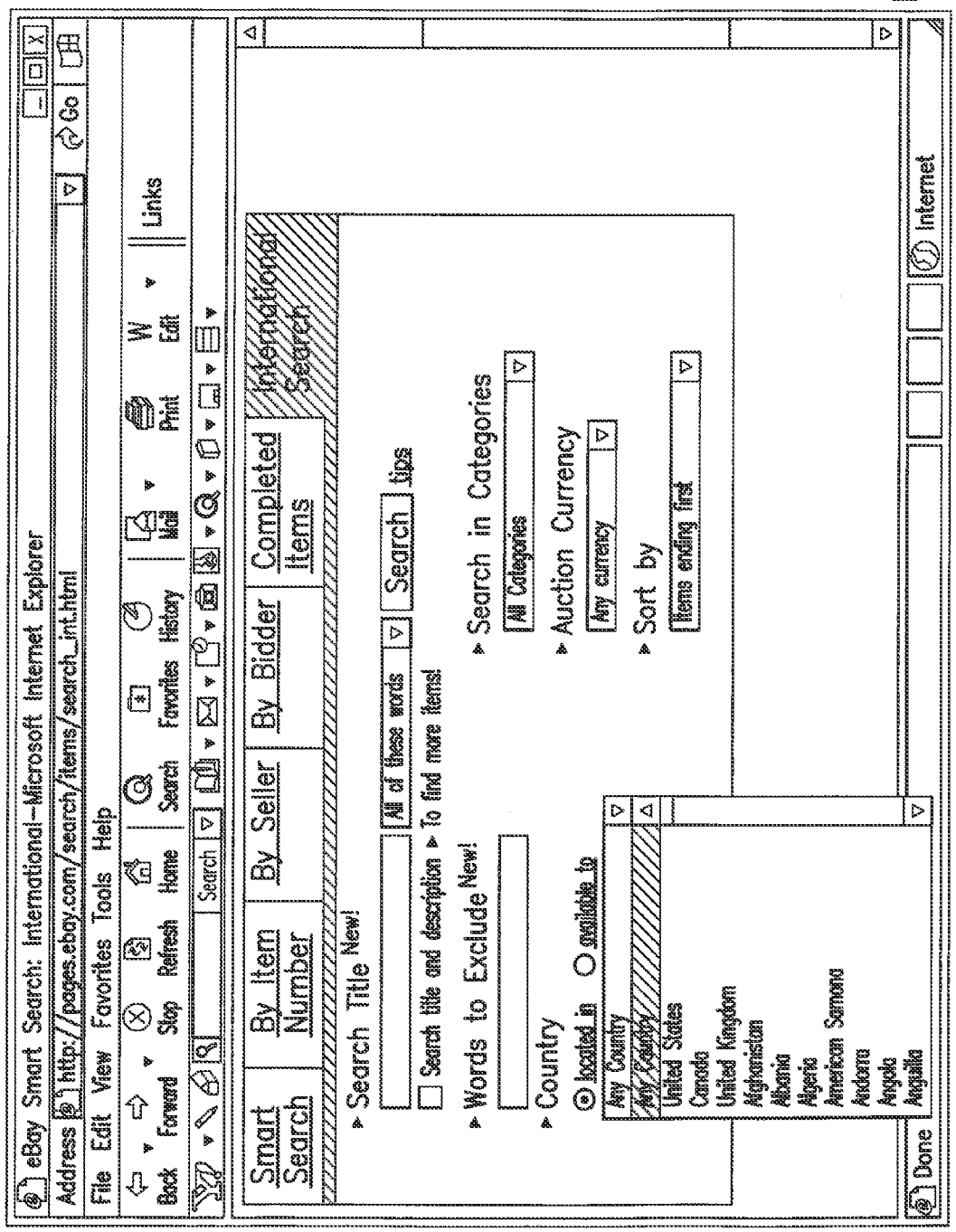

FIG. 18D illustrates an example of an international search page 278 that corresponds substantially to the interface 296 shown in FIG. 18A. In FIG. 18D, a drop-down menu of regions (e.g., countries) displayed to facilitate convenient input into a country input field 298.

Method and User Interfaces: Currency Conversion

Figure 19:
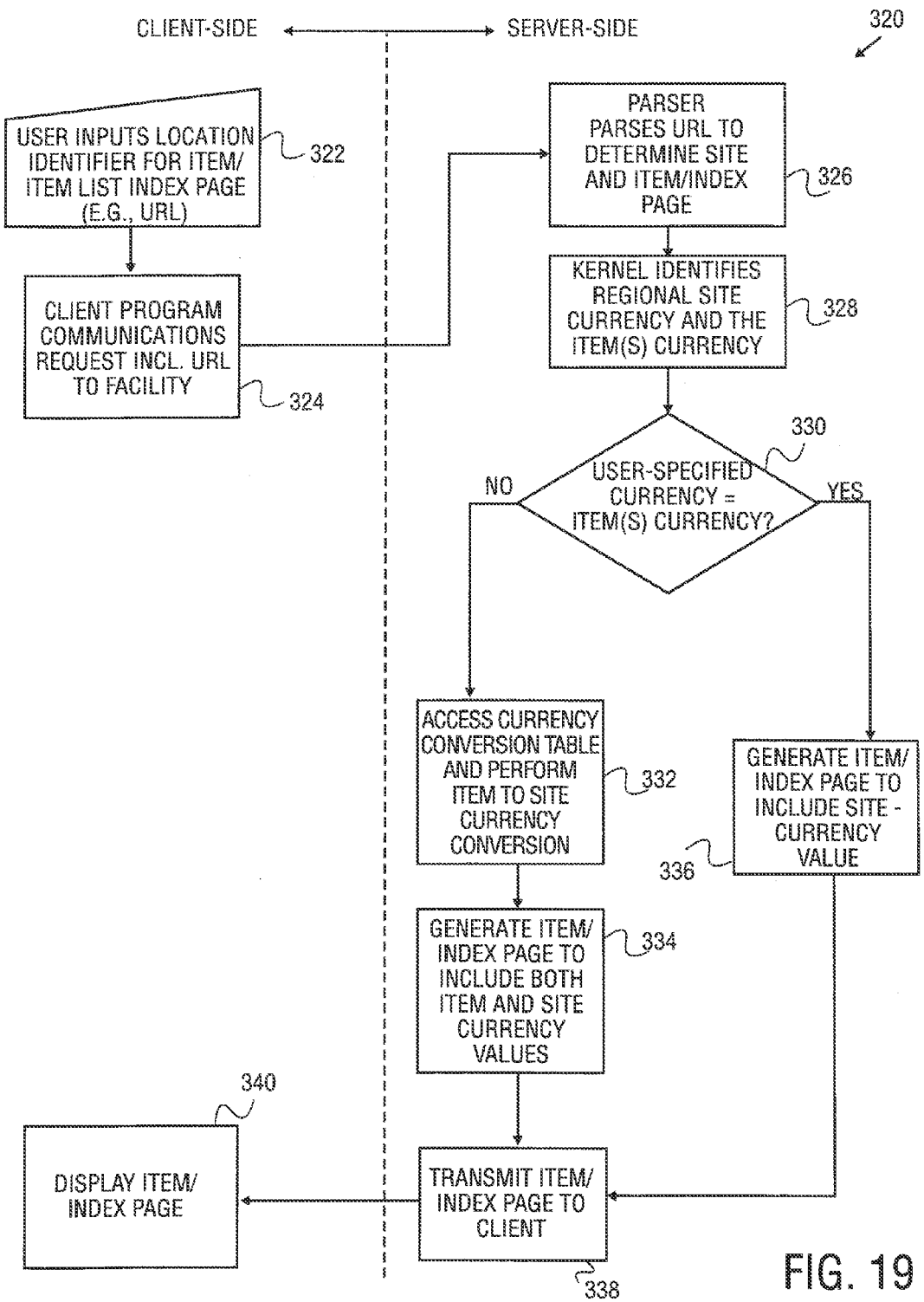
FIG. 19 is a flow chart illustrating a method, according to an exemplary embodiment of the present invention, of performing a currency conversion for offerings presented via a network-based commerce facility.

FIG. 19 is a flow chart illustrating a method 320, according to the present invention, of performing a currency conversion for offerings via the facility 10.

At block 322, the user inputs a location identifier for an item, or an item list index page. The location identifier is typically a URI, and is inputted by (1) user selection of hypertext, having the relevant URL associated therewith or (2) input into an interface presented by the client program 30.

At block 324, the client machine 32 communicates a request, including the URL, to the facility 10 via the network 34.

At block 326, the parser 170 parses the URL to identify a regional site from which the request originated, and also to identify the item, or index page, identified within the URL.

At block 328, the kernel identifies a currency associated with the regional site (e.g., Australian dollars or a request originated from an Australian site), as well as the currency in which an item, or items within the index page, are listed. In one embodiment, the kernel identifies a user-preferred display currency, which is specified directly by a user, through a saved preference or a cookie and displays the items in the user-specified currency. If currency is not specified by the user, the default currency of a site may be used by the kernel.

At decision block 330, a determination is made by the kernel 100 as to whether the site currency matches the currency of the one or more items.

In the event that there is not a correlation between the site currency and the currency of the at least one item, at block 332, the kernel 100 accesses a conversion table, utilizing a currency conversion module 195, and performs an item-to-site currency conversion for items for which the currency does not match the site currency.

At block 334, the kernel 100 then generates an item page, or an index page, to include both item and site currency values On the other hand, if it is determined at decision block 330 that the site currency does match all relevant item currencies, at block 336, the kernel 100 generates an item page, or index page, to include the site currency value.

At block 334, the item page, or index page, is communicated to the client machine 32, where it is displayed by the client program 30 to a user.

Figure 20A:

Examples of index pages including converted currency amounts have been discussed above with reference to FIGS. 12A-12B, 13A-13D, and 14A-14E. FIGS. 20A and 20B provide examples of item pages for an item originally listed in pounds, but where the item pages are retrieved via U.S. and French sites, respectively.

A facility 10 may also provide summary pages to buying and selling users regarding transactions within which they have participated. Currency conversions may also be provided within such pages, or any pages delivered by the auction facility 10 wherein financial information appears.

In summary, the present invention is advantageous in that it allows common collection of offering information (e.g., item records within an item table) to be utilized to service multiple regional or community sites, and allows such multiple regional or community sites to customize the presentation of information regarding such offerings to account for local preferences, conditions and tastes. Further, by having a common body of offering information accessible via multiple regional or community sites, the present invention allows user flexibility regarding the specification of items to be presented to the user, and also allows the facility 10 to implement automatic measures to insure the delivery of offering information to a user that is of interest to the user, or that is understandable to the user. A particular example of this is the language "filter" discussed above that is implemented in the case statements 202 and 204 to insure that views for a particular region only include items for which a descriptive language would be typically understood within that region. Further, the "smart search" pages discussed above provide an example of a service offered by the facility 10 whereby items, for which the language description is inconsistent with the regional site from which the request originated, are filtered out from search results presented to a user.

Computer System

Figure 21:
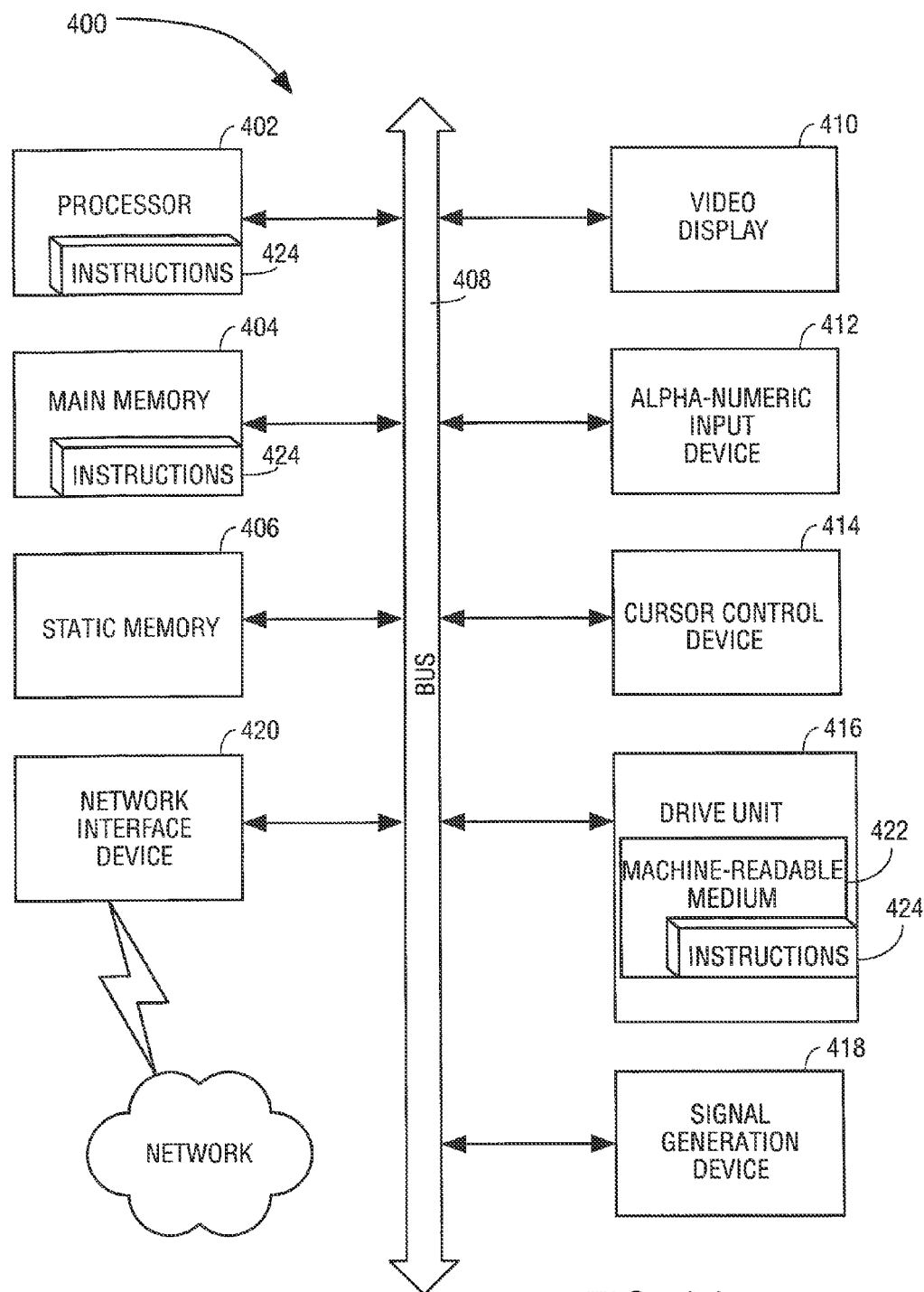
FIG. 21 presents a diagrammatic representation of a machine in the exemplary form of a computer system within which a set of instructions, for causing the machine to perform any one of the methodologies discussed above, may be executed.

FIG. 21 shows a diagrammatic representation of machine in the exemplary form of a computer system 400 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored a set of instructions (i.e., software) 424 embodying any one, or all, of the methodologies described above. The software 424 is also shown to reside, completely or at least partially, within the main memory 404 and/or within the processor 402. The software 424 may further be transmitted or received via the network interface device 420. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rattler than a restrictive sense.

What is claimed is:

1. A system comprising:
one or more processors;
a listing module that configures a processor among the one or more processors to generate summary records that summarize full item records;
a parser module that configures a processor among the one or more processors to receive a request from a user and indicative of a geographic region; and
a view module that configures a processor among the one or more processors to present at least part of a full item record among the full item records based on the generated summary records that summarize the full item records and based on the geographic region in response to the received request.

2. The system of claim 1 further comprising:
a kernel module that configures a processor among the one or more processors to determine the geographic region based on the received request.

3. The system of claim 1 further comprising:
a kernel module that configures a processor among die one or more processors to access a category list that corresponds to the geographic region indicated by the request and identifies a category to which the full item record belongs; and wherein
the view module is configured to present at least the part of the full item record based on the category list that corresponds to the geographic region.

4. A method comprising:
generating summary records that summarize full item records,
the generating of the summary records being performed by a machine;
receiving a request from a user and indicative of a geographic region; and
presenting at least part of a full item record among the full item records based on the generated summary records that summarize the full item records and based on the geographic region in response to the received request.

5. The method of claim 4, wherein:
the generating of the summary records generates first records that summarize the full item records,
the first records including second records that summarize a portion of the full item records; and
the presenting of at least the part of the full item record among the full item records is based on the second records that summarize the portion of the full item records.

6. The method of claim 4, wherein:
the generating of the summary records generates a file that includes the summary records that summarize the full item records; and
the presenting of at least the part of the full item record among the full item records is based on the file that includes the summary records that summarize the full item records.

7. The method of claim 4, wherein:
the generating of the summary records generates a map file that organizes the summary records into groups; and
the presenting of at least the part of the full item record among the full item records is based on the map file that organizes the summary records into groups.

8. The method of claim 7, wherein:
the map file organizes a portion of the summary records into a group that corresponds to the geographic region indicated by the request; and the presenting of at least the part of the full item record is based on the group that corresponds to the geographic region.

9. The method of claim 7, wherein:

the map file organizes a portion of the summary records into a group that corresponds to a currency used in the geographic region; and the presenting of at least the part of the full item record is based on the group that corresponds to the currency.

10. The method of claim 7, wherein:

the map file organizes a portion of the summary records into a group that corresponds to a shipment availability indicated in the full item record; and the presenting of at least the part of the full item record is based on the group that corresponds to the shipment availability.

11. The method of claim 4 further comprising:

determining the geographic region based on the received request.

12. The method of claim 4 further comprising:

accessing a category list that corresponds to the geographic region indicated by the request and identifies a category to which the full item record belongs; and wherein the presenting of at least the part of the full item. record is based on the category list that corresponds to the geographic region, 13. The method of claim 12 further comprising:

generating the category list that corresponds to the geographic region.

14. The method of claim 12, wherein:

the received request indicates a regional site that corresponds to the geographic region; and the accessing of the category list is responsive to the regional site being indicated by the received request.

15. The method of claim 4, wherein:

the received request includes search criteria.

16. The method of claim 15 further comprising:

performing a search of the summary records based on the search criteria included in the received request; and wherein the presenting of at least the part of the full item record is based on the performed search of the summary records.

17. The method of claim 15 further comprising performing a search of a portion of the summary records based on the search criteria included in the received request; and wherein the presenting of at least the part of the full item record is based on the performed search of the portion of the summary records.

18. A non-transitory machine-readable medium comprising instructions that, when executed by one or more processors of a machine, cause the machine to perform operations comprising:

generating summary records that summarize full item records, the generating of the summary records being performed by the one or more processors of the machine;

receiving a request from a user and indicative of a geographic region; and presenting at least part of a full item record among the full item records based on the generated summary records that summarize the full item records and based on the geographic region in response to the received request.

19. The non-transitory machine-readable storage medium of claim 18, wherein:

the generating of the summary records generates a map tile that organizes the summary records into groups; and the presenting of at least the part of the full item record among the full item records is based on the map file that organizes the summary records into groups.

20. The non-transitory machine-readable storage medium of claim 18, wherein:

the map file organizes a portion of the summary records into a group that corresponds to the geographic region indicated by the request; and the presenting of at least the part of the full item record is based on the group that corresponds to the geographic region.

\* \* \* \* \*

UNITED STATES PATENT AND TRADEMARK OFFICE
CERTIFICATE OF CORRECTION

PATENT NO. : 8,732,037 B2
APPLICATION NO. : 13/550233
DATED : May 20, 2014
INVENTOR(S) : Boone et al.

It is certified that error appears in the above-identified patent and that said Letters Patent is hereby corrected as shown below:

In the Claims

Column 16, line 21, in Claim 3, delete "die" and insert --the--, therefor

Column 17, line 24, in Claim 12, delete "item." and insert --item--, therefor

Column 17, line 26, in Claim 12, delete "region," and insert --region.--, therefor Column 18, line 3, in Claim 17, after "comprising", insert --:--, therefor Column 18, line 26, in Claim 19, delete "tile" and insert --file--, therefor Signed and Sealed this
Eleventh Day of November, 2014

Michelle K. Lee
*Deputy Director of the United States Patent and Trademark Office*